(12) United States Patent
Yoshimi et al.

(10) Patent No.: US 12,442,549 B2
(45) Date of Patent: Oct. 14, 2025

(54) AIR CONDITIONER

(71) Applicant: DAIKIN INDUSTRIES, LTD., Osaka (JP)

(72) Inventors: Atsushi Yoshimi, Osaka (JP); Takuro Yamada, Osaka (JP); Eiji Kumakura, Osaka (JP); Ikuhiro Iwata, Osaka (JP); Takeru Miyazaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 312 days.

(21) Appl. No.: 17/707,466

(22) Filed: Mar. 29, 2022

(65) Prior Publication Data

US 2022/0221168 A1    Jul. 14, 2022

Related U.S. Application Data

(63) Continuation of application No. PCT/JP2020/029351, filed on Jul. 30, 2020.

(30) Foreign Application Priority Data

Sep. 30, 2019  (JP) .................................. 2019-180598
Sep. 30, 2019  (JP) .................................. 2019-180599

(51) Int. Cl.
*F24F 5/00*     (2006.01)
*F25B 1/10*     (2006.01)
(Continued)

(52) U.S. Cl.
CPC ............ *F24F 5/001* (2013.01); *F24F 5/0035* (2013.01); *F25B 1/10* (2013.01); *F25B 5/04* (2013.01);
(Continued)

(58) Field of Classification Search
CPC ...... F25B 6/00; F25B 6/02; F25B 6/04; F25B 9/08; F25B 9/008; F25B 2341/0011;
(Continued)

(56) References Cited

U.S. PATENT DOCUMENTS

2002/0184903 A1   12/2002  Takeuchi et al.
2005/0268644 A1   12/2005  Oshitani et al.
(Continued)

FOREIGN PATENT DOCUMENTS

CN         101688697 A      3/2010
CN         103635759 A      3/2014
(Continued)

OTHER PUBLICATIONS

CN-109682103-A English Translation (Year: 2019).*
(Continued)

*Primary Examiner* — Frantz F Jules
*Assistant Examiner* — Devon Moore
(74) *Attorney, Agent, or Firm* — Birch, Stewart, Kolasch & Birch, LLP

(57) ABSTRACT

An air conditioner includes an ejector that raises a pressure of refrigerant by using energy for refrigerant decompression and expansion. A switching mechanism switches between a refrigerant flow in a first operation and a refrigerant flow in a second operation. The air conditioner is configured such that in the first operation, refrigerant compressed by a compression mechanism radiates heat in a use-side heat exchanger and is decompressed and expanded by the ejector while refrigerant evaporated in a heat-source-side heat exchanger is raised in pressure by the ejector. The air conditioner is configured such that in the second operation, refrigerant compressed by the compression mechanism radiates heat in the heat-source-side heat exchanger and is decompressed and expanded by a first expansion valve (Continued)

before being evaporated in the use-side heat exchanger while refrigerant does not flow through the ejector.

4 Claims, 33 Drawing Sheets

(51) Int. Cl.
    *F25B 5/04*     (2006.01)
    *F25B 6/04*     (2006.01)
    *F25B 13/00*     (2006.01)
    *F25B 43/00*     (2006.01)

(52) U.S. Cl.
    CPC ............... *F25B 6/04* (2013.01); *F25B 13/00* (2013.01); *F25B 43/006* (2013.01)

(58) Field of Classification Search
    CPC .......... F25B 2400/13; F25B 2400/0407; F25B 2309/06; F25B 2309/061
    See application file for complete search history.

(56) References Cited

U.S. PATENT DOCUMENTS

| | | |
|---|---|---|
| 2006/0266072 A1 | 11/2006 | Takeuchi et al. |
| 2011/0203309 A1 | 8/2011 | Okazaki |
| 2011/0314863 A1 | 12/2011 | Mitra et al. |
| 2013/0042640 A1 | 2/2013 | Higashiiue et al. |
| 2014/0096557 A1 | 4/2014 | Higashilue |
| 2019/0242610 A1 | 8/2019 | Liu et al. |

FOREIGN PATENT DOCUMENTS

| | | | |
|---|---|---|---|
| CN | 203964450 U | 11/2014 | |
| CN | 204008789 U | 12/2014 | |
| CN | 109682103 A * | 4/2019 | ............. F25B 41/04 |
| EP | 1 236 959 A2 | 9/2002 | |
| EP | 1 327 838 A2 | 7/2003 | |
| JP | S59-225262 A | 12/1984 | |
| JP | 3322263 B1 | 9/2002 | |
| JP | 3931899 B2 | 6/2007 | |
| JP | 4069656 B2 | 4/2008 | |
| JP | 2009-222359 A | 10/2009 | |
| JP | 2010-85042 A | 4/2010 | |
| JP | 4725223 B2 | 7/2011 | |
| JP | 2011-214741 A | 10/2011 | |
| WO | WO-2009128271 A1 * | 10/2009 | ................ F25B 1/10 |

OTHER PUBLICATIONS

WO-2009128271-A1 English Translation (Year: 2009).*
International Search Report (PCT/ISA/210) issued in PCT/JP2020/029351, dated Oct. 6, 2020.
Written Opinion (PCT/ISA/237) issued in PCT/JP2020/029351, dated Oct. 6, 2020.
English translation of International Preliminary Report on Patentability and Written Opinion of the International Searching Authority for International Application No. PCT/JP2020/029351, dated Apr. 14, 2022.

* cited by examiner

AIR CONDITIONER

CROSS REFERENCE TO RELATED APPLICATIONS

This application is a Continuation of PCT International Application No. PCT/JP2020/029351, filed on Jul. 30, 2020, which claims priority under 35 U.S.C. 119(a) to Patent Application No. 2019-180598, filed in Japan on Sep. 30, 2019 and Patent Application No. 2019-180599, filed in Japan on Sep. 30, 2019, all of which are hereby expressly incorporated by reference into the present application.

TECHNICAL FIELD

Air conditioner equipped with ejector

BACKGROUND ART

For example, as described in PTL 1 (Japanese Patent No. 4069656), a vapor compression refrigerating machine that performs a vapor compression refrigeration cycle using an ejector is known in the related art. The vapor compression refrigerating machine described in PTL 1 is applied to an air conditioner capable of switching between cooling and heating.

SUMMARY

An air conditioner according to one aspect includes a compression mechanism, a first heat-source-side heat exchanger, a use-side heat exchanger, an ejector that raises a pressure of refrigerant by using energy for refrigerant decompression and expansion, an expansion mechanism, and a switching mechanism. The switching mechanism switches between a refrigerant flow in a first operation and a refrigerant flow in a second operation. The air conditioner is configured such that in the first operation, refrigerant compressed by the compression mechanism radiates heat in the use-side heat exchanger and is decompressed and expanded by the ejector while refrigerant evaporated in the first heat-source-side heat exchanger is raised in pressure by the ejector. The air conditioner is configured such that in the second operation, refrigerant compressed by the compression mechanism radiates heat in the first heat-source-side heat exchanger and is decompressed and expanded by the expansion mechanism before being evaporated in the use-side heat exchanger while refrigerant does not flow through the ejector.

DESCRIPTION OF EMBODIMENTS

First Embodiment (1) Overview of Configuration

Figure 1:
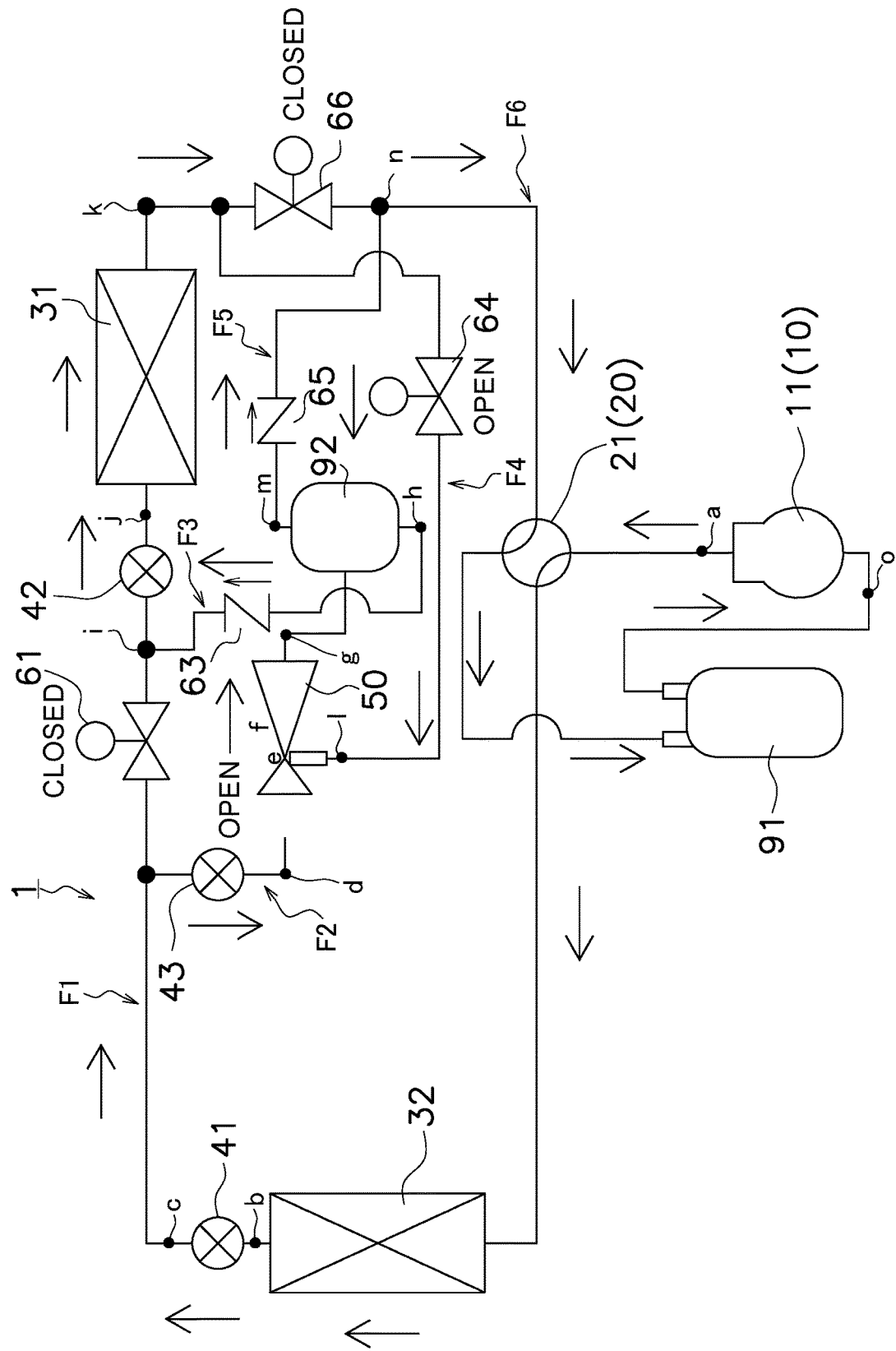
FIG. 1 is a circuit diagram for explaining a first operation of an air conditioner according to a first embodiment.
Figure 3:
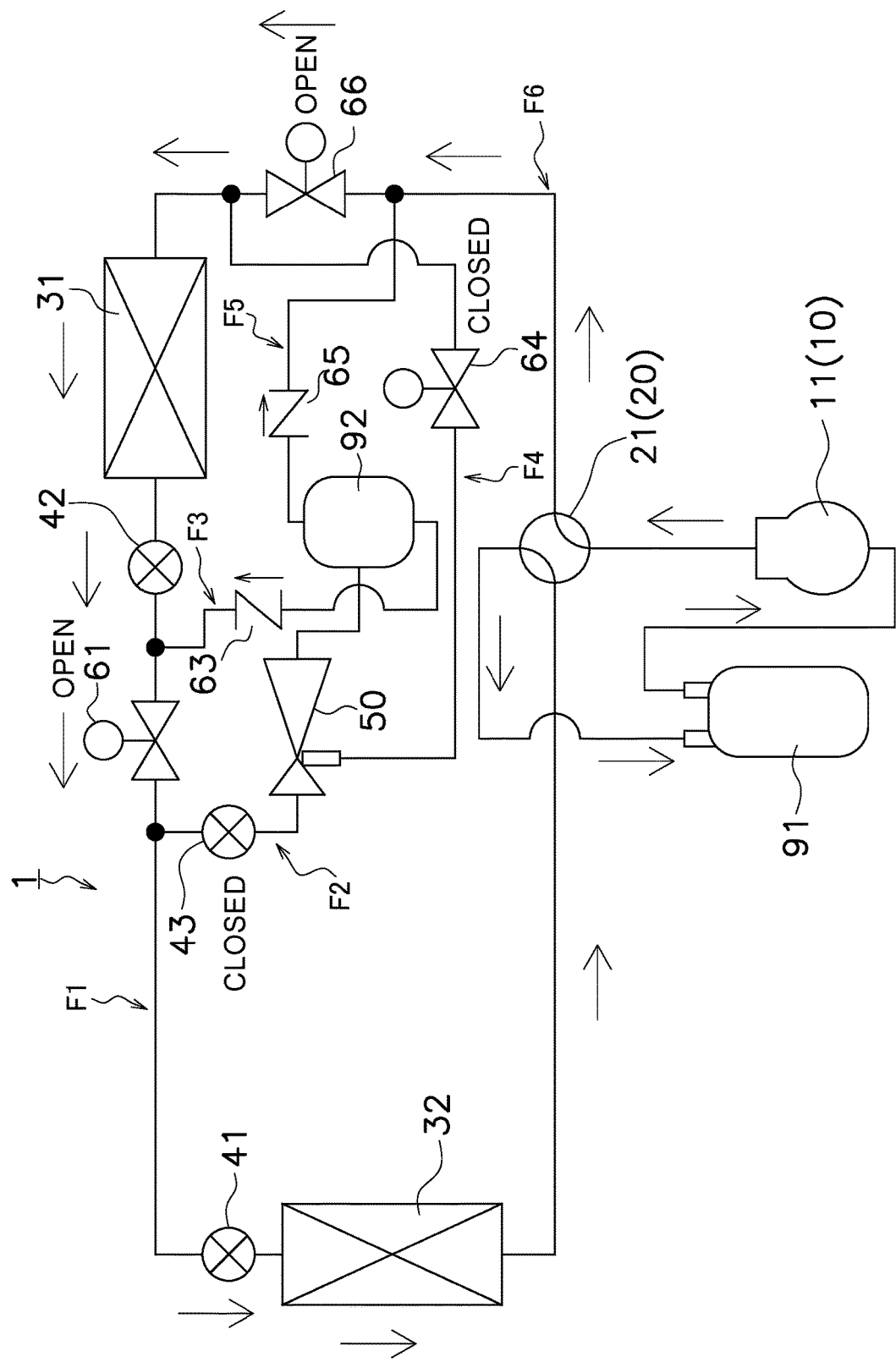
FIG. 3 is a circuit diagram for explaining a second operation of the air conditioner according to the first embodiment.
Figure 4:
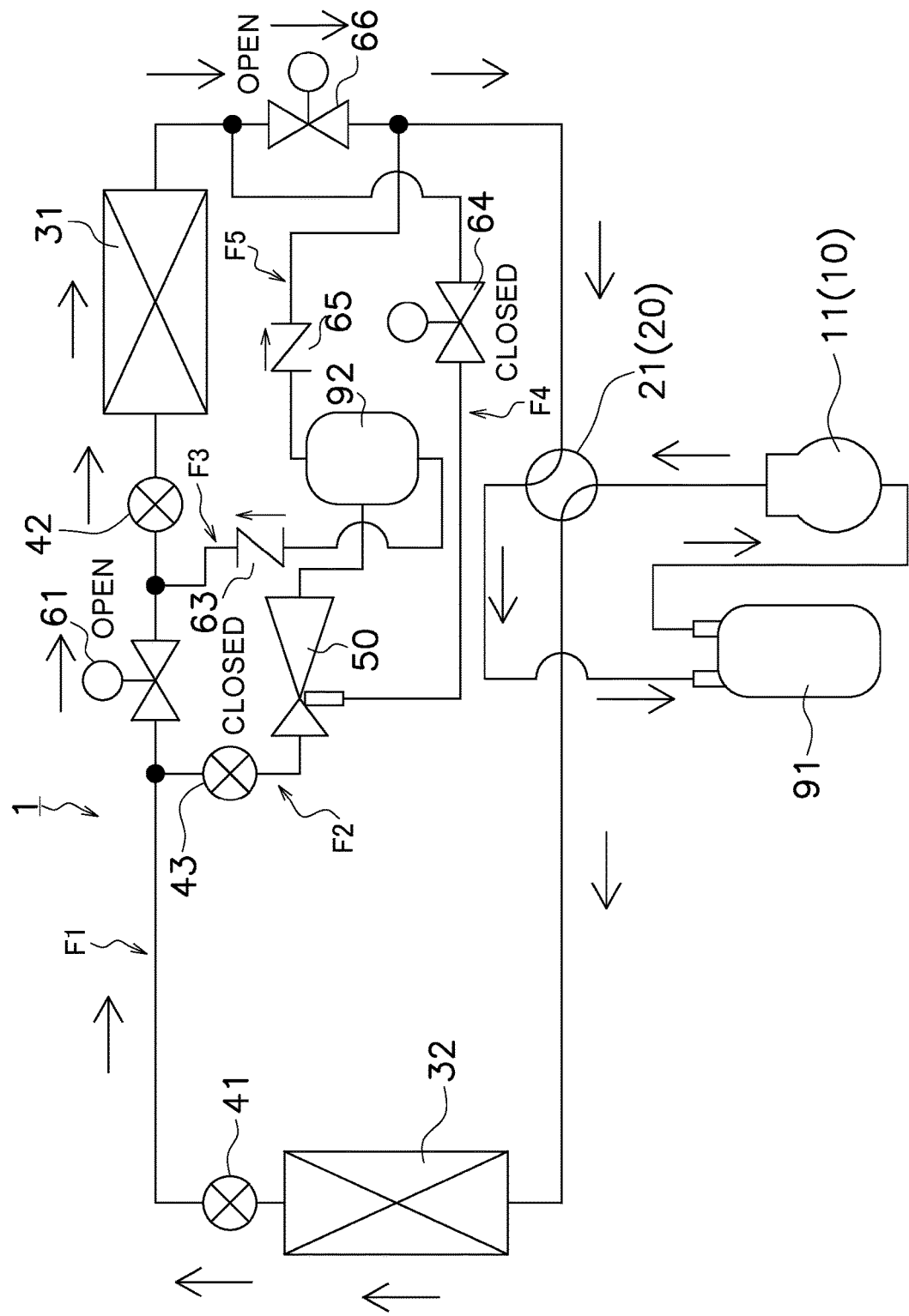
FIG. 4 is a circuit diagram for explaining a third operation of the air conditioner according to the first embodiment.

As illustrated in FIG. 1, FIG. 3, and FIG. 4, an air conditioner 1 according to a first embodiment includes a compression mechanism 10, a heat-source-side heat exchanger 31, a use-side heat exchanger 32, an ejector 50 that raises the pressure of refrigerant by using energy for refrigerant decompression and expansion, a first expansion valve 41, and a switching mechanism 20. The switching mechanism 20 switches between the refrigerant flow in a first operation illustrated in FIG. 1 and the refrigerant flow in a second operation illustrated in FIG. 3.

As illustrated in FIG. 1, the air conditioner 1 is configured such that, in the first operation, the refrigerant compressed by the compression mechanism 10 radiates heat in the use-side heat exchanger 32 and is decompressed and expanded by the ejector 50 while the refrigerant evaporated in the heat-source-side heat exchanger 31 is raised in pressure by the ejector 50.

As illustrated in FIG. 3, the air conditioner 1 is configured such that, in the second operation, the refrigerant compressed by the compression mechanism 10 radiate heat in the heat-source-side heat exchanger 31 and is decompressed and expanded by the first expansion valve 41 before being evaporated in the use-side heat exchanger 32 while refrigerant does not flow through the ejector 50.

The air conditioner 1 having the configuration described above can perform heating in the first operation illustrated in FIG. 1 by using heat radiated from the refrigerant in the use-side heat exchanger 32. In the second operation illustrated in FIG. 3, the air conditioner 1 can perform cooling by heat absorption due to the evaporation of the refrigerant in the use-side heat exchanger 32. The air conditioner 1 can improve heating efficiency and cooling efficiency by switching between the heating operation using the ejector 50 and the cooling operation without using the ejector 50.

(2) Detailed Configuration (2-1) Overview of Circuit Configuration of Air Conditioner 1

The air conditioner 1 according to the first embodiment includes, in addition to the compression mechanism 10, the heat-source-side heat exchanger 31, the use-side heat exchanger 32, the ejector 50, the first expansion valve 41, and the switching mechanism 20 described above, a first flow path F1, a second flow path F2, a third flow path F3, a fourth flow path F4, an on-off valve 61, which is a first valve, and a flow rate control valve 43, which is a second valve. The flow rate control valve 43 is capable of changing the flow rate of the refrigerant by changing the opening degree thereof. Further, the flow rate control valve 43 is capable of shutting off the refrigerant flow when fully closed. The switching mechanism 20 is constituted by a four-way valve 21.

The first flow path F1 is a flow path through which the heat-source-side heat exchanger 31 and the use-side heat exchanger 32 communicate with each other. The second flow path F2 branches off from the first flow path F1 between the use-side heat exchanger 32 and the on-off valve 61 and communicates with a refrigerant inflow port of the ejector 50. In the third flow path F3, the refrigerant flows from a refrigerant outflow port of the ejector 50 to the heat-source-side heat exchanger 31 during the first operation (see FIG. 1), and no refrigerant flows between the refrigerant outflow port of the ejector 50 and the heat-source-side heat exchanger 31 during the second operation (see FIG. 3). In the fourth flow path F4, gas refrigerant flows from the heat-source-side heat exchanger 31 to a refrigerant suction port of the ejector 50 during the first operation (see FIG. 1), and no refrigerant flows between the heat-source-side heat exchanger 31 and the refrigerant suction port of the ejector 50 during the second operation (see FIG. 3).

The on-off valve 61 is disposed in the first flow path F1. The flow rate control valve 43 is disposed in the second flow path F2. During the first operation, as illustrated in FIG. 1, the on-off valve 61 closes the first flow path F1, and the flow rate control valve 43 opens the second flow path F2. During the second operation, as illustrated in FIG. 3, the on-off valve 61 opens the first flow path F1, and the flow rate control valve 43 closes the second flow path F2.

In the air conditioner 1 according to the first embodiment, with a simple configuration of the four flow paths, namely, the first flow path F1 to the fourth flow path F4, the on-off valve 61 (first valve), and the flow rate control valve 43 (second valve), the ejector 50 can be bypassed during the second operation. In other words, in the second operation, as illustrated in FIG. 3, the refrigerant circulates through a compressor 11, the four-way valve 21, the heat-source-side heat exchanger 31, a second expansion valve 42, the on-off valve 61, the first expansion valve 41, the use-side heat exchanger 32, the four-way valve 21, a receiver 91, and the compressor 11 in this order. However, this circulation path does not include the ejector 50, and no refrigerant flows through the ejector 50 in the second operation. The compressor 11 is, for example, a compressor whose capacity can be changed, and includes a motor driven by an inverter.

(2-2) Details of Circuit Configuration of Air Conditioner 1

The air conditioner 1 includes, in addition to the configuration described above, a gas-liquid separator 92, a check valve 63, which is a third valve, an on-off valve 64, which is a fourth valve, a check valve 65, which is a fifth valve, an on-off valve 66, which is a sixth valve, a fifth flow path F5, and a sixth flow path F6.

The gas-liquid separator 92 has a refrigerant inlet communicating with the refrigerant outflow port of the ejector 50, a liquid refrigerant outlet from which separated liquid refrigerant flows out, and a gas refrigerant outlet from which separated gas refrigerant flows out. In the air conditioner 1, a portion from the refrigerant outflow port of the ejector 50 to the liquid refrigerant outlet of the gas-liquid separator 92 constitutes part of the third flow path F3. The liquid refrigerant outlet of the gas-liquid separator 92 communicates with an inlet of the check valve 63.

The check valve 63 is disposed in the third flow path F3. As illustrated in FIG. 1, the check valve 63 allows the liquid refrigerant to flow from the liquid refrigerant outlet of the gas-liquid separator 92 to the heat-source-side heat exchanger 31 during the first operation. Since the on-off valve 61 is closed during the first operation, the refrigerant that has flowed out of an outlet of the check valve 63 does not flow to the use-side heat exchanger 32, but flows to the heat-source-side heat exchanger 31 via the second expansion valve 42. As illustrated in FIG. 3, the check valve 63 prevents the flow of liquid refrigerant between the liquid refrigerant outlet of the gas-liquid separator 92 and the heat-source-side heat exchanger 31 during the second operation. During the second operation, since the pressure of the refrigerant at the outlet of the check valve 63 is higher than the pressure of the refrigerant at the inlet of the check valve 63 (the first flow path F1), the refrigerant does not flow through the check valve 63.

The on-off valve 64 is disposed in the fourth flow path F4. In the air conditioner 1, the on-off valve 64 is opened to open the fourth flow path F4 during the first operation. In the air conditioner 1, the on-off valve 64 is closed to close the fourth flow path F4 during the second operation.

The fifth flow path F5 is a flow path through which the gas refrigerant flows from the gas refrigerant outlet of the gas-liquid separator 92 to the suction side of the compressor 11. The sixth flow path F6 is a flow path through which the heat-source-side heat exchanger 31 and the compressor 11 communicate with each other.

The check valve 65 is disposed in the fifth flow path F5. During the first operation, the check valve 65 allows the gas refrigerant to flow from the gas refrigerant outlet of the gas-liquid separator 92 to the suction side of the compressor 11. During the second operation, the check valve 65 prevents the flow of the gas refrigerant between the gas refrigerant outlet of the gas-liquid separator 92 and the suction side of the compressor 11. An inlet of the check valve 65 communicates with the gas refrigerant outlet of the gas-liquid separator 92, and an outlet of the check valve 65 is coupled between the four-way valve 21 and the on-off valve 66. Thus, during the second operation, since the pressure of the refrigerant at the outlet of the check valve 65 is higher than the pressure of the refrigerant at the inlet of the check valve 65, the refrigerant does not flow through the check valve 65.

The on-off valve 66 is disposed in the sixth flow path F6. The on-off valve 66 prevents the flow of the refrigerant between the heat-source-side heat exchanger 31 and the compressor 11 during the first operation. The on-off valve 66 allows the flow of the refrigerant between the heat-source-side heat exchanger 31 and the compressor 11 during the second operation.

In the air conditioner 1, the gas-liquid separator 92 is used to separate the refrigerant in the gas-liquid two-phase state flowing out of the ejector 50. The air conditioner 1 can allow the gas refrigerant separated by the gas-liquid separator 92 to flow to the refrigerant suction port of the ejector 50 using the fourth flow path F4 and the fifth flow path F5. When the gas refrigerant separated by the gas-liquid separator 92 flows to the refrigerant suction port of the ejector 50, the air conditioner 1 can perform air conditioning using the ejector 50.

Figure 2:
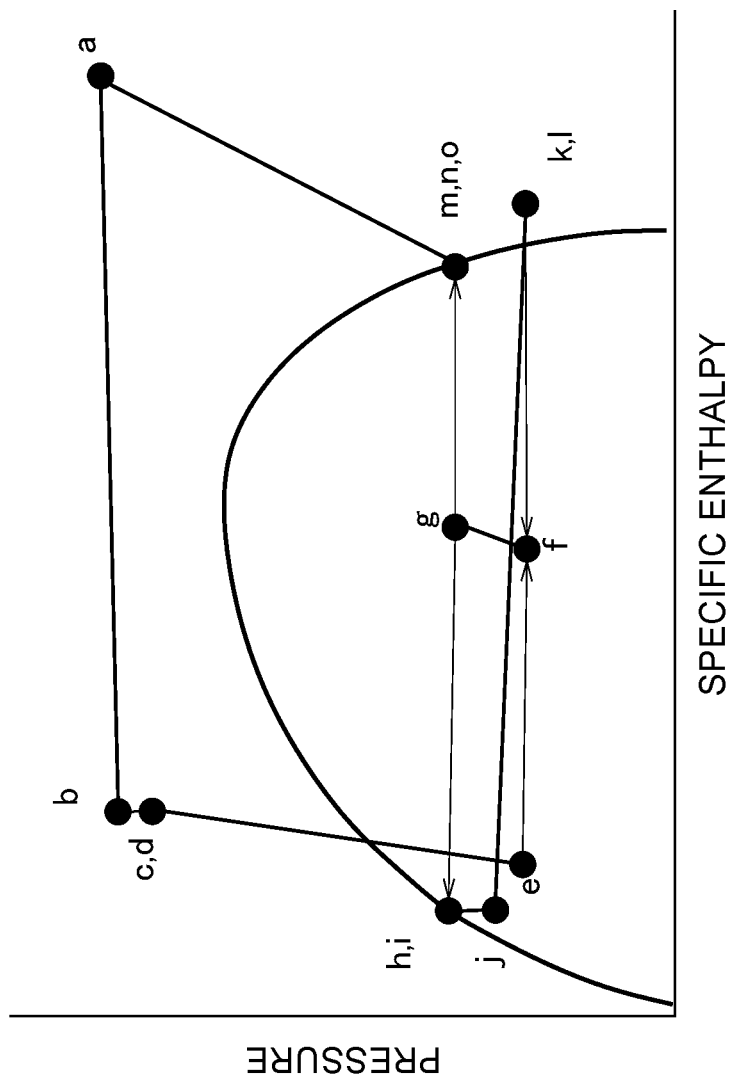
FIG. 2 is a Mollier diagram illustrating a state of refrigerant in the first operation of the air conditioner in FIG. 1.

(3) Overall Operation (3-1) Operation of Air Conditioner 1 during First Operation The operation of the air conditioner 1 during the first operation using carbon dioxide as refrigerant will be described with reference to FIG. 1 and FIG. 2. The refrigerant discharged from a discharge port of the compressor 11 (point a) is in a supercritical state. The refrigerant in the supercritical state discharged from the compressor 11 flows into the use-side heat exchanger 32 via the four-way valve 21. The refrigerant in the supercritical state radiates heat in the use-side heat exchanger 32. In the use-side heat exchanger 32, for example, heat exchange is performed between indoor air and the refrigerant, and the warmed air is used to perform indoor heating.

The refrigerant at an outflow point (point b) of the use-side heat exchanger 32 is in a high-pressure state, and the specific enthalpy thereof is smaller than that at the point a. The first expansion valve 41 and the flow rate control valve 43 are open and allow the refrigerant to pass therethrough without substantially decompressing the refrigerant. The refrigerant at an outflow point (point c) of the first expansion valve 41 and the refrigerant at an outflow point (point d) of the flow rate control valve 43 are in substantially the same state as the refrigerant at the point b.

The refrigerant that has flowed into the refrigerant inflow port of the ejector 50 from the flow rate control valve 43 is decompressed and expanded by a nozzle (not illustrated) in the ejector 50 into low-pressure refrigerant in a gas-liquid two-phase state at the nozzle (point e). At an outlet of the nozzle (point f), the refrigerant that has flowed in from the refrigerant inflow port and the low-pressure gas refrigerant sucked from the refrigerant suction port of the ejector 50 (point l) are mixed into refrigerant having a specific enthalpy between those of the refrigerant at the point e and the refrigerant at the point l. The refrigerant at the refrigerant outflow port of the ejector 50 (point g) is in a state such that the pressure is raised to be higher than that of the refrigerant at the outlet of the nozzle (point f). The refrigerant that has been raised in pressure and flowed out of the refrigerant outflow port of the ejector 50 is separated by the gas-liquid separator 92. The refrigerant separated by the gas-liquid separator 92 and flowing out of the liquid refrigerant outlet of the gas-liquid separator 92 (point h) is liquid refrigerant with a low specific enthalpy. The refrigerant passing through the check valve 63 and present between the check valve 63 and the second expansion valve 42 (point i) is in substantially the same state as the refrigerant flowing out of the liquid refrigerant outlet of the gas-liquid separator 92 (point h). In the second expansion valve 42, the refrigerant present between the check valve 63 and the second expansion valve 42 (point i) is decompressed and expanded. The refrigerant decompressed by the second expansion valve 42 and present between the second expansion valve 42 and the heat-source-side heat exchanger 31 (point j) evaporates into gas refrigerant in the heat-source-side heat exchanger 31. In the heat-source-side heat exchanger 31, for example, heat exchange is performed between outdoor air and the refrigerant. The gas refrigerant at an outflow point (point k) of the heat-source-side heat exchanger 31 is gas refrigerant with a high specific enthalpy. Since the on-off valve 64 is open, the refrigerant that has flowed out of the heat-source-side heat exchanger 31 passes through the fourth flow path F4 and is sucked into the ejector 50 from the refrigerant suction port of the ejector 50 (point l).

The refrigerant separated by the gas-liquid separator 92 and flowing out of the gas refrigerant outlet of the gas-liquid separator 92 (point m) is gas refrigerant with a high specific enthalpy. The refrigerant flowing out of the gas refrigerant outlet of the gas-liquid separator 92 (point m) is sucked in from a suction port of the compressor 11 (point o) via the check valve 65, the four-way valve 21, and the receiver 91. The state of the refrigerant present between the closed on-off valve 66 and the four-way valve 21 (point n) and the state of the refrigerant present at the suction port of the compressor 11 (point o) are substantially the same as that of the gas refrigerant at the gas refrigerant outlet of the gas-liquid separator 92 (point m).

(3-2) Operation of Air Conditioner 1 during Second Operation

The operation of the air conditioner 1 during the second operation using carbon dioxide as refrigerant will be described with reference to FIG. 3. The refrigerant discharged from the discharge port of the compressor 11 is in a supercritical state. The refrigerant in the supercritical state discharged from the compressor 11 flows into the heat-source-side heat exchanger 31 via the four-way valve 21 and the on-off valve 66. In this case, the refrigerant does not flow through the fourth flow path F4 and the fifth flow path F5 due to the closed on-off valve 64 and the check valve 65. The refrigerant in the supercritical state radiates heat in the heat-source-side heat exchanger 31. In the heat-source-side heat exchanger 31 functioning as a radiator, for example, heat exchange is performed between outdoor air and the refrigerant.

The refrigerant flowing out of the heat-source-side heat exchanger 31 is in a high-pressure state, and the specific enthalpy thereof is smaller than that before flowing into the heat-source-side heat exchanger 31. Since the second expansion valve 42 is open, the on-off valve 61 is open, and the flow rate control valve 43 is closed, all of the refrigerant that has flowed out of the heat-source-side heat exchanger 31 flows to the first expansion valve 41. The refrigerant that flows from the first expansion valve 41 to the use-side heat exchanger 32 is decompressed and expanded by the first expansion valve 41 before flowing into the use-side heat exchanger 32. The refrigerant in the gas-liquid two-phase state that has flowed into the use-side heat exchanger 32 evaporates into gas refrigerant in the use-side heat exchanger 32. In the use-side heat exchanger 32 functioning as an evaporator, for example, heat exchange is performed between indoor air and the refrigerant, and the cooled air is used to perform indoor cooling. The gas refrigerant that has flowed out of the use-side heat exchanger 32 is sucked in from the suction port of the compressor 11 via the four-way valve 21 and the receiver 91.

(3-3) Operation of Air Conditioner 1 during Third Operation

As illustrated in FIG. 4, during a third operation, the refrigerant discharged from the discharge port of the compressor 11 is sucked in from the suction port of the compressor 11 via the four-way valve 21, the use-side heat exchanger 32, the first expansion valve 41, the on-off valve 61, the second expansion valve 42, the heat-source-side heat exchanger 31, the on-off valve 66, the four-way valve 21, and the receiver 91. During the third operation, the flow rate control valve 43 and the on-off valve 64 are closed, and thus the refrigerant does not flow through the ejector 50. In the third operation, the refrigerant in the supercritical state discharged from the compressor 11 is cooled in the use-side heat exchanger 32 functioning as a radiator. The first expansion valve 41 remains fully opened and does not decompress the refrigerant. The refrigerant cooled in the use-side heat exchanger 32 passes through the first expansion valve 41 and is decompressed and expanded by the second expansion valve 42 to enter a gas-liquid two-phase state. The refrigerant in the gas-liquid two-phase state is warmed in the heat-source-side heat exchanger 31 functioning as an evaporator and becomes gas refrigerant. The gas refrigerant is sucked into the compressor 11 through the receiver 91. In the third operation, the air conditioner 1 performs indoor heating by, for example, heat exchange between indoor air and refrigerant in the use-side heat exchanger 32.

(3-4) Control of Air Conditioner 1

Figure 5:
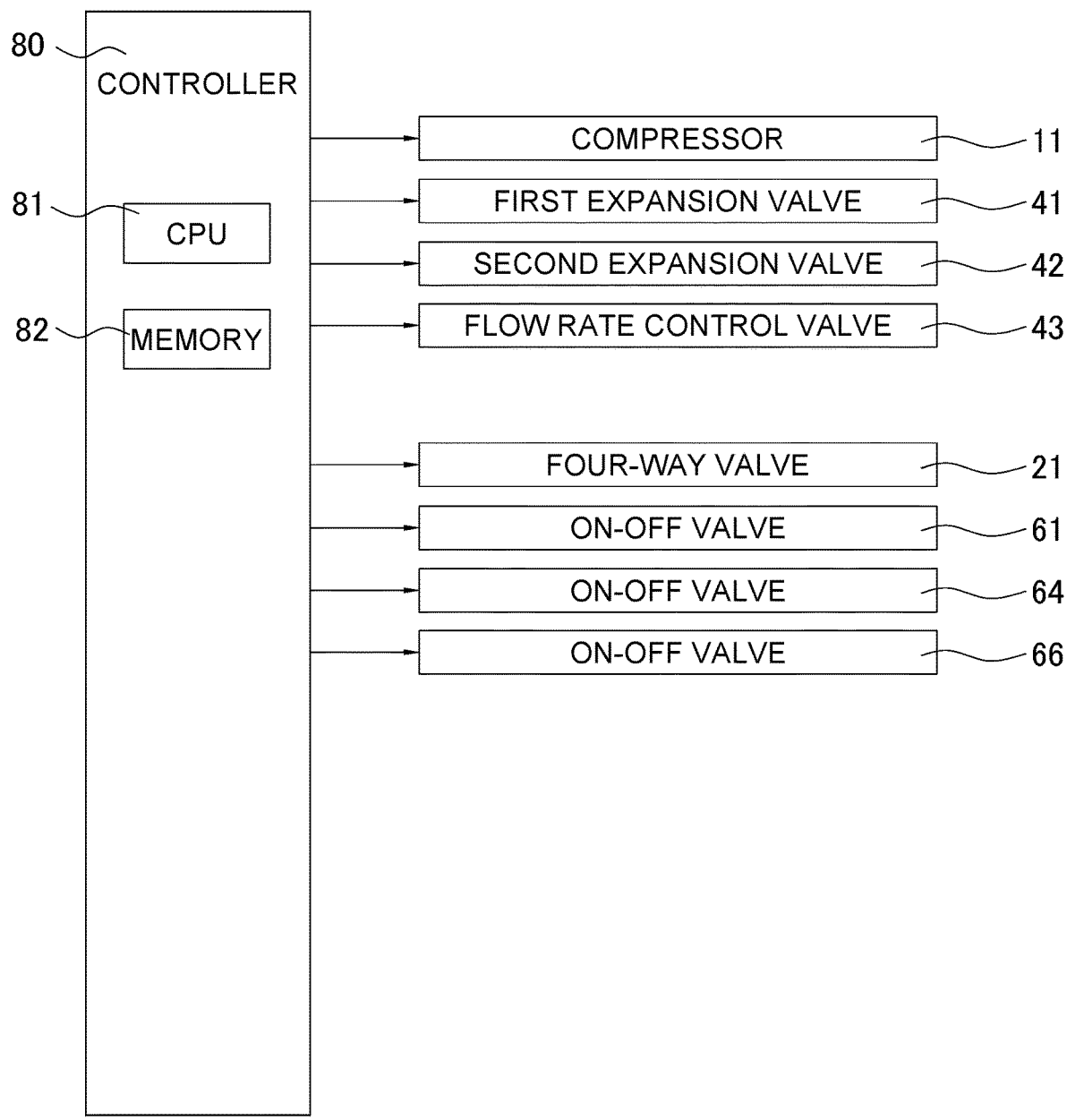
FIG. 5 is a block diagram for explaining a controller of the air conditioner in FIG. 1.

The air conditioner 1 according to the first embodiment includes a controller 80 illustrated in FIG. 5 to cause the internal devices to perform the operation described above. The controller 80 is implemented by a computer, for example. The computer includes, for example, a control and arithmetic unit and a memory. The control and arithmetic unit can be implemented using a processor. The controller 80 in FIG. 5 includes a CPU 81 serving as a processor. The control and arithmetic unit reads, for example, a program stored in the memory and performs predetermined image processing, arithmetic processing, or sequence processing in accordance with the program. Further, for example, the control and arithmetic unit can write an arithmetic result to the memory or read information stored in the memory in accordance with the program. The memory can be used as a database. The controller 80 includes a memory 82 serving as a memory.

The controller 80 controls the compressor 11, the first expansion valve 41, the second expansion valve 42, the flow rate control valve 43, the four-way valve 21, and the on-off valves 61, 64, and 66. The three valves, namely, the on-off valves 61, 64, and 66, can be each implemented using, for example, an electromagnetic valve that switches between an open state and a closed state in accordance with a signal from the controller 80. The first expansion valve 41, the second expansion valve 42, and the flow rate control valve 43 can be each implemented using, for example, an electrically powered valve whose opening degree can be changed in response to a pulse signal.

(3-5) Selection between First Operation and Third Operation

In the air conditioner 1, the controller 80 selects to perform the first operation using the ejector 50 or the third operation not using the ejector 50 by determining whether the following conditions are satisfied. At the start time, for example, when a first condition, a second condition, and a third condition are satisfied, the first operation using the ejector 50 is performed. The first condition is a condition that a target value (high-pressure target value) of the pressure of the refrigerant discharged from the compressor 11 is within a first predetermined range. The second condition is a condition that a target value (low-pressure target value) of the pressure of the refrigerant sucked into the compressor 11 is within a second predetermined range. The third condition is a condition that the air conditioning capacity (required capacity) required for the compression mechanism 10 is greater than or equal to a predetermined value. For example, the third condition is set such that the cooling capacity required for cooling is greater than or equal to 2 kW, and the third condition is set such that the heating capacity required for heating is greater than or equal to 3 kW. When the pressure difference between the high-pressure target value and the low-pressure target value is small and it is difficult for the ejector 50 to sufficiently recover energy, efficiency deteriorates due to pressure loss in the ejector 50. When the high-pressure target value is within the first predetermined range and the low-pressure target value is within the second predetermined range, the pressure difference therebetween is a pressure at which it can be expected that the ejector 50 will improve the operation efficiency of the air conditioner 1. Accordingly, satisfaction of the first condition and the second condition may be replaced with satisfaction of a condition that the pressure difference between the high-pressure target value and the low-pressure target value is greater than or equal to a predetermined value.

The air conditioner 1 may be configured to stop the use of the ejector 50, for example, if the first condition, the second condition, or the third condition is not satisfied when the air conditioner 1 is in operation. The term "in operation" refers to the situation where a predetermined period of time has elapsed since the start of operation. The operation of the air conditioner 1 is stable after the predetermined period of time has elapsed since the start of operation. Further, the air conditioner 1 may be configured to stop the use of the ejector 50 when a sixth condition that the refrigerant accumulates in the gas-liquid separator 92 is satisfied. The controller 80 determines that the sixth condition is satisfied, for example, when the following three phenomena simultaneously occur: a decrease in the pressure of the refrigerant discharged from the compressor 11, a decrease in the pressure of the refrigerant sucked into the compressor 11, and an increase in the degree of superheating of the refrigerant sucked into the compressor 11. The air conditioner 1 may be configured such that when the air conditioner 1 is in operation, the first condition, the second condition, and the third condition use the ejector 50 that is in stop.

Second Embodiment (4) Overview of Configuration

Figure 6:
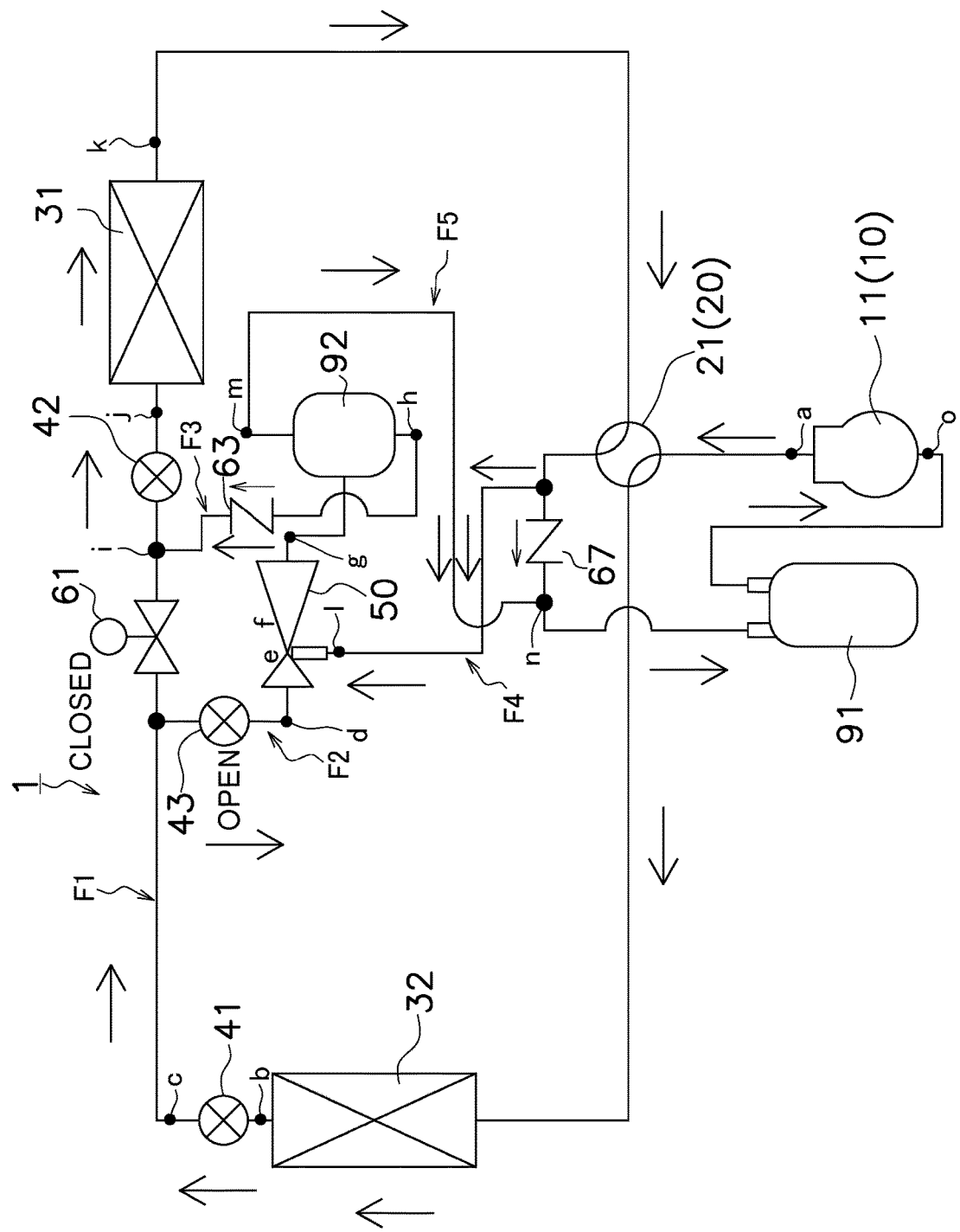
FIG. 6 is a circuit diagram for explaining a first operation of an air conditioner according to a second embodiment.
Figure 7:
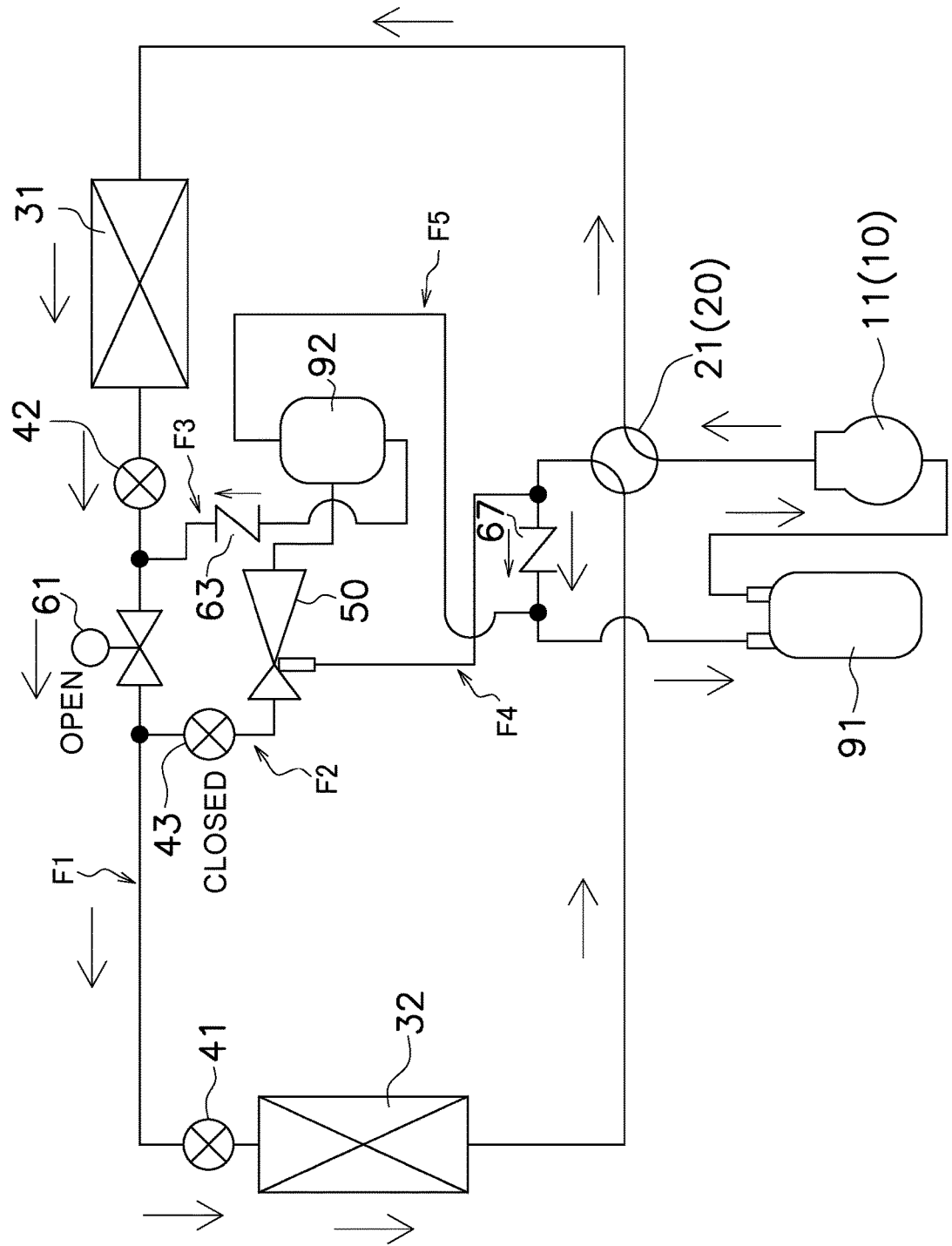
FIG. 7 is a circuit diagram for explaining a second operation of the air conditioner according to the second embodiment.
Figure 8:
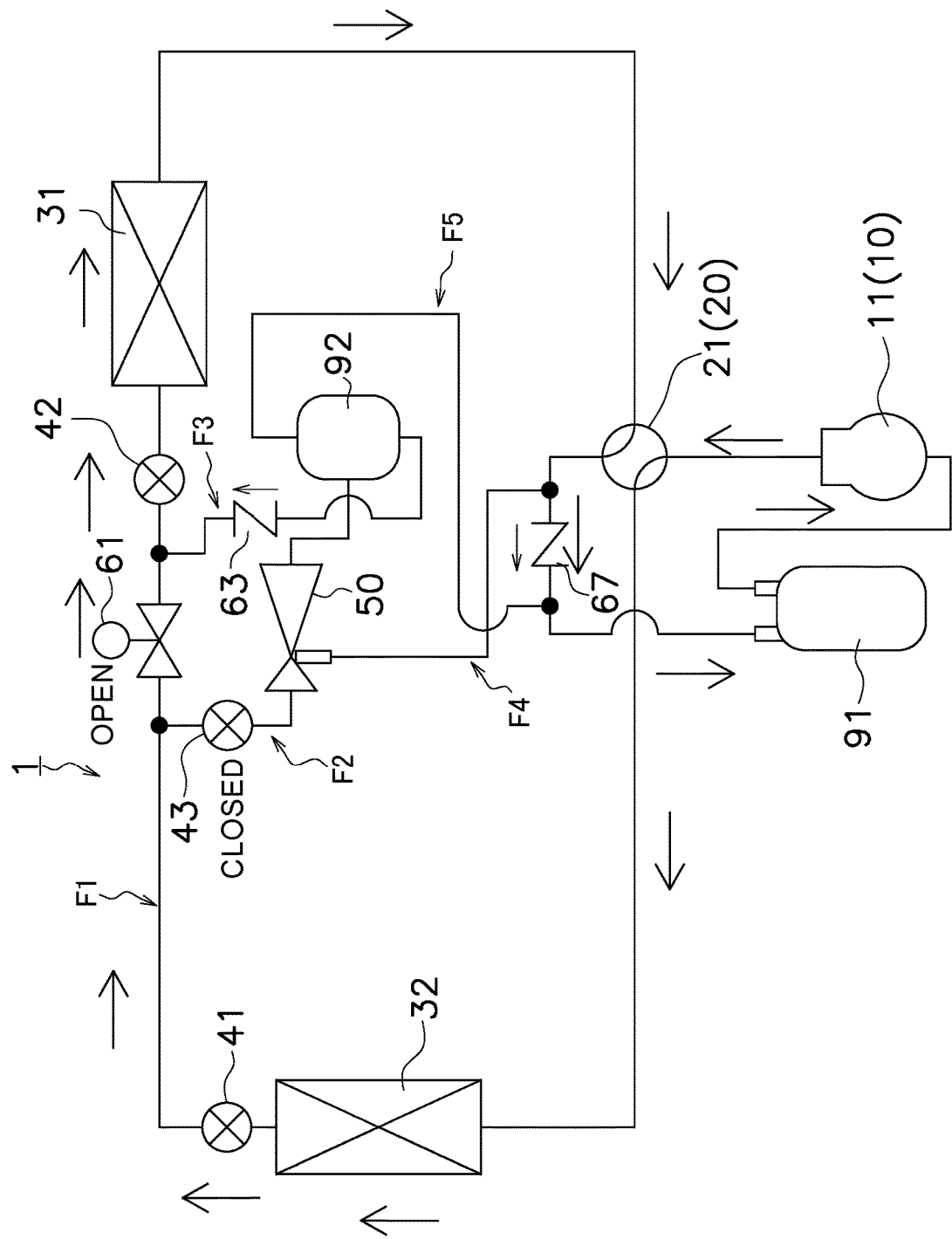
FIG. 8 is a circuit diagram for explaining a third operation of the air conditioner according to the second embodiment.

As illustrated in FIG. 6, FIG. 7 and FIG. 8, an overview of the configuration of an air conditioner 1 according to a second embodiment is the same as the overview of the configuration according to the first embodiment described in (1) described above. Accordingly, a description of the overview of the configuration of the air conditioner 1 according to the second embodiment will be omitted here. FIG. 6 illustrates the air conditioner 1 in which the first operation is being performed, FIG. 7 illustrates the air conditioner 1 in which the second operation is being performed, and FIG. 8 illustrates the air conditioner 1 in which the third operation is being performed.

(5) Detailed Configuration (5-1) Overview of Circuit Configuration of Air Conditioner 1

As illustrated in FIG. 6, FIG. 7, and FIG. 8, an overview of the circuit configuration of the air conditioner 1 according to the second embodiment is the same as the overview of the circuit configuration of the air conditioner 1 described in (2-1) described above. Accordingly, a description of the overview of the circuit configuration of the air conditioner 1 according to the second embodiment will be omitted here.

(5-2) Details of Circuit Configuration of Air Conditioner 1

The air conditioner 1 according to the second embodiment includes, in addition to the configuration described above, the gas-liquid separator 92, the check valve 63, which is a third valve, a check valve 67, which is a seventh valve, and the fifth flow path F5. The switching mechanism 20 is the four-way valve 21 having a first port communicating with the discharge side of the compressor 11, a second port communicating with the heat-source-side heat exchanger 31, a third port, and a fourth port communicating with the use-side heat exchanger 32. In the first operation, the first port and the fourth port of the four-way valve 21 communicate with each other, and the second port and the third port of the four-way valve 21 communicate with each other. In the second operation, the first port and the second port of the four-way valve 21 communicate with each other, and the third port and the fourth port of the four-way valve 21 communicate with each other.

The gas-liquid separator 92 has a refrigerant inlet communicating with the refrigerant outflow port of the ejector 50, a liquid refrigerant outlet from which separated liquid refrigerant flows out, and a gas refrigerant outlet from which separated gas refrigerant flows out. In the air conditioner 1, a portion from the refrigerant outflow port of the ejector 50 to the liquid refrigerant outlet of the gas-liquid separator 92 constitutes part of the third flow path F3. The liquid refrigerant outlet of the gas-liquid separator 92 communicates with the inlet of the check valve 63.

The check valve 63 is disposed in the third flow path F3. As illustrated in FIG. 6, the check valve 63 allows the liquid refrigerant to flow from the liquid refrigerant outlet of the gas-liquid separator 92 to the heat-source-side heat exchanger 31 during the first operation. Since the on-off valve 61 is closed, the refrigerant that has flowed out of the outlet of the check valve 63 does not flow to the use-side heat exchanger 32, but flows to the heat-source-side heat exchanger 31 via the second expansion valve 42. As illustrated in FIG. 7, the check valve 63 prevents the liquid refrigerant from flowing between the liquid refrigerant outlet of the gas-liquid separator 92 and the heat-source-side heat exchanger 31 during the second operation. During the second operation, since the pressure of the refrigerant at the outlet of the check valve 63 is higher than the pressure of the refrigerant at the inlet of the check valve 63, the refrigerant does not flow through the check valve 63.

The fifth flow path F5 is a flow path through which the gas refrigerant flows from the gas refrigerant outlet of the gas-liquid separator 92 to the suction side of the compressor 11.

The check valve 67, which is a seventh valve, prevents refrigerant from flowing during the first operation and allows refrigerant to flow during the second operation. The check valve 67 has a first end communicating with the third port of the four-way valve 21 and a second end communicating with the suction side of the compressor 11 through the receiver 91. The refrigerant suction port of the ejector 50 is coupled between the first end of the check valve 67 and the third port of the four-way valve 21. The gas refrigerant outlet of the gas-liquid separator 92 is coupled between the second end of the check valve 67 and the suction side of the compressor 11. More specifically, the gas refrigerant outlet of the gas-liquid separator 92 is coupled between the second end of the check valve 67 and an inflow port of the receiver 91.

In the air conditioner 1, the gas-liquid separator 92 is used to separate the refrigerant in the gas-liquid two-phase state flowing out of the ejector 50. During the first operation, the air conditioner 1 can allow the gas refrigerant separated by the gas-liquid separator 92 to flow to the refrigerant suction port of the ejector 50 using the fourth flow path F4 and the fifth flow path F5. When the liquid refrigerant separated by the gas-liquid separator 92 flows to the refrigerant suction port of the ejector 50, the air conditioner 1 can perform air conditioning using the ejector 50. Further, the air conditioner 1 can perform air conditioning not using the ejector 50 without causing the gas refrigerant separated by the gas-liquid separator 92 to flow.

(6) Overall Operation (6-1) Operation of Air Conditioner 1 during First Operation The operation of the air conditioner 1 according to the second embodiment illustrated in FIG. 6 during the first operation is different from the operation of the air conditioner 1 according to the first embodiment during the first operation in the operation thereof downstream of the gas refrigerant outlet of the gas-liquid separator 92 (point m) and the operation thereof downstream of the heat-source-side heat exchanger 31. Accordingly, the operations of the air conditioner 1 according to the second embodiment during the first operation on downstream of the gas refrigerant outlet of the gas-liquid separator 92 (point m) and on downstream of the heat-source-side heat exchanger 31 will be described. A Mollier diagram illustrated in FIG. 2 is also applicable to the air conditioner 1 according to the second embodiment except the different operations.

The refrigerant flowing out of the gas refrigerant outlet of the gas-liquid separator 92 (point m) is sucked in from the suction port of the compressor 11 (point o) via the receiver 91. The state of the refrigerant present between the check valve 67 and the receiver 91 (point n) and the state of the refrigerant present at the suction port of the compressor 11

(point o) are substantially the same as that of the gas refrigerant at the gas refrigerant outlet of the gas-liquid separator 92 (point m).

The refrigerant at the outflow point of the heat-source-side heat exchanger 31 (point k) is gas refrigerant with a high specific enthalpy. The refrigerant that has flowed out of the heat-source-side heat exchanger 31 passes through the four-way valve 21 and the fourth flow path F4 and is sucked into the ejector 50 from the refrigerant suction port of the ejector 50 (point 1). At this time, since the pressure at the inlet of the check valve 67 (point n) is lower than the pressure at the outlet (point k), the check valve 67 does not allow the refrigerant to flow therethrough.

(6-2) Operation of Air Conditioner 1 during Second Operation

The air conditioner 1 according to the second embodiment illustrated in FIG. 7 performs the same refrigeration cycle as the vapor compression refrigeration cycle of the air conditioner 1 according to the first embodiment described in (3-2), with refrigerant circulating through the compressor 11, the heat-source-side heat exchanger 31 functioning as a radiator, the first expansion valve 41, and the use-side heat exchanger 32 functioning as an evaporator. The operation of the air conditioner 1 according to the second embodiment during the second operation is different from the operation of the air conditioner 1 according to the first embodiment during the second operation in the operation thereof on the downstream side of the four-way valve 21.

In the air conditioner 1 according to the first embodiment illustrated in FIG. 3, the refrigerant that has flowed out of the use-side heat exchanger 32 flows into the receiver 91 through the four-way valve 21. In the air conditioner 1 according to the second embodiment illustrated in FIG. 7, in contrast, the refrigerant that has flowed out of the use-side heat exchanger 32 flows into the receiver 91 through the four-way valve 21 and the check valve 67. The fourth flow path F4 communicates between the check valve 67 and the four-way valve 21. The fifth flow path F5 communicates between the check valve 67 and the receiver 91. However, the flow rate control valve 43 is fully closed. Further, the pressure in the first flow path F1 at the outlet of the check valve 63 remains higher than the pressure of the refrigerant in the gas-liquid separator 92, and the check valve 63 prevents the refrigerant from flowing through the third flow path F3. Accordingly, the ejector 50 is not in a state of sucking the refrigerant from the refrigerant suction port, and thus the refrigerant does not flow from between the check valve 67 and the four-way valve 21 toward the refrigerant suction port of the ejector 50. In addition, the low-pressure refrigerant between the receiver 91 and the check valve 67 does not flow toward the gas-liquid separator 92 through the fifth flow path F5.

(6-3) Operation of Air Conditioner 1 during Third Operation

In the air conditioner 1 according to the second embodiment illustrated in FIG. 8, during the third operation, the refrigerant discharged from the discharge port of the compressor 11 is sucked in from the suction port of the compressor 11 via the four-way valve 21, the use-side heat exchanger 32, the first expansion valve 41, the on-off valve 61, the second expansion valve 42, the heat-source-side heat exchanger 31, the four-way valve 21, the check valve 67, and the receiver 91. During the third operation, the flow rate control valve 43 is closed, and thus the refrigerant does not flow through the ejector 50. The air conditioner 1 according to the second embodiment performs the same refrigeration cycle as the vapor compression refrigeration cycle of the air conditioner 1 described in (3-3), with refrigerant circulating through the compressor 11, the use-side heat exchanger 32 functioning as a radiator, the second expansion valve 42, and the heat-source-side heat exchanger 31 functioning as an evaporator. In the third operation, the air conditioner 1 performs indoor heating by, for example, heat exchange between indoor air and refrigerant in the use-side heat exchanger 32.

(6-4) Control of Air Conditioner 1

Figure 9:
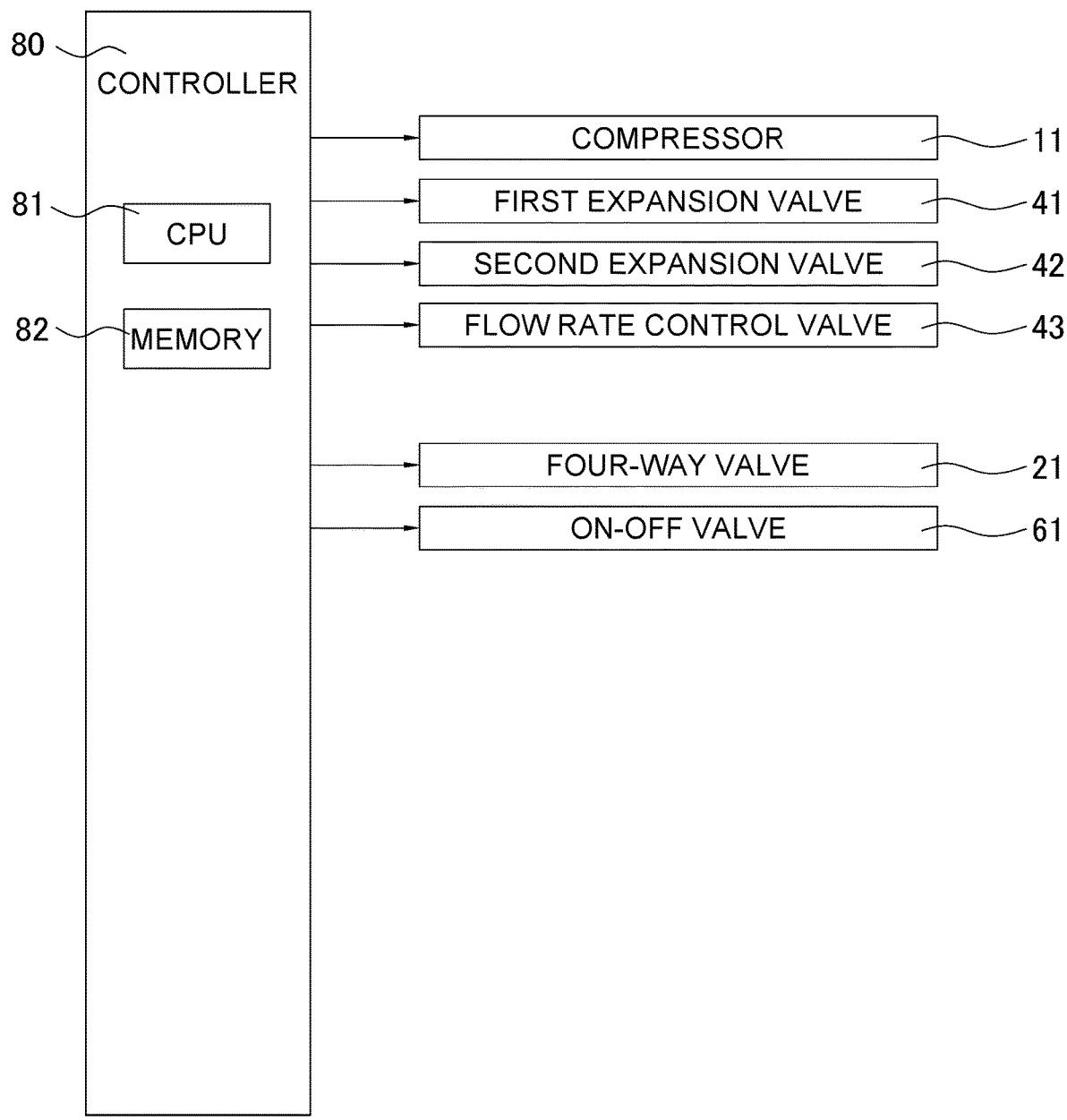
FIG. 9 is a block diagram for explaining a controller of the air conditioner in FIG. 6.

The air conditioner 1 according to the second embodiment includes a controller 80 illustrated in FIG. 9 to cause the internal devices to perform the operation described above. The controller 80 controls the compressor 11, the first expansion valve 41, the second expansion valve 42, the flow rate control valve 43, the four-way valve 21, and the on-off valve 61.

(6-5) Selection between First Operation and Third Operation

In the air conditioner 1 according to the second embodiment, the controller 80 selects to perform the first operation using the ejector 50 or the third operation not using the ejector 50. The selection between the first operation and the third operation of the air conditioner 1 according to the second embodiment can be performed in a way similar to the selection between the first operation and the third operation of the air conditioner 1 according to the first embodiment described in (3-5). Thus, a detailed description of the selection between the first operation and the third operation of the air conditioner 1 according to the second embodiment will be omitted here.

Third Embodiment (7) Overview of Configuration

Figure 10:
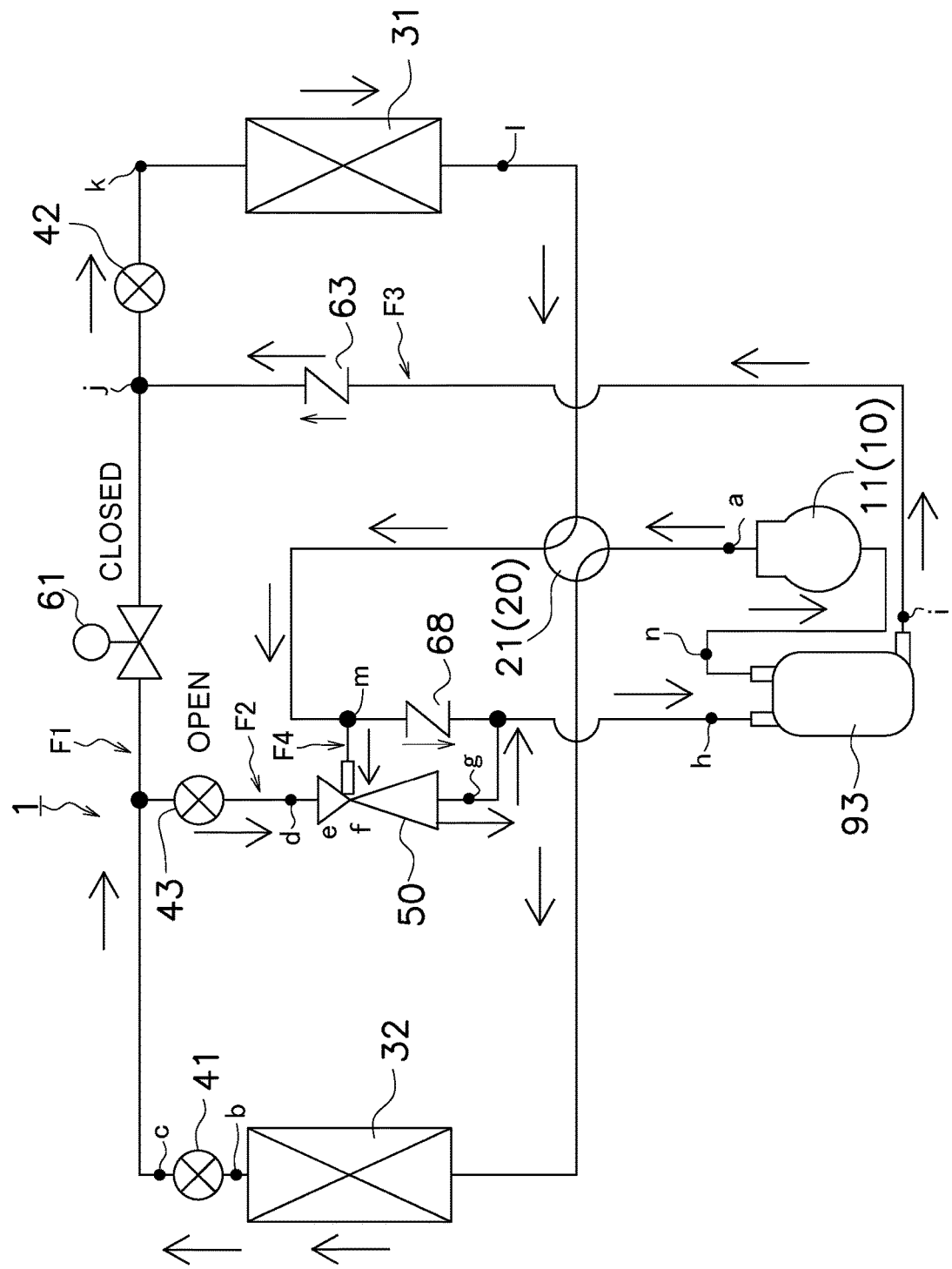
FIG. 10 is a circuit diagram for explaining a first operation of an air conditioner according to a third embodiment.
Figure 12:
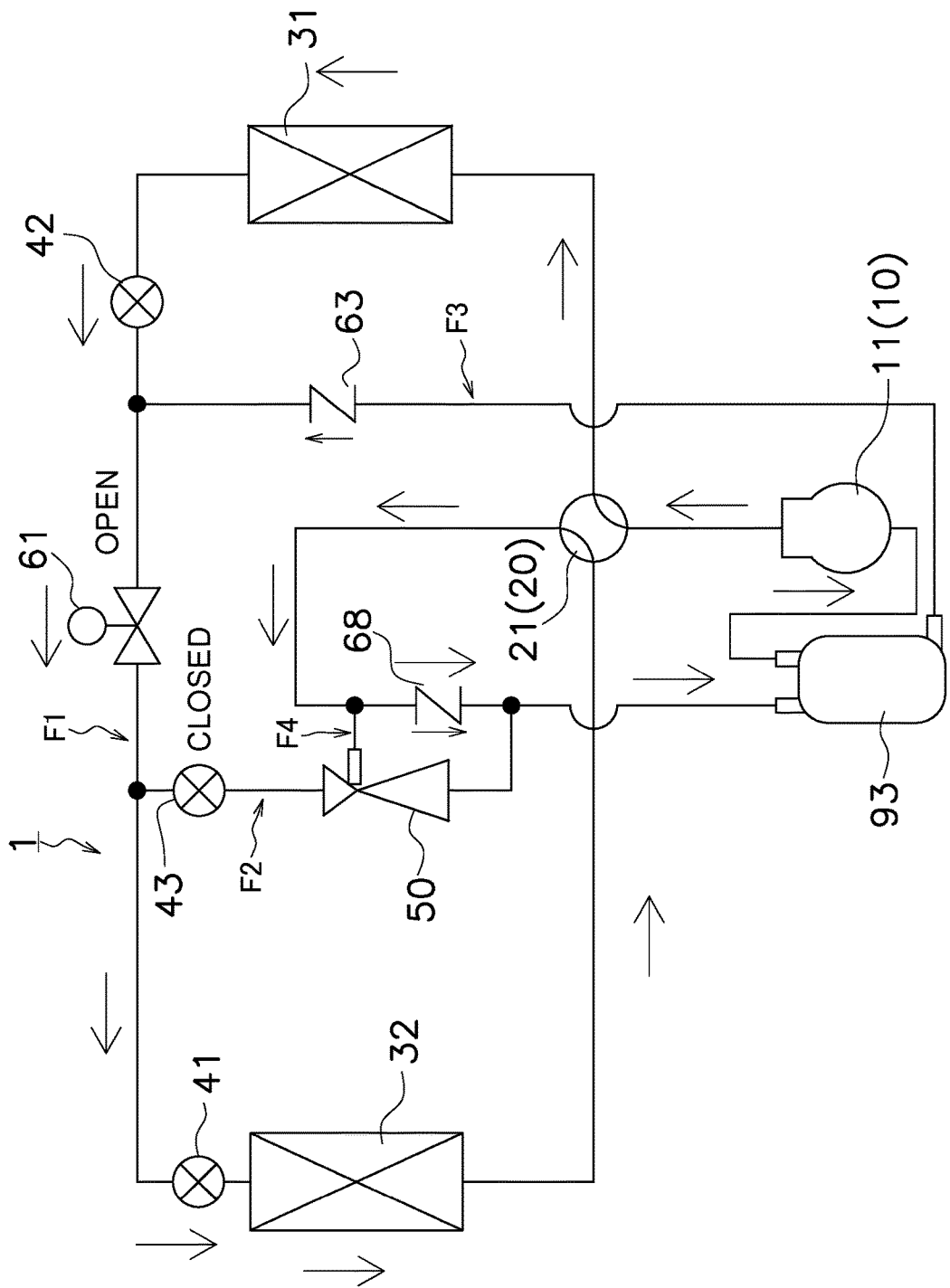
FIG. 12 is a circuit diagram for explaining a second operation of the air conditioner according to the third embodiment.
Figure 13:
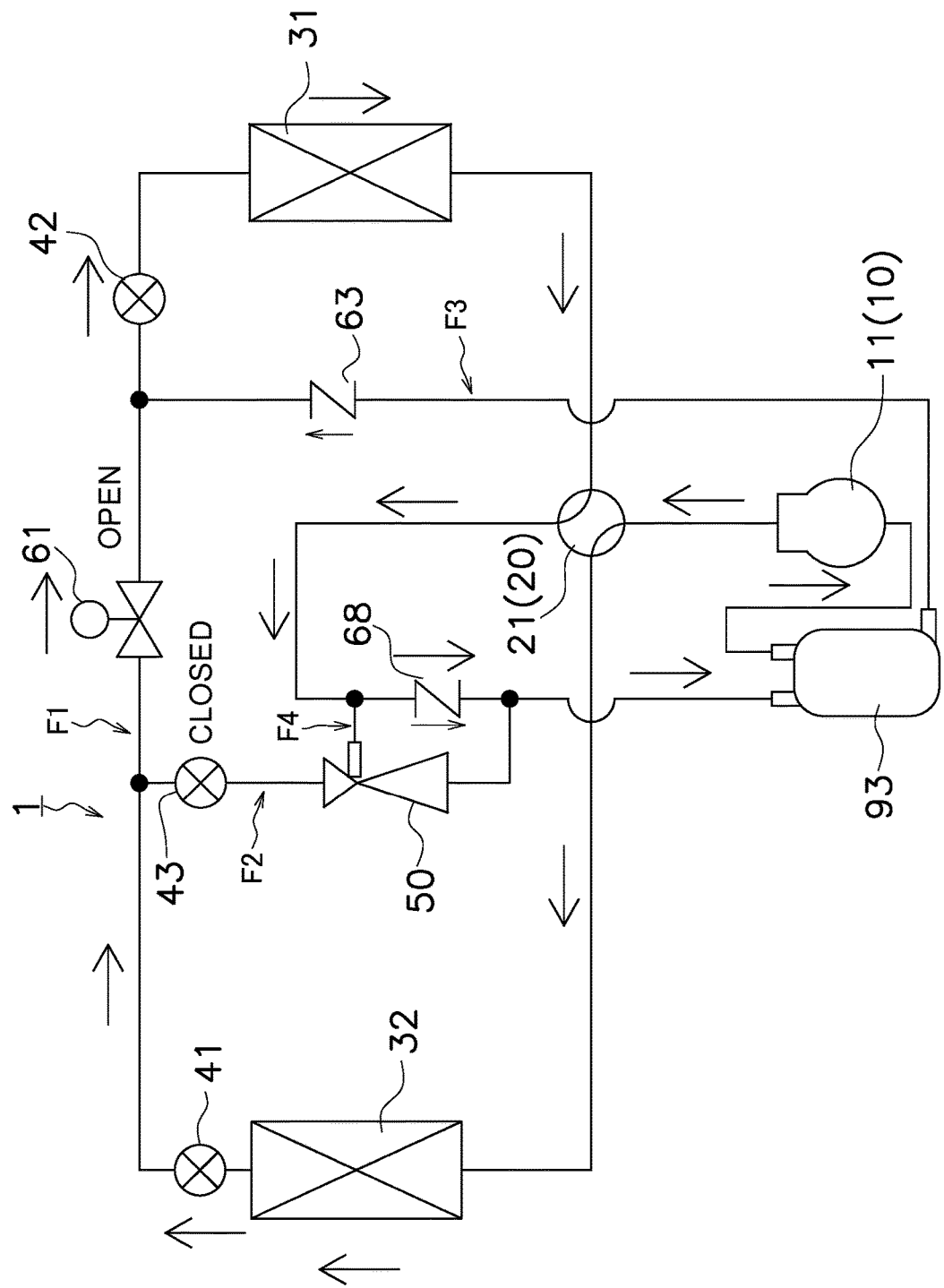
FIG. 13 is a circuit diagram for explaining a third operation of the air conditioner according to the third embodiment.

As illustrated in FIG. 10, FIG. 12 and FIG. 13, an overview of the configuration of an air conditioner 1 according to a third embodiment is the same as the overview of the configuration according to the first embodiment described in (1) described above. Accordingly, a description of the overview of the configuration of the air conditioner 1 according to the third embodiment will be omitted here. FIG. 10 illustrates the air conditioner 1 in which the first operation is being performed, FIG. 12 illustrates the air conditioner 1 in which the second operation is being performed, and FIG. 13 illustrates the air conditioner 1 in which the third operation is being performed.

(8) Detailed Configuration (8-1) Overview of Circuit Configuration of Air Conditioner 1

As illustrated in FIG. 10, FIG. 12 and FIG. 13, an overview of the circuit configuration of the air conditioner 1 according to the third embodiment is the same as the overview of the circuit configuration of the air conditioner 1 described in (2-1) described above. Accordingly, a description of the overview of the circuit configuration of the air conditioner 1 according to the third embodiment will be omitted here.

(8-2) Details of Circuit Configuration of Air Conditioner 1

The air conditioner 1 according to the third embodiment includes, in addition to the configuration described above, an accumulator 93, the check valve 63, which is a third valve, and a check valve 68, which is an eighth valve. The switching mechanism 20 is the four-way valve 21 having a first port communicating with the discharge side of the compressor 11, a second port communicating with the heat-source-side heat exchanger 31, a third port, and a fourth port communicating with the use-side heat exchanger 32. In the first operation, the first port and the fourth port of the four-way valve 21 communicate with each other, and the second port and the third port of the four-way valve 21 communicate with each other. In the second operation, the first port and the second port of the four-way valve 21 communicate with each other, and the third port and the fourth port of the four-way valve 21 communicate with each other.

The accumulator 93 has a refrigerant inlet communicating with the refrigerant outflow port of the ejector 50, a liquid refrigerant outlet from which separated liquid refrigerant flows out, and a gas refrigerant outlet from which separated gas refrigerant flows out. In the air conditioner 1, a portion from the refrigerant outflow port of the ejector 50 to the liquid refrigerant outlet of the accumulator 93 constitutes part of the third flow path F3. The liquid refrigerant outlet of the accumulator 93 communicates with the inlet of the check valve 63.

The check valve 63 is disposed in the third flow path F3. As illustrated in FIG. 10, the check valve 63 allows the liquid refrigerant to flow from the liquid refrigerant outlet of the accumulator 93 to the heat-source-side heat exchanger 31 during the first operation. Since the on-off valve 61 is closed, the refrigerant that has flowed out of the outlet of the check valve 63 does not flow to the use-side heat exchanger 32, but flows to the heat-source-side heat exchanger 31 via the second expansion valve 42. As illustrated in FIG. 12, the check valve 63 prevents the liquid refrigerant from flowing between the liquid refrigerant outlet of the accumulator 93 and the heat-source-side heat exchanger 31 during the second operation. During the second operation, since the pressure of the refrigerant at the outlet of the check valve 63 is higher than the pressure of the refrigerant at the inlet of the check valve 63 (the first flow path F1), the refrigerant does not flow through the check valve 63.

The check valve 68, which is an eighth valve, prevents refrigerant from flowing during the first operation and allows refrigerant to flow during the second operation. The check valve 68 has a first end communicating with the third port of the four-way valve 21 and a second end communicating with the suction side of the compressor 11 through the accumulator 93. The refrigerant suction port of the ejector 50 is coupled between the first end of the check valve 68 and the third port of the four-way valve 21. The gas refrigerant outlet of the accumulator 93 communicates with the suction port of the compressor 11.

In the air conditioner 1 according to the third embodiment, the accumulator 93 is used to separate the refrigerant in the gas-liquid two-phase state flowing out of the ejector 50. When the liquid refrigerant separated by the accumulator 93 flows to the heat-source-side heat exchanger 31 and the gas refrigerant evaporated in the heat-source-side heat exchanger 31 flows to the refrigerant suction port of the ejector 50, the air conditioner 1 can perform air conditioning using the ejector 50.

Figure 11:
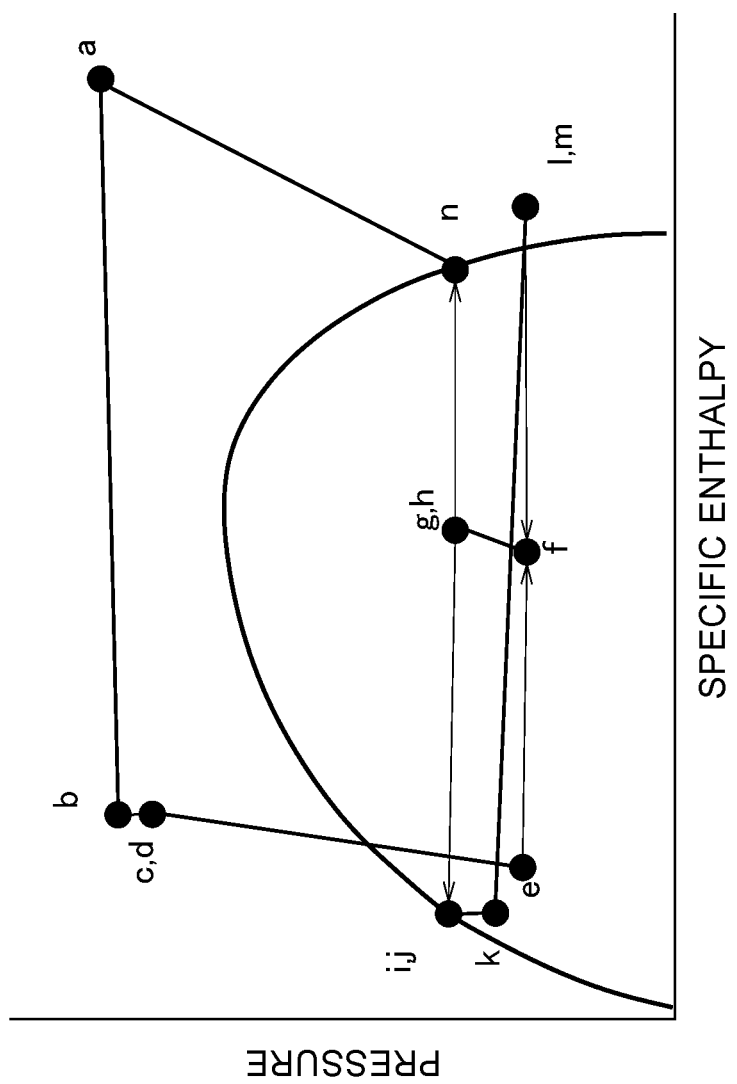
FIG. 11 is a Mollier diagram illustrating a state of refrigerant in the first operation of the air conditioner in FIG. 10.

(9) Overall Operation (9-1) Operation of Air Conditioner 1 during First Operation The operation of the air conditioner 1 during the first operation using carbon dioxide as refrigerant will be described with reference to FIG. 10 and FIG. 11. The refrigerant discharged from the discharge port of the compressor 11 (point a) is in a supercritical state. The refrigerant in the supercritical state discharged from the compressor 11 flows into the use-side heat exchanger 32 via the four-way valve 21. The refrigerant in the supercritical state radiates heat in the use-side heat exchanger 32. In the use-side heat exchanger 32, for example, heat exchange is performed between indoor air and the refrigerant, and the warmed air is used to perform indoor heating.

The refrigerant at the outflow point (point b) of the use-side heat exchanger 32 is in a high-pressure state, and the specific enthalpy thereof is smaller than that at the point a. The first expansion valve 41 and the flow rate control valve 43 are open and allow the refrigerant to pass therethrough without substantially decompressing the refrigerant. The refrigerant at the outflow point (point c) of the first expansion valve 41 and the refrigerant at the outflow point (point d) of the flow rate control valve 43 are in substantially the same state as the refrigerant at the point b.

The refrigerant that has flowed into the refrigerant inflow port of the ejector 50 from the flow rate control valve 43 is decompressed and expanded by a nozzle (not illustrated) in the ejector 50 into low-pressure refrigerant in a gas-liquid two-phase state at the nozzle (point e). At the outlet of the nozzle (point f), the refrigerant that has flowed in from the refrigerant inflow port and the low-pressure gas refrigerant sucked from the refrigerant suction port of the ejector 50 (point m) are mixed into refrigerant having a specific enthalpy between those of the refrigerant at the point e and the refrigerant at the point m. The refrigerant at the refrigerant outflow port of the ejector 50 (point g) is in a state such that the pressure is raised to be higher than that of the refrigerant at the outlet of the nozzle (point f). The refrigerant that has been raised in pressure and flowed out of the refrigerant outflow port of the ejector 50 is separated by the accumulator 93. As illustrated in FIG. 11, the state of the refrigerant at the refrigerant outflow port of the ejector 50 (point g) is the same as the state of the refrigerant at the inflow port of the accumulator 93 (point h). The refrigerant separated by the accumulator 93 and flowing out of the liquid refrigerant outlet of the accumulator 93 (point i) is liquid refrigerant with a low specific enthalpy. The refrigerant passing through the check valve 63 and present between the check valve 63 and the second expansion valve 42 (point j) is in substantially the same state as the refrigerant flowing out of the liquid refrigerant outlet of the accumulator 93 (point i). In the second expansion valve 42, the refrigerant present between the check valve 63 and the second expansion valve 42 (point j) is decompressed and expanded. The refrigerant decompressed by the second expansion valve 42 and present between the second expansion valve 42 and the heat-source-side heat exchanger 31 (point k) evaporates into gas refrigerant in the heat-source-side heat exchanger 31. In the heat-source-side heat exchanger 31, for example, heat exchange is performed between outdoor air and the refrigerant. The gas refrigerant at the outflow point of the heat-source-side heat exchanger 31 (point l) is gas refrigerant with a high specific enthalpy. Since the on-off valve 61 is open, the refrigerant that has flowed out of the heat-source-side heat exchanger 31 passes through the fourth flow path F4 and is sucked into the ejector 50 from the refrigerant suction port of the ejector 50 (point m).

The refrigerant separated by the accumulator 93 and flowing out of the gas refrigerant outlet of the accumulator 93 (point n) is gas refrigerant with a high specific enthalpy. The refrigerant flowing out of the gas refrigerant outlet of the accumulator 93 (point n) is sucked in from the suction port of the compressor 11.

(9-2) Operation of Air Conditioner 1 during Second Operation

The air conditioner 1 according to the third embodiment illustrated in FIG. 12 performs the same refrigeration cycle as the vapor compression refrigeration cycle of the air conditioner 1 according to the first embodiment described in (3-2), with refrigerant circulating through the compressor 11, the heat-source-side heat exchanger 31 functioning as a radiator, the first expansion valve 41, and the use-side heat exchanger 32 functioning as an evaporator. The operation of the air conditioner 1 according to the third embodiment during the second operation is different from the operation of the air conditioner 1 according to the first embodiment during the second operation in the operation thereof on the downstream side of the four-way valve 21.

In the air conditioner 1 according to the first embodiment illustrated in FIG. 3, the refrigerant that has flowed out of the use-side heat exchanger 32 flows into the receiver 91 through the four-way valve 21. In the air conditioner 1 according to the third embodiment illustrated in FIG. 12, in contrast, the refrigerant that has flowed out of the use-side heat exchanger 32 flows into the accumulator 93 through the four-way valve 21 and the check valve 68. The fourth flow path F4 communicates between the check valve 68 and the four-way valve 21. The refrigerant outflow port of the ejector 50 communicates between the check valve 68 and the accumulator 93. However, the flow rate control valve 43 is fully closed. Further, the pressure in the first flow path F1 at the outlet of the check valve 63 remains higher than the pressure of the refrigerant in the accumulator 93, and the check valve 63 prevents the refrigerant from flowing through the third flow path F3. Accordingly, the ejector 50 is not in a state of sucking the refrigerant from the refrigerant suction port, and thus the refrigerant does not flow from between the check valve 68 and the four-way valve 21 toward the refrigerant suction port and the refrigerant outflow port of the ejector 50.

(9-3) Operation of Air Conditioner 1 during Third Operation

In the air conditioner 1 according to the third embodiment illustrated in FIG. 13, during the third operation, the refrigerant discharged from the discharge port of the compressor 11 is sucked in from the suction port of the compressor 11 via the four-way valve 21, the use-side heat exchanger 32, the first expansion valve 41, the on-off valve 61, the second expansion valve 42, the heat-source-side heat exchanger 31, the four-way valve 21, the check valve 68, and the accumulator 93. During the third operation, the flow rate control valve 43 is closed, and thus the refrigerant does not flow through the ejector 50. The air conditioner 1 according to the third embodiment performs the same refrigeration cycle as the vapor compression refrigeration cycle of the air conditioner 1 described in (3-3), with refrigerant circulating through the compressor 11, the use-side heat exchanger 32 functioning as a radiator, the second expansion valve 42, and the heat-source-side heat exchanger 31 functioning as an evaporator. In the third operation, the air conditioner 1 performs indoor heating by, for example, heat exchange between indoor air and refrigerant in the use-side heat exchanger 32.

(9-4) Control of Air Conditioner 1

The air conditioner 1 according to the third embodiment includes the controller 80 illustrated in FIG. 9 to cause the internal devices to perform the operation described above. The controller 80 controls the compressor 11, the second expansion valve 42, the flow rate control valve 43, the first expansion valve 41, the four-way valve 21, and the on-off valve 61.

(9-5) Selection between First Operation and Third Operation

In the air conditioner 1 according to the third embodiment, the controller 80 selects to perform the first operation using the ejector 50 or the third operation not using the ejector 50. The selection between the first operation and the third operation of the air conditioner 1 according to the third embodiment can be performed in a way similar to the selection between the first operation and the third operation of the air conditioner 1 according to the first embodiment described in (3-5). Thus, a detailed description of the selection between the first operation and the third operation of the air conditioner 1 according to the third embodiment will be omitted here.

(10) Modifications (10-1) Modification A

Figure 14:
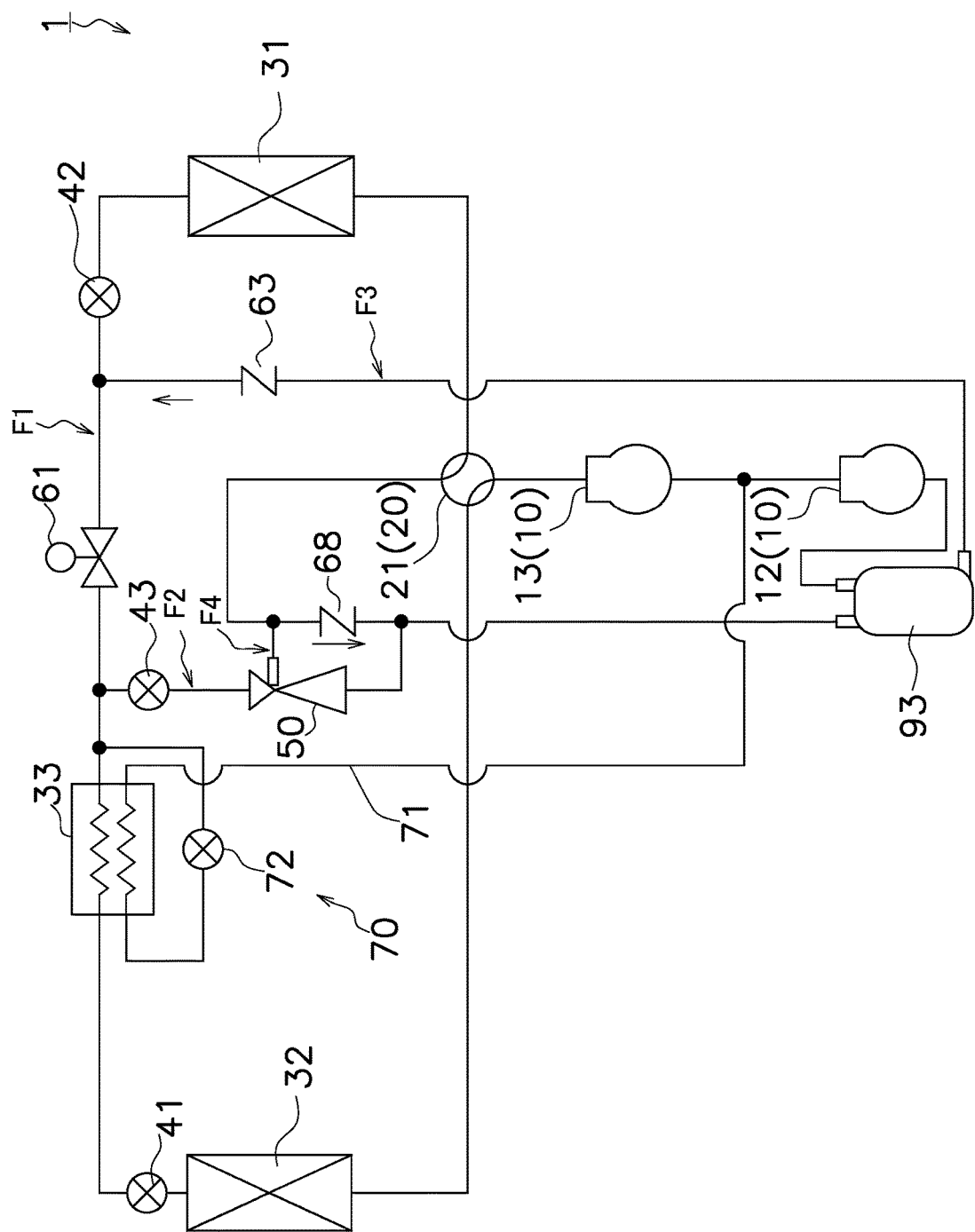
FIG. 14 is a circuit diagram for explaining an air conditioner according to modification A and modification B.

The air conditioner 1 according to the first embodiment, the second embodiment, and the third embodiment has been described in which the compression mechanism 10 is constituted by one compressor 11. However, the compression mechanism 10 is not limited to one constituted by one compressor 11 as in the air conditioner 1 according to the first embodiment, the second embodiment, and the third embodiment. For example, in the air conditioner 1 according to the third embodiment, as illustrated in FIG. 14, the compression mechanism 10 may be constituted by two compressors 12 and 13. In the compression mechanism 10 illustrated in FIG. 14, a discharge port of the compressor 12 communicates with a suction port of the compressor 13. In other words, the compression mechanism 10 is configured to perform two-stage compression. The compression mechanism 10 may also be configured to perform multi-stage compression in which three or more compressors communicate with each other. When the compression mechanism 10 is configured to perform two-stage compression, for example, one compressor may include a first compression element for low-pressure compression, and a second compression element for high-pressure compression. When the compression mechanism 10 is constituted by a plurality of compressors, the compressors may be coupled in parallel.

(10-2) Modification B

The air conditioner 1 including a compression mechanism configured to perform multi-stage compression described in modification A may be provided with an economizer circuit 70 illustrated in FIG. 14. The economizer circuit 70 includes an economizer heat exchanger 33, an injection pipe 71, and an injection valve 72. The injection pipe 71 branches the refrigerant delivered from the radiator to the expansion valve and returns the branched refrigerant to the suction port of the compressor 13 in the subsequent stage (downstream). The economizer heat exchanger 33 performs heat exchange between the refrigerant delivered from the radiator to the expansion valve and intermediate-pressure refrigerant in the refrigeration cycle flowing through the injection pipe 71. The injection valve 72 is an expansion valve and decompresses and expands the refrigerant in the injection pipe 71 before the refrigerant enters the economizer heat exchanger 33 along the injection pipe 71. The refrigerant that has passed through the injection valve 72 is intermediate-pressure refrigerant. In the air conditioner 1, since intermediate-pressure injection using the economizer heat exchanger 33 and the injection pipe 71 is adopted, the temperature of the refrigerant to be sucked into the compressor 13 in the subsequent stage (downstream) can be kept low with no heat radiate to the outside, and the refrigerant to be delivered to the evaporator can be cooled. For example, in the second operation, the heat-source-side heat exchanger 31 functions as a radiator, the use-side heat exchanger 32 functions as an evaporator, and the first expansion valve 41 functions as the expansion valve described above.

(10-3) Modification C

Figure 15:
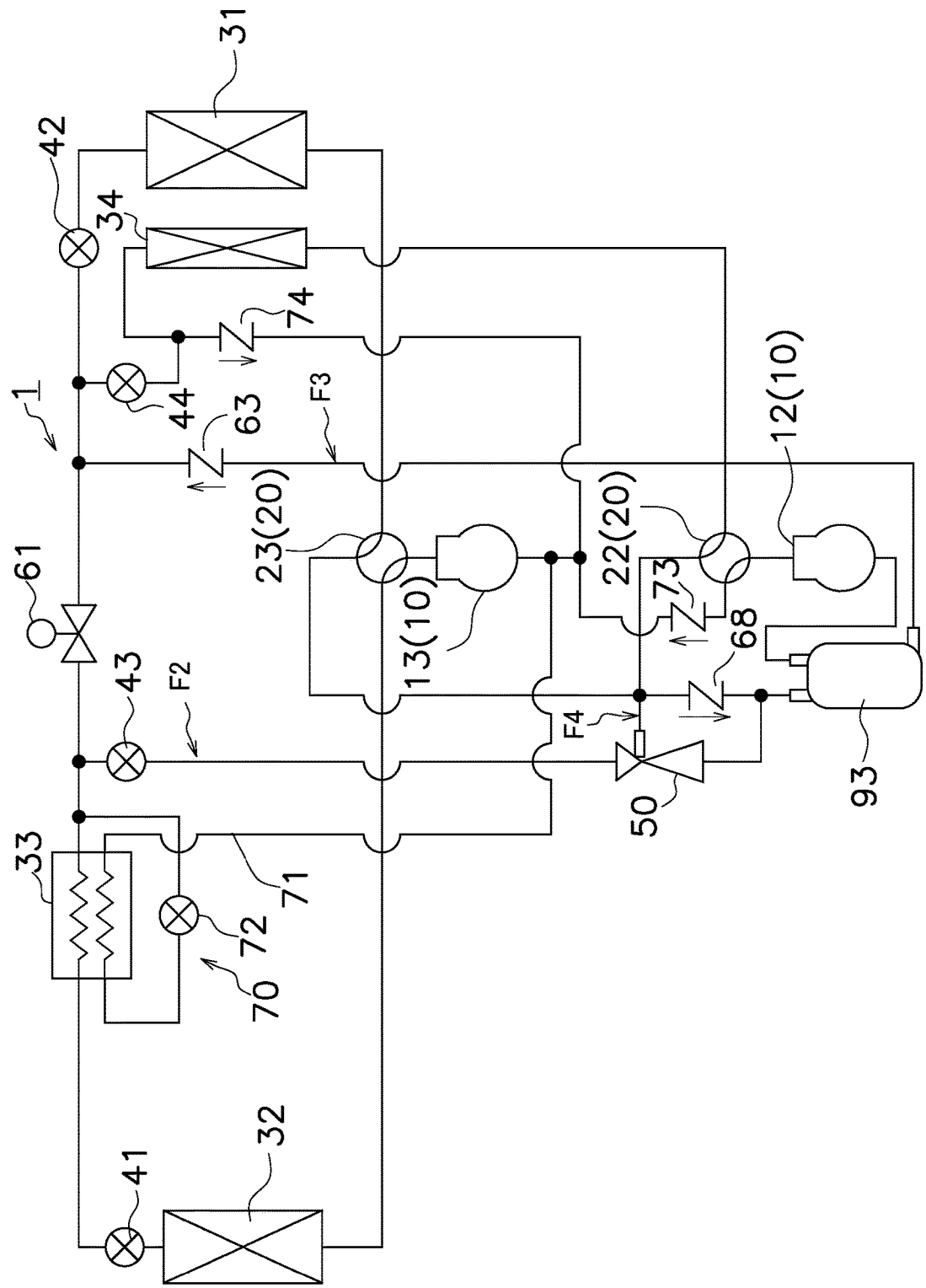
FIG. 15 is a circuit diagram for explaining an air conditioner according to modification C.

The air conditioner 1 including the compression mechanism 10 configured to perform multi-stage compression described in modification A may be provided with an intercooler 34 illustrated in FIG. 15. In the first operation, the intercooler 34 functions as an evaporator. In the second operation, the intercooler 34 performs heat exchange to cool the refrigerant discharged from the compressor 12, which is a first compression element, and causes the cooled refrigerant to be sucked into the compressor 13, which is a second compression element. The refrigerant to be sucked into the compressor 13 is cooled to decrease the temperature of the refrigerant to be discharged from the compressor 13, and, as a result, the reliability of the compressor 13 and the efficiency of the refrigeration cycle can be increased.

In FIG. 15, the compressors 12 and 13 constitute the compression mechanism 10, and four-way valves 22 and 23 constitute the switching mechanism 20. The air conditioner 1 in FIG. 15 includes, in addition to the compression mechanism 10 and the switching mechanism 20, check valves 73 and 74 and a fourth expansion valve 44, with which the intercooler 34 communicates. The discharge port of the compressor 12 communicates with a first port of the four-way valve 22. A second port of the four-way valve 22 communicates with a first inlet/outlet of the intercooler 34. A second inlet/outlet of the intercooler 34 communicates with an inlet of the check valve 74 and a first end of the fourth expansion valve 44. A second end of the fourth expansion valve 44 is coupled between the on-off valve 61 and the second expansion valve 42. An outlet of the check valve 74 communicates with the suction port of the compressor 13. A third port of the four-way valve 22 communicates with the fourth flow path F4. A fourth port of the four-way valve 22 communicates with an inlet of the check valve 73. An outlet of the check valve 73 communicates with the suction port of the compressor 13. A discharge port of the compressor 13 communicates with a first port of the four-way valve 23. A second port of the four-way valve 23 communicates with a first inlet/outlet of the heat-source-side heat exchanger 31. A second inlet/outlet of the heat-source-side heat exchanger 31 communicates with the second expansion valve 42. A third port of the four-way valve 23 communicates with the fourth flow path F4. A fourth port of the four-way valve 23 communicates with a first inlet/outlet of the use-side heat exchanger 32. A second inlet/outlet of the use-side heat exchanger 32 communicates with the first expansion valve 41.

The circuit configuration of portions corresponding to the first expansion valve 41, the on-off valve 61, the second expansion valve 42, the flow rate control valve 43, the ejector 50, the check valve 68, the accumulator 93, and the economizer circuit 70 of the air conditioner 1 illustrated in FIG. 15 is the same as the circuit configuration of the air conditioner 1 illustrated in FIG. 14, and a description thereof will thus be omitted.

In the first operation and the third operation, as illustrated in FIG. 15, the first port and the fourth port of each of the four-way valves 22 and 23 communicate with each other, and the second port and the third port of each of the four-way valves 22 and 23 communicate with each other. In the second operation, the first port and the second port of each of the four-way valves 22 and 23 communicate with each other, and the third port and the fourth port of each of the four-way valves 22 and 23 communicate with each other.

In the first operation and the third operation, the refrigerant discharged from the compressor 12 flows from the four-way valve 22, the check valve 73, the compressor 13, the four-way valve 23, and the use-side heat exchanger 32 to the first flow path F1. In the first operation and the third operation, the difference between the air conditioner 1 in FIG. 14 and the air conditioner 1 in FIG. 15 is the travel path of the refrigerant downstream of the third flow path F3. In the air conditioner 1 in FIG. 15, the refrigerant is divided into refrigerant flowing from the third flow path F3 to the fourth flow path F4 via the second expansion valve 42 and the heat-source-side heat exchanger 31 and refrigerant flowing from the third flow path F3 to the fourth flow path F4 via the fourth expansion valve 44 and the intercooler 34. At this time, the refrigerants are decompressed and expanded by the second expansion valve 42 and the fourth expansion valve 44, and the intercooler 34 functions as an evaporator, like the heat-source-side heat exchanger 31.

In the second operation, the difference between the air conditioner 1 in FIG. 15 and the air conditioner 1 in FIG. 14 is the presence or absence of refrigerant flowing through the intercooler 34. In the air conditioner 1 in FIG. 15, the refrigerant discharged from the compressor 12 in the preceding stage flows into the suction port of the compressor 13 in the subsequent stage via the intercooler 34. The intercooler 34 cools the refrigerant discharged from the compressor 12 in the preceding stage and to be sucked into the compressor 13 in the subsequent stage.

(10-4) Modification D

Figure 16:
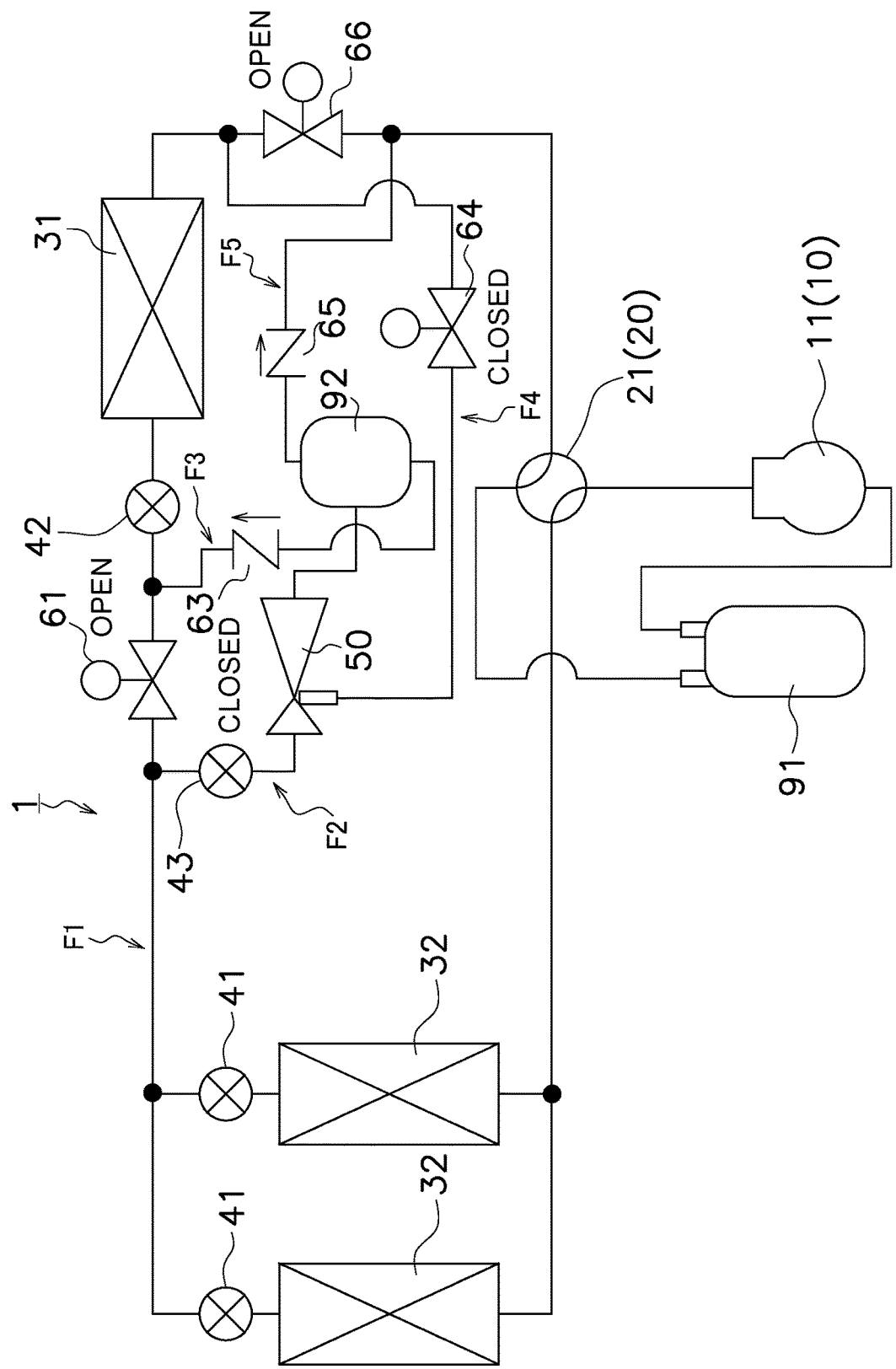
FIG. 16 is a circuit diagram for explaining an air conditioner according to modification D.

The air conditioner 1 described above including one use-side heat exchanger 32 has been described. However, the air conditioner 1 may include a plurality of use-side heat exchangers. When the air conditioner 1 according to the first embodiment includes two use-side heat exchangers 32, for example, as illustrated in FIG. 16, two units each including the use-side heat exchanger 32 and the first expansion valve 41 may be coupled in parallel.

(10-5) Modification E

While the air conditioner 1 described above including the first expansion valve 41 and the second expansion valve 42 has been described, the first expansion valve 41 and the second expansion valve 42 may be combined into a single expansion valve. For example, the first expansion valve 41 may be omitted, and the second expansion valve 42 may perform decompression and expansion in the second operation. The second expansion valve 42 having the configuration described above serves as a first expansion valve.

(10-6) Modification F

The air conditioner 1 described above including the check valves 63, 65, 67, 68, 73, and 74 has been described. However, the check valves 63, 65, 67, 68, 73, and 74 may be each replaced with an on-off valve. Further, the air conditioner 1 described above including the flow rate control valve 43 has been described above. However, the flow rate control valve 43 may be replaced with an on-off valve. Alternatively, the flow rate control valve 43 may be replaced with an expansion valve configured to perform decompression and expansion such that refrigerant having an intermediate pressure between a high pressure and a low pressure flows to the refrigerant inflow port of the ejector 50.

(10-7) Modification G

The air conditioner 1 described above in which carbon dioxide is used as refrigerant has been described. The refrigerant used in the air conditioner 1 described above is preferably carbon dioxide or a refrigerant mixture containing carbon dioxide in which the refrigerant to be discharged from the compression mechanism 10 has a high pressure. However, the air conditioner 1 described above may use refrigerant other than carbon dioxide or a refrigerant mixture containing carbon dioxide. For example, refrigerant whose saturation pressure is greater than or equal to 4.5 MPa when reaching a saturation temperature of 65° C. may be used. Examples of such refrigerant include R410A refrigerant. Alternatively, chlorofluorocarbon-based refrigerant that reaches a critical state when discharged from the compression mechanism 10 may be used. Examples of such chlorofluorocarbon-based refrigerant include R23 refrigerant.

(11) Features (11-1)

In the first operation, the air conditioner 1 described above can perform heating using heat radiated from the refrigerant in the use-side heat exchanger 32. In the second operation, the air conditioner 1 can perform cooling by heat absorption due to the evaporation of the refrigerant in the use-side heat exchanger 32. In the air conditioner 1, the switching mechanism 20 switches between the first operation using the ejector 50 and the second operation without the ejector 50, thereby providing efficient operation of the air conditioner 1. The air conditioner 1 described above includes the first expansion valve 41 as an expansion mechanism.

(11-2)

In the air conditioner 1 described above, with a simple configuration of the on-off valve 61, which is a first valve, and the flow rate control valve 43, which is a second valve, in addition to the configuration including the first flow path F1, the second flow path F2, the third flow path F3, and the fourth flow path F4, the ejector 50 can be bypassed during the second operation. As a result, the air conditioner 1 capable of switching between the first operation using the ejector 50 and the second operation without the ejector 50 can be constructed at low cost.

(11-3)

In the air conditioner 1 according to the first embodiment, in the first operation, the gas-liquid separator 92 is used to separate the refrigerant in the gas-liquid two-phase state flowing out of the ejector 50. In the air conditioner 1, due to the on-off valve 64, which is a fourth valve, the check valve 65, which is a fifth valve, and the on-off valve 66, which is a sixth valve, the refrigerant does not flow through the fourth flow path F4 and the fifth flow path F5 and the refrigerant flows through the sixth flow path F6 in the second operation, and the refrigerant flows through the fourth flow path F4 and the fifth flow path F5 and the refrigerant does not flow through the sixth flow path F6 in the first operation. Thus, in the first operation, the air conditioner 1 can allow the gas refrigerant separated by the gas-liquid separator 92 to flow to the refrigerant suction port of the ejector 50 along the fourth flow path F4 and the fifth flow path F5. In the air conditioner 1, due to the check valve 63, which is a third valve, the refrigerant does not flow through the third flow path F3 in the second operation, and the refrigerant flows through the third flow path F3 in the first operation. Thus, in the first operation, the air conditioner 1 can allow the liquid refrigerant separated by the gas-liquid separator 92 to flow to the heat-source-side heat exchanger 31, which is a first heat-source-side heat exchanger, along the third flow path F3. As a result, in the air conditioner 1, the ejector 50 can efficiently be operated in the first operation.

(11-4)

In the air conditioner 1 according to the second embodiment, in the first operation, the gas-liquid separator 92 is used to separate the refrigerant in the gas-liquid two-phase state flowing out of the ejector 50. Due to the check valve 67, which is a seventh valve, and the four-way valve 21, the air conditioner 1 can prevent the refrigerant from flowing through the fourth flow path F4 and the fifth flow path F5 in the second operation and allow the refrigerant to flow through the fourth flow path F4 and the fifth flow path F5 in the first operation. Thus, in the first operation, the air conditioner 1 can allow the separated gas refrigerant to flow to the refrigerant suction port of the ejector 50 along the fourth flow path F4 and the fifth flow path F5. In the air conditioner 1, due to the check valve 63, which is a third valve, the refrigerant does not flow through the third flow path F3 in the second operation, and the refrigerant flow through the third flow path F3 in the first operation. In the first operation, the air conditioner 1 can allow the separated liquid refrigerant to flow to the heat-source-side heat exchanger 31 along the third flow path F3. As a result, in the air conditioner 1, the ejector 50 can efficiently be operated in the first operation.

(11-5)

In the air conditioner 1 according to the third embodiment, in the first operation, the accumulator 93 is used to separate the refrigerant in the gas-liquid two-phase state flowing out of the ejector 50. Due to the check valve 68, which is an eighth valve, and the four-way valve 21, the air conditioner 1 can prevent the refrigerant from flowing through the fourth flow path F4 in the second operation and allow the refrigerant to flow through the fourth flow path F4 in the first operation. Thus, in the first operation, the air conditioner 1 can allow the separated gas refrigerant to flow to the refrigerant suction port of the ejector 50 along the fourth flow path F4. In the air conditioner 1, due to the check valve 63, which is a third valve, the refrigerant does not flow through the third flow path F3 in the second operation, and the refrigerant flows through the third flow path F3 in the first operation. In the first operation, the air conditioner 1 can allow the separated liquid refrigerant to flow to the heat-source-side heat exchanger 31 along the third flow path F3. As a result, in the air conditioner 1, the ejector 50 can efficiently be operated in the first operation.

(11-6)

As described in modification A with reference to FIG. 14, the compression mechanism 10 is configured such that, for example, the compressor 12, which is a first compression element, and the compressor 13, which is a second compression element, perform multi-stage compression. The pressure of the refrigerant is raised to a high pressure by such multi-stage compression of the compression mechanism 10, which can bring the ejector 50 into efficient operation.

(11-7)

As described in modification B with reference to FIG. 14, the air conditioner 1 including the economizer circuit 70 can increase the efficiency of cooling operation.

(11-8) As described in modification C with reference to FIG. 15, the intercooler 34 cools the refrigerant to be sucked into the compressor 13, which is a second compression element. As a result, the reliability of the compressor 13 and the efficiency of the refrigeration cycle can be improved.

(11-9)

The air conditioner 1 described above includes the second expansion valve 42 that decompresses and expands refrigerant to be caused to flow into the heat-source-side heat exchanger 31. The switching mechanism 20 is configured to switch to the refrigerant flow in the third operation. Specifically, the switching mechanism 20 switches, for the third operation, to a refrigerant flow similar to that in the first operation. As described with reference to FIG. 4, FIG. 8, and FIG. 13, the air conditioner 1 is configured such that, in the third operation, the refrigerant compressed by the compression mechanism 10 radiates heat in the use-side heat exchanger 32 and is decompressed and expanded by the second expansion valve 42 before being evaporated in the heat-source-side heat exchanger 31 without passing through the ejector 50. The air conditioner 1 having the configuration described above switches the operation to the third operation if efficiency is low in the first operation, which makes it possible to suppress a decrease in efficiency.

(11-10)

The switching mechanism 20 may be configured to switch to the refrigerant flow in the first operation when a condition that a high-pressure target value of the refrigerant to be discharged from the compression mechanism 10 and a low-pressure target value of the refrigerant to be sucked into the compression mechanism 10 are within a predetermined range and that the capacity required for the compression mechanism 10 is greater than or equal to a predetermined value is satisfied, and switch to the refrigerant flow in the third operation when the condition is not satisfied. In the configuration described above, it is possible to appropriately switch between the first operation and the third operation, based on the pressure of the refrigerant and the required capacity.

Fourth Embodiment

(12) Overview of Configuration

Figure 17:
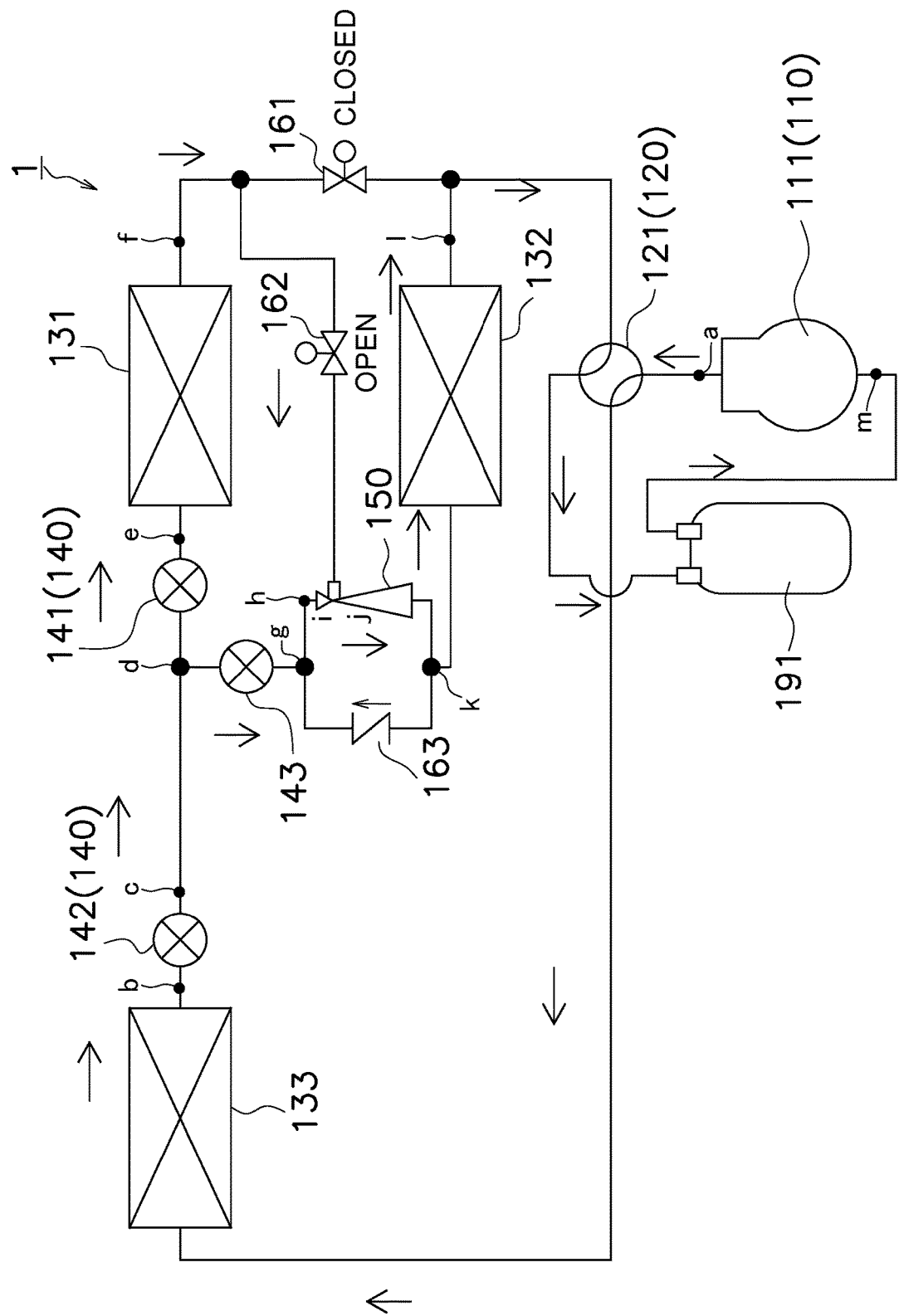
FIG. 17 is a circuit diagram for explaining a first operation of an air conditioner according to a fourth embodiment.
Figure 19:
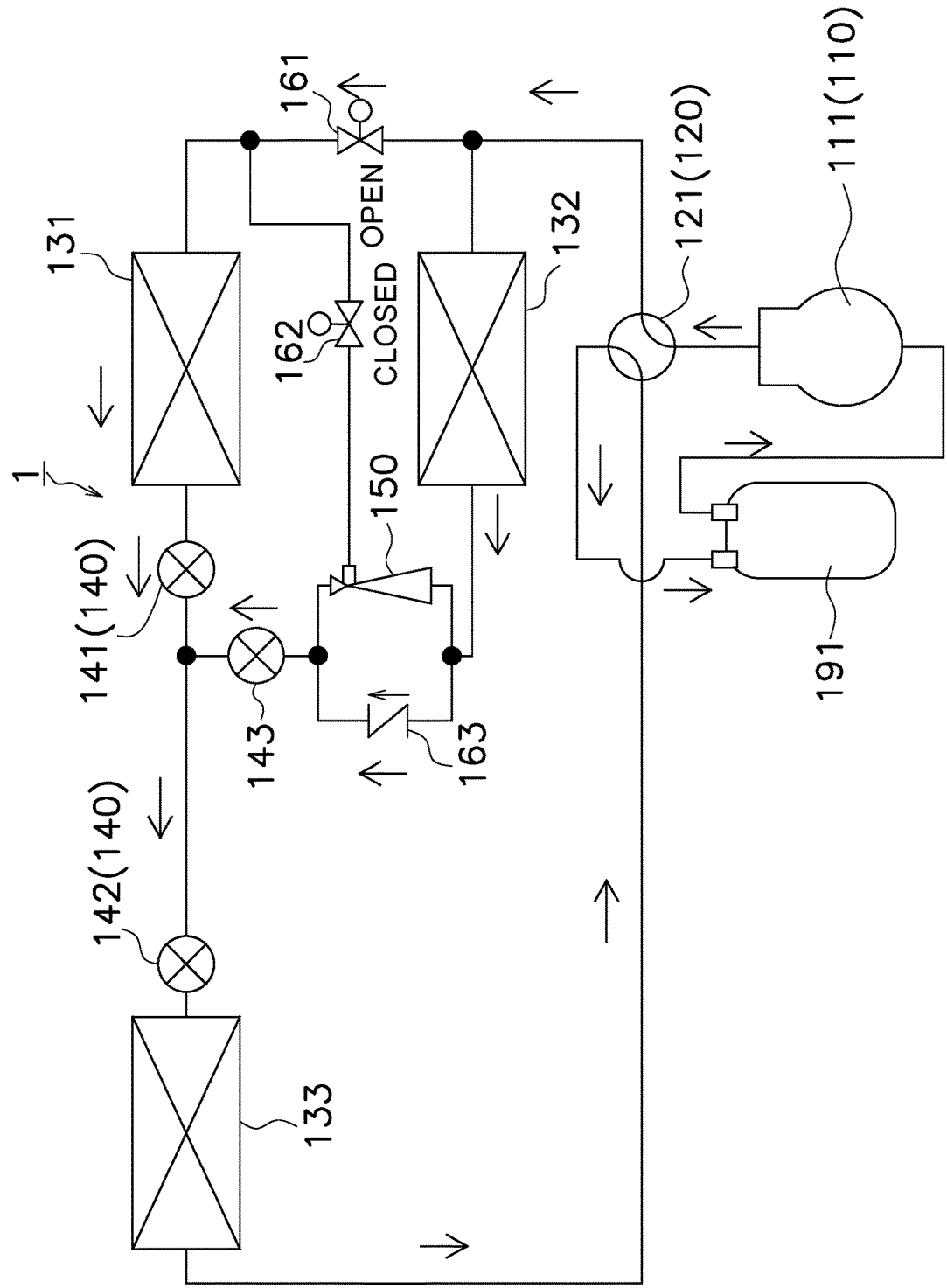
FIG. 19 is a circuit diagram for explaining a second operation of the air conditioner according to the fourth embodiment.

As illustrated in FIG. 17 and FIG. 19, an air conditioner 1 according to a fourth embodiment includes a compression mechanism 110, a first heat-source-side heat exchanger 131, a second heat-source-side heat exchanger 132, a use-side heat exchanger 133, an ejector 150 that raises the pressure of refrigerant by using energy for refrigerant decompression and expansion, an expansion mechanism 140, and a switching mechanism 120. The switching mechanism 120 switches between the refrigerant flow in a first operation illustrated in FIG. 17 and the refrigerant flow in a second operation illustrated in FIG. 19. The expansion mechanism 140 includes a first expansion valve 141 and a second expansion valve 142.

As illustrated in FIG. 17, in the first operation of the air conditioner 1, the refrigerant compressed by the compression mechanism 110 radiates heat in the use-side heat exchanger 133. In the air conditioner 1, in the first operation, a portion of the refrigerant that has radiated heat in the use-side heat exchanger 133 is decompressed and expanded by the ejector 150, and the rest of the refrigerant that has radiated heat in the use-side heat exchanger 133 is decompressed and expanded by the first expansion valve 141 (the expansion mechanism 140). In the air conditioner 1, the refrigerant heated by the first heat-source-side heat exchanger 131 after decompressed and expanded by the first expansion valve 141 is raised in pressure by the ejector 150. In the air conditioner 1, further, the gas-liquid two-phase refrigerant raised in pressure by the ejector 150 is evaporated in the second heat-source-side heat exchanger 132.

As illustrated in FIG. 19, in the second operation of the air conditioner 1, the refrigerant compressed by the compression mechanism 110 radiates heat in the first heat-source-side heat exchanger 131 and the second heat-source-side heat exchanger 132 and is decompressed and expanded by the second expansion valve 142. In the air conditioner 1, after decompressed and expanded by the second expansion valve 142 (the expansion mechanism 140), the refrigerant is evaporated in the use-side heat exchanger 133. As described above, the air conditioner 1 is configured such that no refrigerant flows through the ejector 150 in the second operation.

The air conditioner 1 having the configuration described above can perform heating in the first operation by using heat radiated from the refrigerant in the use-side heat exchanger 133. Further, the air conditioner 1 can perform cooling in the second operation by heat absorption due to the evaporation of the refrigerant in the use-side heat exchanger 133. As described above, the air conditioner 1 can improve heating efficiency and cooling efficiency by switching between the heating operation using the ejector 150 and the cooling operation without using the ejector 150.

(13) Detailed Configuration (13-1) Overview of Circuit Configuration of Air Conditioner 1

The air conditioner 1 according to the fourth embodiment includes, in addition to the compression mechanism 110, the first heat-source-side heat exchanger 131, the second heat-source-side heat exchanger 132, the use-side heat exchanger 133, the ejector 150, the expansion mechanism 140 (the first expansion valve 141 and the second expansion valve 142), and the switching mechanism 120 described above, a flow rate control valve 143, an on-off valve 161, which is a first valve, an on-off valve 162, which is a second valve, and a check valve 163, which is a third valve.

The first expansion valve 141 has a first end through which refrigerant is allowed to flow between the first expansion valve 141 and the use-side heat exchanger 133. The ejector 150 has a refrigerant inflow port communicating with the first end of the first expansion valve 141. Each of the first heat-source-side heat exchanger 131 and the second heat-source-side heat exchanger 132 has a first inlet/outlet into which the refrigerant discharged from the compression mechanism 110 flows in the second operation.

The first heat-source-side heat exchanger 131 has a second inlet/outlet communicating with a second end of the first expansion valve 141. The second heat-source-side heat exchanger 132 has a second inlet/outlet communicating with a refrigerant outflow port of the ejector 150. The on-off valve 161 is coupled between the first inlet/outlet of the first heat-source-side heat exchanger 131 and the first inlet/outlet of the second heat-source-side heat exchanger 132. The on-off valve 162 has a first end coupled between the first heat-source-side heat exchanger 131 and the on-off valve 161, and a second end communicating with a refrigerant suction port of the ejector 150. The check valve 163 is coupled between the refrigerant inflow port of the ejector 150 and the refrigerant outflow port of the ejector 150.

The on-off valve 161 does not allow the refrigerant to flow during the first operation and allows the refrigerant to flow during the second operation. The on-off valve 162 allows the refrigerant to flow during the first operation and does not allow the refrigerant to flow during the second operation. The check valve 163 does not allow the refrigerant to flow during the first operation and allows the refrigerant to flow during the second operation. The air conditioner 1 is configured such that the refrigerant returns to the compression mechanism 110 from the first inlet/outlet of the second heat-source-side heat exchanger 132 in the first operation, and the refrigerant returns to the compression mechanism 110 from the use-side heat exchanger 133 in the second operation.

In the air conditioner 1 according to the fourth embodiment, the ejector 150 can be bypassed during the second operation by using the on-off valve 161, the on-off valve 162, and the check valve 163. In the air conditioner 1, bypassing the ejector 150 can prevent occurrence of pressure loss in the ejector 150. In the air conditioner 1, furthermore, during the first operation, the on-off valve 161 is closed and the on-off valve 162 is opened to allow the refrigerant to flow through the ejector 150.

(13-2) Details of Circuit Configuration of Air Conditioner 1

In the air conditioner 1 illustrated in FIG. 17 and FIG. 19, the compression mechanism 110 is constituted by one compressor 111. The switching mechanism 120 is constituted by a four-way valve 121. An outflow port of a receiver 191 is coupled to a suction port of the compressor 111. A discharge port of the compressor 111 communicates with a first port of the four-way valve 121. A second port of the four-way valve 121 communicates with the first inlet/outlet of the second heat-source-side heat exchanger 132. A third port of the four-way valve 121 communicates with an inflow port of the receiver 191. A fourth port of the four-way valve 121 communicates with a first inlet/outlet of the use-side heat exchanger 133. A second inlet/outlet of the use-side heat exchanger 133 communicates with a first end of the second expansion valve 142. A second end of the second expansion valve 142 communicates with the first end of the first expansion valve 141 and a first end of the flow rate control valve 143. A second end of the flow rate control valve 143 communicates with the inflow port at refrigerant of the ejector 150. Accordingly, the refrigerant inflow port of the ejector 150 communicates with the first end of the first expansion valve 141 through the flow rate control valve 143.

In the first operation, as illustrated in FIG. 17, the first port and the fourth port of the four-way valve 121 communicate with each other, and the second port and the third port of the four-way valve 121 communicate with each other. In the second operation, as illustrated in FIG. 19, the first port and the second port of the four-way valve 121 communicate with each other, and the third port and the fourth port of the four-way valve 121 communicate with each other. The four-way valve 121 performs switching described above such that, in the first operation, the refrigerant discharged from the discharge port of the compressor 111 flows to the use-side heat exchanger 133 and the refrigerant that has flowed out of the first inlet/outlet of the second heat-source-side heat exchanger 132 returns to the suction port of the compressor 111 through the receiver 191. In the second operation, the refrigerant discharged from the discharge port of the compressor 111 flows through the first heat-source-side heat exchanger 131 and the second heat-source-side heat exchanger 132 in parallel, and the refrigerant that has flowed out of the first inlet/outlet of the use-side heat exchanger 133 returns to the suction port of the compressor 111 through the receiver 191.

Figure 18:
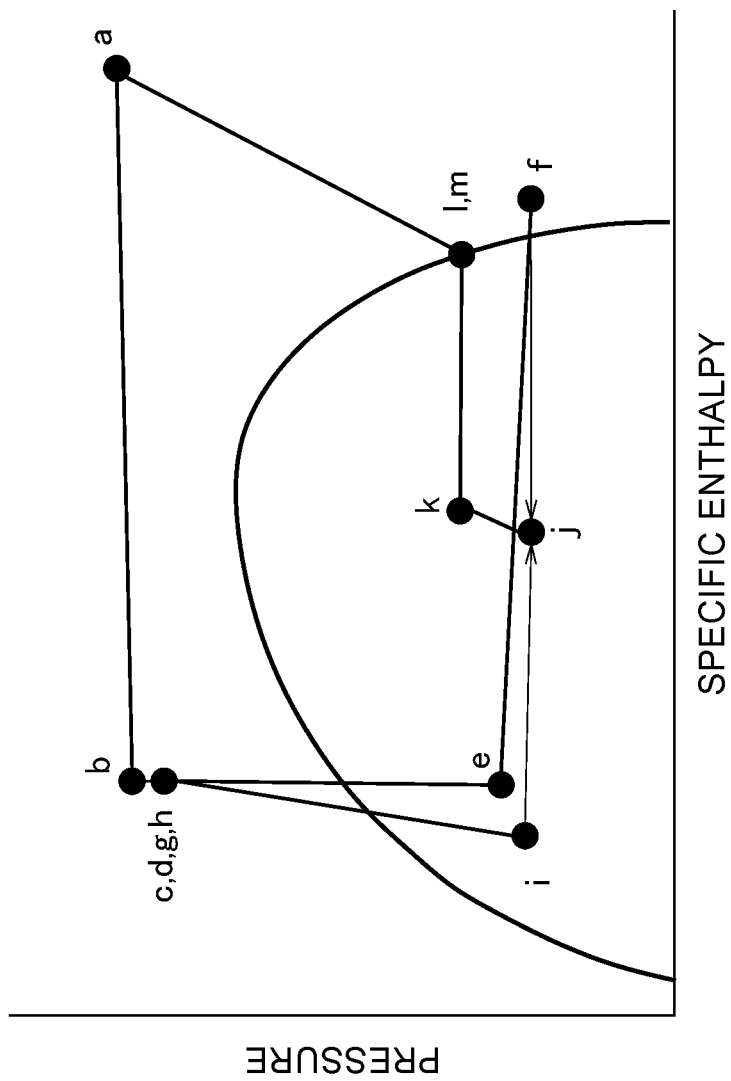
FIG. 18 is a Mollier diagram illustrating a state of refrigerant in the first operation of the air conditioner in FIG. 17.

(14) Overall Operation (14-1) Operation of Air Conditioner 1 during First Operation The operation of the air conditioner 1 during the first operation using carbon dioxide as refrigerant will be described with reference to FIG. 17 and FIG. 18. The refrigerant discharged from the discharge port of the compressor 111 (point a) is in a supercritical state. The refrigerant in the supercritical state discharged from the compressor 111 flows into the use-side heat exchanger 133 via the four-way valve 121. The refrigerant in the supercritical state radiates heat in the use-side heat exchanger 133. In the use-side heat exchanger 133, for example, heat exchange is performed between indoor air and the refrigerant, and the warmed air is used to perform indoor heating.

The refrigerant at an outflow point (point b) of the use-side heat exchanger 133 is in a high-pressure state, and the specific enthalpy thereof is smaller than that at the point a. The second expansion valve 142 and the flow rate control valve 143 allow the refrigerant to pass therethrough without substantially decompressing the refrigerant. The refrigerant at an outflow point (point c) of the second expansion valve 142, the refrigerant at an inflow point (point d) and an outflow point (point g) of the flow rate control valve 143, and the refrigerant at an inflow point (point h) of the ejector 150 are in substantially the same state as the refrigerant at the point b.

The refrigerant that has flowed into the refrigerant inflow port of the ejector 150 from the flow rate control valve 143 is decompressed and expanded by a nozzle (not illustrated) in the ejector 150 into low-pressure refrigerant in a gas-liquid two-phase state at the nozzle (point i). At an outlet of the nozzle (point j), the refrigerant that has flowed in from the refrigerant inflow port and low-pressure gas refrigerant sucked from the refrigerant suction port of the ejector 150 (here, the same as that at an outflow point (point f) of the first inlet/outlet of the first heat-source-side heat exchanger 131) are mixed into refrigerant having a specific enthalpy between those of the refrigerant at the point i and the refrigerant at the point f. The refrigerant at the refrigerant outflow port of the ejector 150 (point k) is in a state such that the pressure is raised to be higher than that of the refrigerant at the outlet of the nozzle (point j). The refrigerant that has been raised in pressure and flowed out of the refrigerant outflow port of the ejector 150 evaporates into gas refrigerant in the second heat-source-side heat exchanger 132. The refrigerant flowing out of the first inlet/outlet of the second heat-source-side heat exchanger 132 (point l) is gas refrigerant with a high specific enthalpy. The refrigerant that has flowed out of the second heat-source-side heat exchanger 132 is sucked in from the suction port of the compressor 111 (point m) via the four-way valve 121 and the receiver 191. The state of the refrigerant present at the suction port of the compressor 111 (point m) is substantially the same as that of the gas refrigerant at the first inlet/outlet of the second heat-source-side heat exchanger 132 (point l).

(14-2) Operation of Air Conditioner 1 during Second Operation

The operation of the air conditioner 1 during the second operation using carbon dioxide as refrigerant will be described with reference to FIG. 19. The refrigerant discharged from the discharge port of the compressor 111 is in a supercritical state. A portion of the refrigerant in the supercritical state discharged from the compressor 111 flows into the second heat-source-side heat exchanger 132 via the four-way valve 121, and the remaining refrigerant flows into the first heat-source-side heat exchanger 131 via the four-way valve 121 and the on-off valve 161. In this case, the refrigerant does not flow through the ejector 150 due to the closed on-off valve 162 and the check valve 163. The refrigerant in the supercritical state radiates heat in either the first heat-source-side heat exchanger 131 or the second heat-source-side heat exchanger 132. In the first heat-source-side heat exchanger 131 and the second heat-source-side heat exchanger 132 functioning as radiators, for example, heat exchange is performed between outdoor air and the refrigerant.

The refrigerant flowing out of the first heat-source-side heat exchanger 131 and the second heat-source-side heat exchanger 132 is in a high-pressure state, and the specific enthalpy thereof is smaller than that before flowing into the first heat-source-side heat exchanger 131 and the second heat-source-side heat exchanger 132. Since the first expansion valve 141 and the flow rate control valve 143 are open, all of the refrigerants that have exited the first heat-source-side heat exchanger 131 and the second heat-source-side heat exchanger 132 flow to the second expansion valve 142. The refrigerant that flows from the second expansion valve 142 to the use-side heat exchanger 133 is decompressed and expanded by the second expansion valve 142 before flowing into the use-side heat exchanger 133. The refrigerant in the gas-liquid two-phase state that has flowed into the use-side heat exchanger 133 evaporates into gas refrigerant in the use-side heat exchanger 133. In the use-side heat exchanger 133 functioning as an evaporator, for example, heat exchange is performed between indoor air and the refrigerant, and the cooled air is used to perform indoor cooling. The gas refrigerant that has flowed out of the use-side heat exchanger 133 is sucked in from the suction port of the compressor 111 via the four-way valve 121 and the receiver 191.

(14-3) Control of Air Conditioner 1

Figure 20:
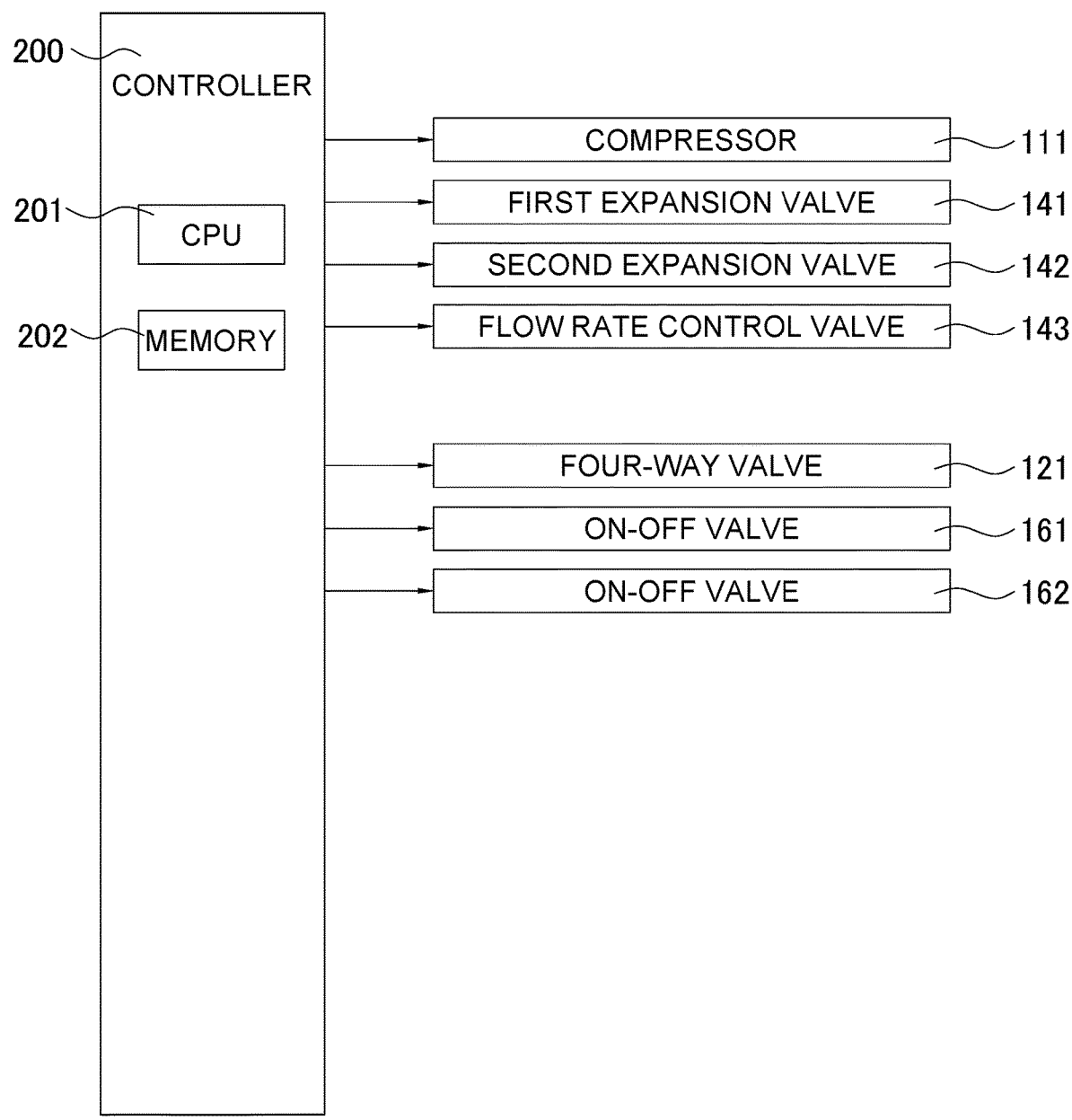
FIG. 20 is a block diagram for explaining a controller of the air conditioner in FIG. 17.

The air conditioner 1 according to the fourth embodiment includes a controller 200 illustrated in FIG. 20 to cause the internal devices to perform the operation described above. The controller 200 is implemented by a computer, for example. The computer includes, for example, a control and arithmetic unit and a memory. The control and arithmetic unit can be implemented using a processor. The controller 200 in FIG. 20 includes a CPU 201 serving as a processor. The control and arithmetic unit reads, for example, a program stored in the memory and performs predetermined image processing, arithmetic processing, or sequence processing in accordance with the program. Further, for example, the control and arithmetic unit can write an arithmetic result to the memory or read information stored in the memory in accordance with the program. The memory can be used as a database. The controller 200 includes a memory 202 serving as a memory.

The controller 200 controls the compressor 111, the first expansion valve 141, the second expansion valve 142, the flow rate control valve 143, the four-way valve 121, and the on-off valves 161 and 162. The two valves, namely, the on-off valves 161 and 162, can be each implemented using, for example, an electromagnetic valve that switches between an open state and a closed state in accordance with a signal from the controller 200. The first expansion valve 141, the second expansion valve 142, and the flow rate control valve 143 can be each implemented using, for example, an electrically powered valve whose opening degree can be changed in response to a pulse signal.

Fifth Embodiment

(15) Overview of Configuration

Figure 21:
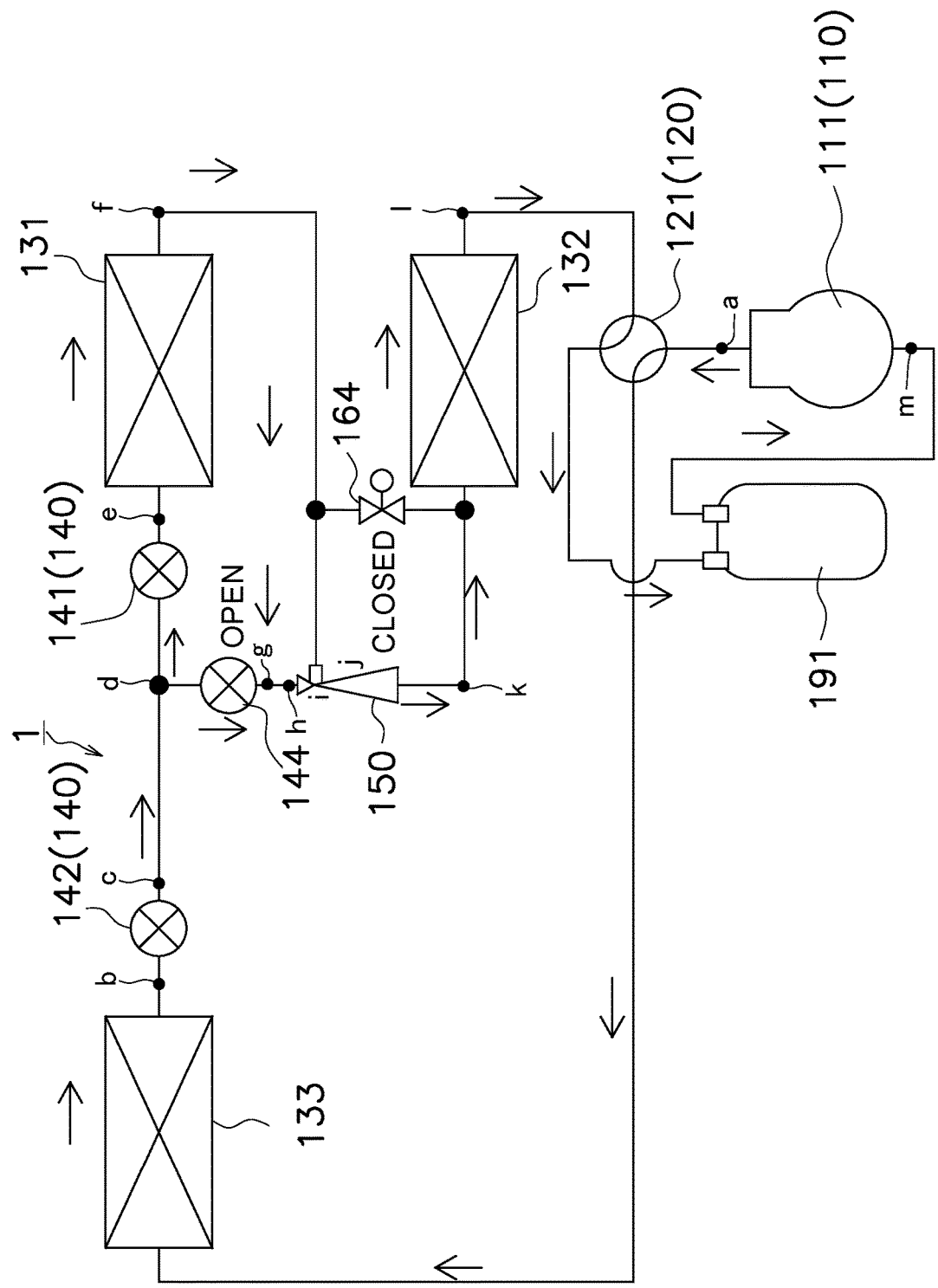
FIG. 21 is a circuit diagram for explaining a first operation of an air conditioner according to a fifth embodiment.
Figure 22:
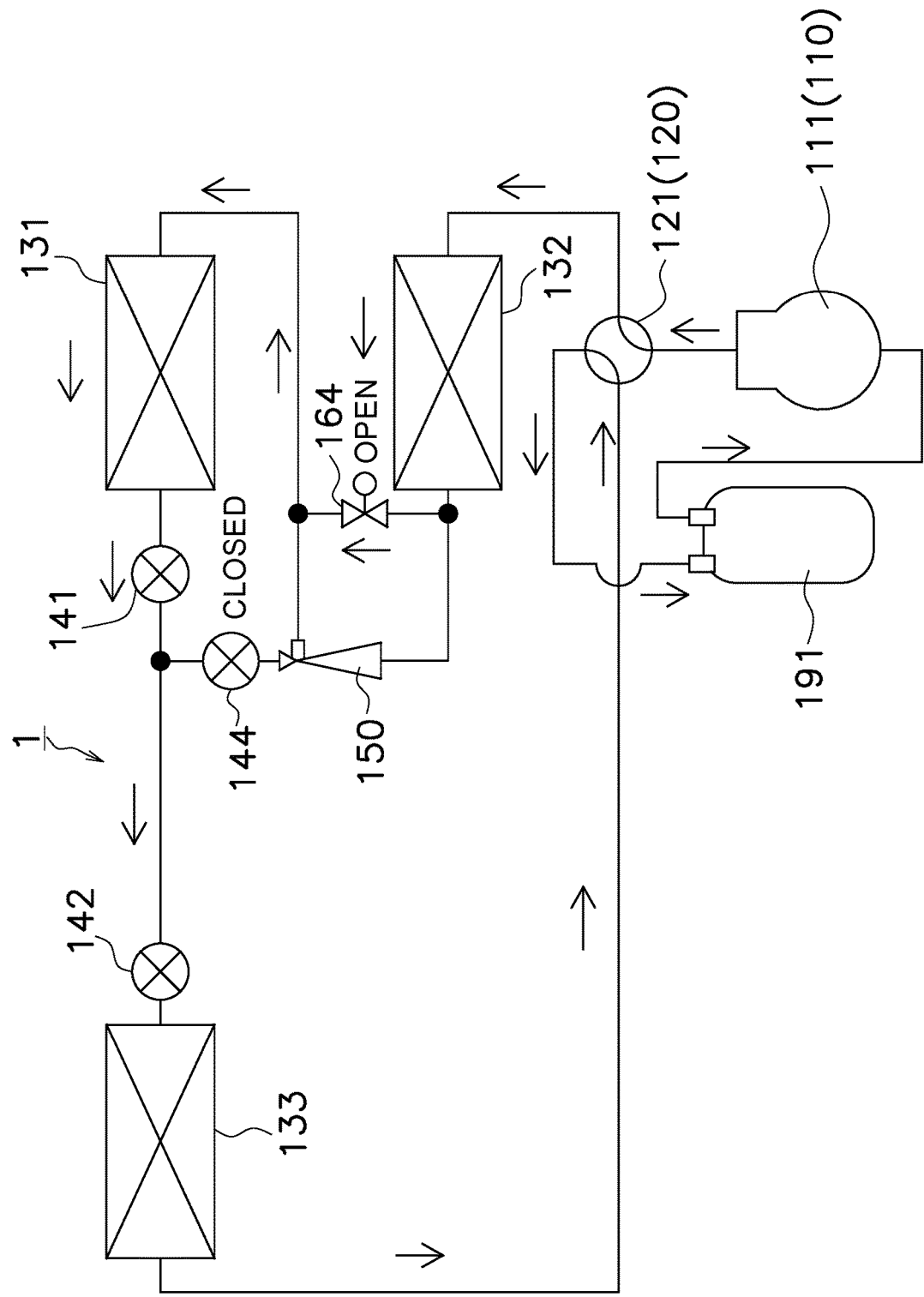
FIG. 22 is a circuit diagram for explaining a second operation of the air conditioner according to the fifth embodiment.

As illustrated in FIG. 21 and FIG. 22, an overview of the configuration of an air conditioner 1 according to a fifth embodiment is the same as the overview of the configuration according to the fourth embodiment described in (12) described above. Accordingly, a description of the overview of the configuration of the air conditioner 1 according to the fifth embodiment will be omitted here. FIG. 21 illustrates the air conditioner 1 in which the first operation is being performed, and FIG. 22 illustrates the air conditioner 1 in which the second operation is being performed.

(16) Detailed Configuration (16-1) Overview of Circuit Configuration of Air Conditioner 1

The air conditioner 1 according to the fifth embodiment includes, in addition to the compression mechanism 110, the first heat-source-side heat exchanger 131, the second heat-source-side heat exchanger 132, the use-side heat exchanger 133, the ejector 150, the first expansion valve 141, the second expansion valve 142, and the switching mechanism 120 described above, an on-off valve 164, which is a fourth valve, and a flow rate control valve 144, which is a fifth valve.

The on-off valve 164 is coupled between the refrigerant outflow port of the ejector 150 and the refrigerant suction port of the ejector 150. Each of the first expansion valve 141 and the flow rate control valve 144 has a first end through which refrigerant is allowed to flow between the corresponding one of the first expansion valve 141 and the flow rate control valve 144 and the use-side heat exchanger 133. A second end of the flow rate control valve 144 communicates with the refrigerant inflow port of the ejector 150. The second heat-source-side heat exchanger 132 has a second inlet/outlet communicating with the refrigerant inflow port of the ejector 150. The first heat-source-side heat exchanger 131 has a first inlet/outlet communicating with the refrigerant suction port of the ejector 150, and a second inlet/outlet communicating with a second end of the first expansion valve 141.

The on-off valve 164 does not allow the refrigerant to flow during the first operation and allows the refrigerant to flow during the second operation. As illustrated in FIG. 21, in the first operation, the refrigerant flow out of a first inlet/outlet of the second heat-source-side heat exchanger 132 to the suction side of the compression mechanism 110. As illustrated in FIG. 22, in the second operation, the refrigerant discharged from the compression mechanism 110 flows into the first inlet/outlet of the second heat-source-side heat exchanger 132.

In the air conditioner 1 according to the fifth embodiment, the ejector 150 can be bypassed during the second operation by closing the flow rate control valve 144 to prevent the refrigerant from flowing to the ejector 150 and opening the on-off valve 164 to allow the refrigerant to flow. In the air conditioner 1, bypassing the ejector 150 can prevent occurrence of pressure loss in the ejector 150. In the air conditioner 1, during the first operation, the on-off valve 164 is closed and the flow rate control valve 144 is opened to allow the refrigerant to flow through the ejector 150.

(16-2) Details of Circuit Configuration of Air Conditioner 1

In the air conditioner 1 illustrated in FIG. 21 and FIG. 22, the compression mechanism 110 is constituted by one compressor 111. The switching mechanism 120 is constituted by a four-way valve 121. An outflow port of a receiver 191 is coupled to a suction port of the compressor 111. A discharge port of the compressor 111 communicates with a first port of the four-way valve 121. A second port of the four-way valve 121 communicates with the first inlet/outlet of the second heat-source-side heat exchanger 132. A third port of the four-way valve 121 communicates with an inflow port of the receiver 191. A fourth port of the four-way valve 121 communicates with a first inlet/outlet of the use-side heat exchanger 133. A second inlet/outlet of the use-side heat exchanger 133 communicates with a first end of the second expansion valve 142. The second end of the second expansion valve 142 communicates with the first end of the first expansion valve 141 and the first end of the flow rate control valve 144.

In the first operation, as illustrated in FIG. 21, the first port and the fourth port of the four-way valve 121 communicate with each other, and the second port and the third port of the four-way valve 121 communicate with each other. In the second operation, as illustrated in FIG. 22, the first port and the second port of the four-way valve 121 communicate with each other, and the third port and the fourth port of the four-way valve 121 communicate with each other. The four-way valve 121 performs switching described above such that, in the first operation, the refrigerant discharged from the discharge port of the compressor 111 flows to the use-side heat exchanger 133 and the refrigerant that has flowed out of the first inlet/outlet of the second heat-source-side heat exchanger 132 returns to the suction port of the compressor 111 through the receiver 191. In the second operation, the refrigerant discharged from the discharge port of the compressor 111 first flows through the second heat-source-side heat exchanger 132 and then flows through the first heat-source-side heat exchanger 131. In the second operation, furthermore, the refrigerant that has flowed out of the first inlet/outlet of the use-side heat exchanger 133 returns to the suction port of the compressor 111 through the receiver 191.

(17) Overall Operation (17-1) Operation of Air Conditioner 1 during First Operation The operation of the air conditioner 1 during the first operation of the air conditioner 1 according to the fifth embodiment is the same as the operation of the air conditioner 1 according to the fourth embodiment during the first operation described in (14-1) described above. Accordingly, a description of the operation of the air conditioner 1 during the first operation of the air conditioner 1 according to the fifth embodiment will be omitted here.

(17-2) Operation of Air Conditioner 1 during Second Operation

The operation of the air conditioner 1 according to the fifth embodiment during the second operation using carbon dioxide as refrigerant will be described with reference to FIG. 22. The refrigerant discharged from the discharge port of the compressor 111 is in a supercritical state. The refrigerant in the supercritical state discharged from the compressor 111 flows into the second heat-source-side heat exchanger 132 via the four-way valve 121. The refrigerant that has radiated heat in the second heat-source-side heat exchanger 132 further flows into the first heat-source-side heat exchanger 131 via the on-off valve 164. In this case, the refrigerant does not flow through the ejector 150 due to the closed flow rate control valve 144 and the opened on-off valve 164. The refrigerant in the supercritical state radiates heat in both the second heat-source-side heat exchanger 132 and the first heat-source-side heat exchanger 131. In the first heat-source-side heat exchanger 131 and the second heat-source-side heat exchanger 132 functioning as radiators, for example, heat exchange is performed between outdoor air and the refrigerant.

The refrigerant flowing out of the first heat-source-side heat exchanger 131 is in a high-pressure state, and the specific enthalpy thereof is smaller than that before flowing into the second heat-source-side heat exchanger 132. Since the first expansion valve 141 is open, the refrigerant that has exited the first heat-source-side heat exchanger 131 flows to the second expansion valve 142. The refrigerant that flows from the second expansion valve 142 to the use-side heat exchanger 133 is decompressed and expanded by the second expansion valve 142 before flowing into the use-side heat exchanger 133. The refrigerant in the gas-liquid two-phase state that has flowed into the use-side heat exchanger 133 evaporates into gas refrigerant in the use-side heat exchanger 133. In the use-side heat exchanger 133 functioning as an evaporator, for example, heat exchange is performed between indoor air and the refrigerant, and the cooled air is used to perform indoor cooling. The gas refrigerant that has flowed out of the use-side heat exchanger 133 is sucked in from the suction port of the compressor 111 via the four-way valve 121 and the receiver 191.

(17-3) Control of Air Conditioner 1

Figure 23:
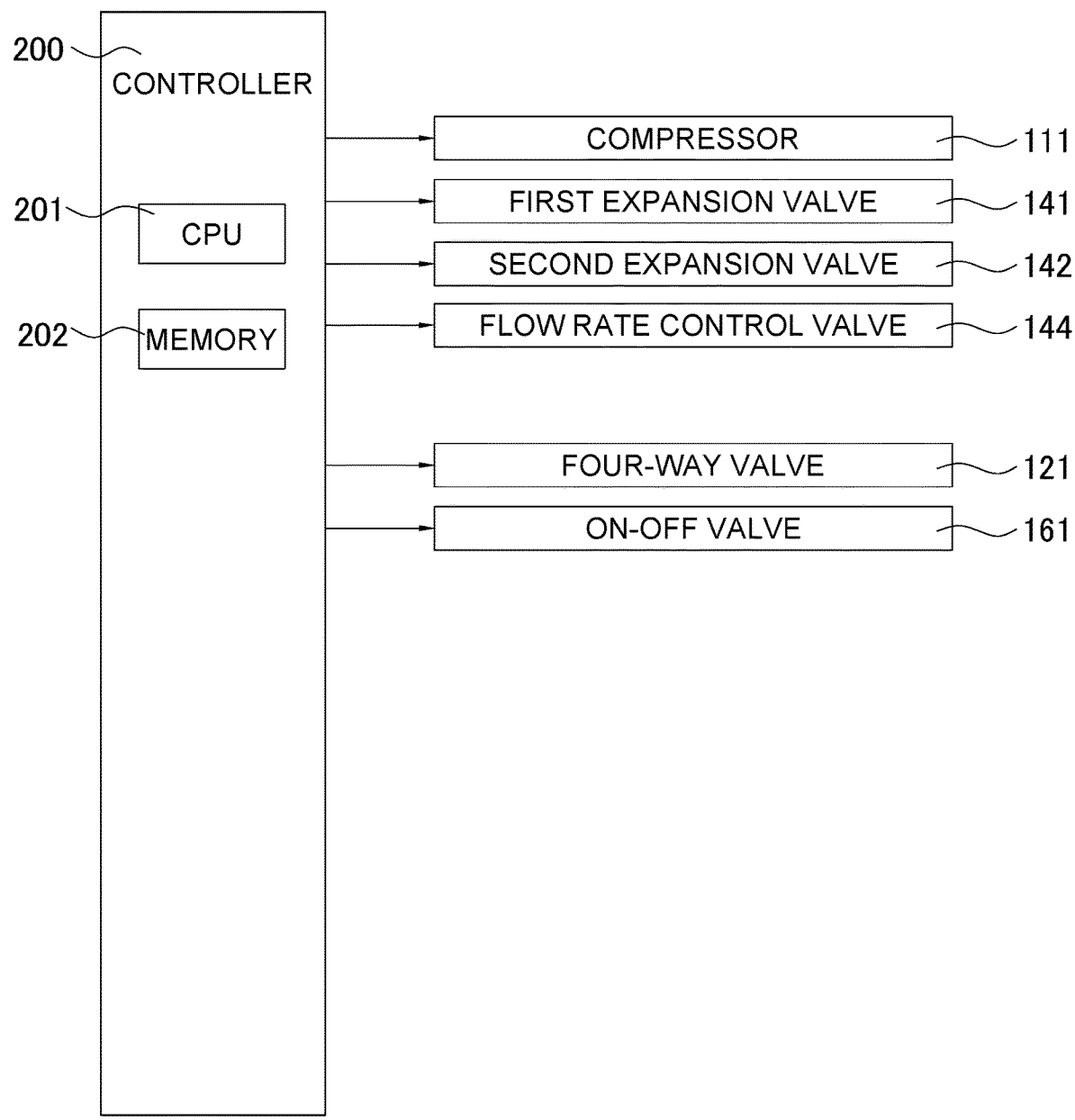
FIG. 23 is a block diagram for explaining a controller of the air conditioner in FIG. 21.

The air conditioner 1 according to the fifth embodiment includes a controller 200 illustrated in FIG. 23 to cause the internal devices to perform the operation described above.

The controller 200 controls the compressor 111, the first expansion valve 141, the second expansion valve 142, the flow rate control valve 144, the four-way valve 121, and the on-off valve 161.

Sixth Embodiment

(18) Overview of Configuration

Figure 24:
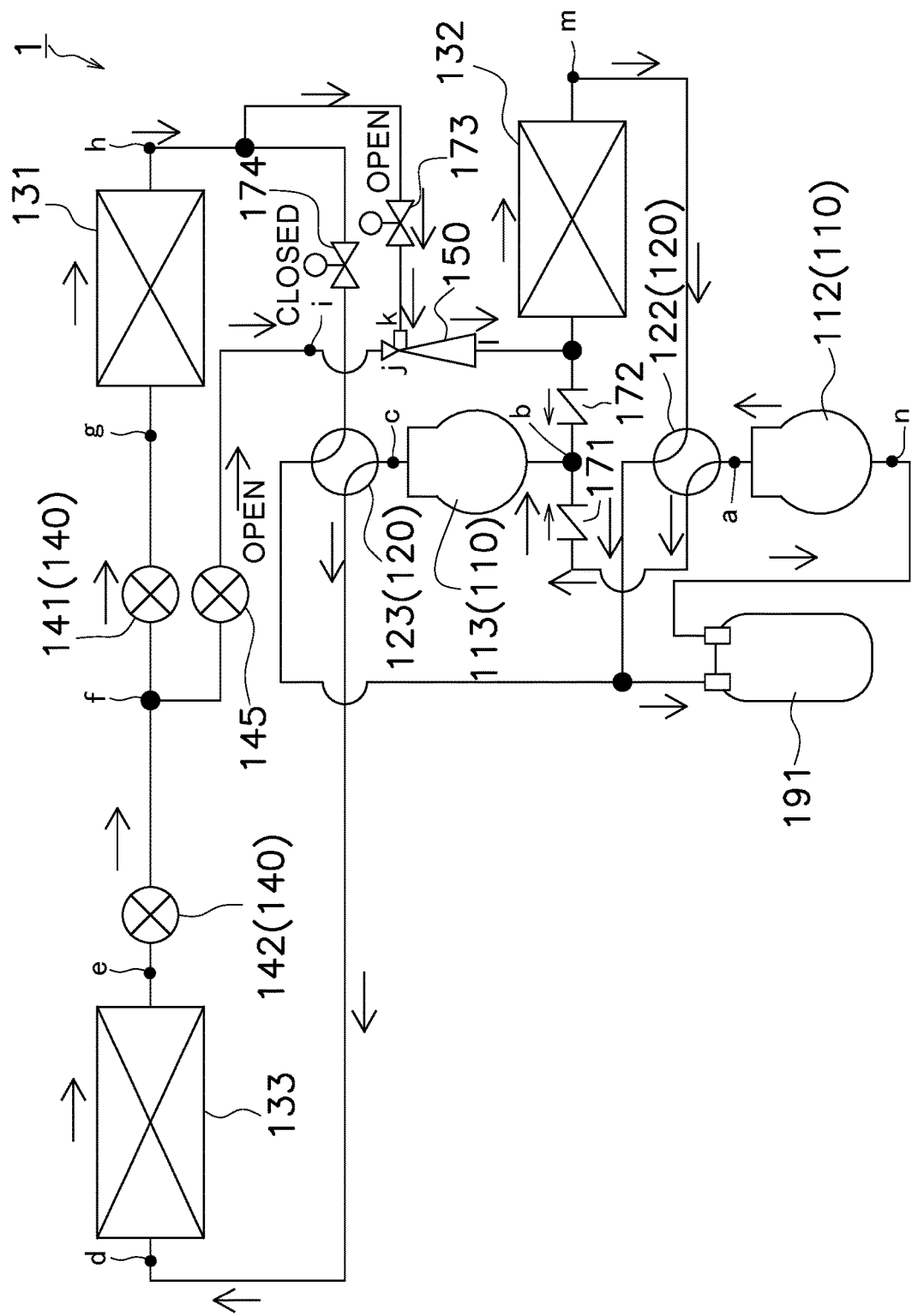
FIG. 24 is a circuit diagram for explaining a first operation of an air conditioner according to a sixth embodiment.
Figure 26:
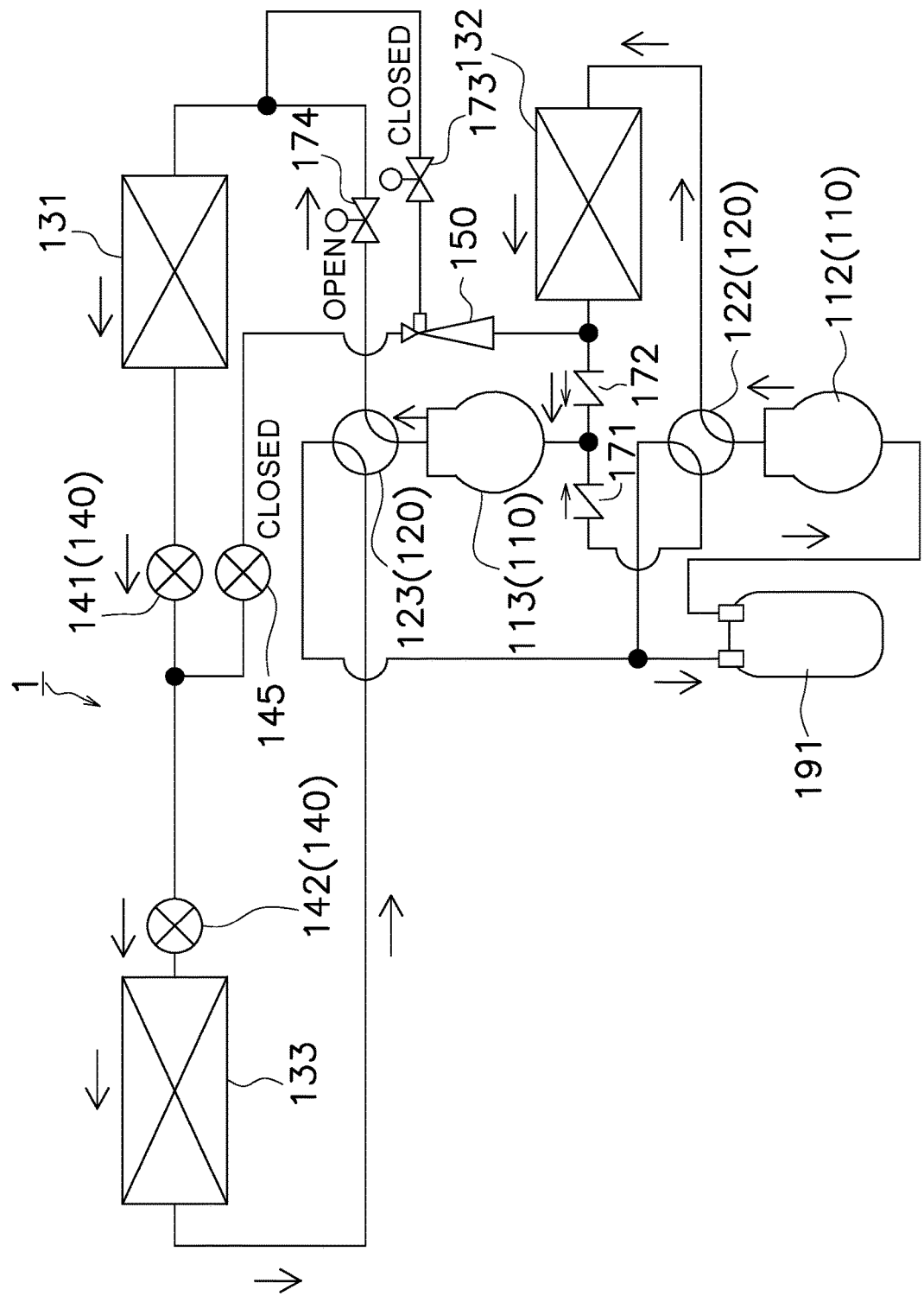
FIG. 26 is a circuit diagram for explaining a second operation of the air conditioner according to the sixth embodiment.

As illustrated in FIG. 24 and FIG. 26, an overview of the configuration of an air conditioner 1 according to a sixth embodiment is the same as the overview of the configuration according to the fourth embodiment described in (12) described above. Accordingly, a description of the overview of the configuration of the air conditioner 1 according to the sixth embodiment will be omitted here. FIG. 24 illustrates the air conditioner 1 in which the first operation is being performed, and FIG. 26 illustrates the air conditioner 1 in which the second operation is being performed.

(19) Detailed Configuration (19-1) Overview of Circuit Configuration of Air Conditioner 1

The air conditioner 1 according to the sixth embodiment includes, in addition to the compression mechanism 110, the first heat-source-side heat exchanger 131, the second heat-source-side heat exchanger 132, the use-side heat exchanger 133, the ejector 150, the expansion mechanism 140 (the first expansion valve 141 and the second expansion valve 142), and the switching mechanism 120 described above, a check valve 171, which is a sixth valve, a check valve 172, which is a seventh valve, an on-off valve 173, which is an eighth valve, an on-off valve 174, which is a ninth valve, and a flow rate control valve 145, which is a tenth valve.

The compression mechanism 110 includes a compressor 112, which is a first compression element in the preceding stage, and a compressor 113, which is a second compression element in the subsequent stage. The switching mechanism 120 includes a four-way valve 122, which is a first four-way valve, and a four-way valve 123, which is a second four-way valve. Each of the four-way valves 122 and 123 has a first port, a second port, a third port, and a fourth port.

The first port of the four-way valve 122 communicates with a discharge port of the compressor 112, the second port of the four-way valve 122 communicates with a first inlet/outlet of the second heat-source-side heat exchanger 132, and the third port of the four-way valve 122 communicates with a suction port of the compressor 112 through the receiver 191. The first inlet/outlet of the second heat-source-side heat exchanger 132 communicates with the second port of the four-way valve 122, and a second inlet/outlet of the second heat-source-side heat exchanger 132 communicates with the refrigerant outflow port of the ejector 150. The first port of the four-way valve 123 communicates with a discharge port of the compressor 113, the third port of the four-way valve 123 communicates with the third port of the four-way valve 122, and the fourth port of the four-way valve 123 communicates with a first inlet/outlet of the use-side heat exchanger 133.

The check valve 171 is coupled between the fourth port of the four-way valve 122 and a suction port of the compressor 113. The check valve 172 is coupled between the second inlet/outlet of the second heat-source-side heat exchanger 132 and the suction port of the compressor 113. The on-off valve 173 is coupled between the refrigerant suction port of the ejector 150 and a first inlet/outlet of the first heat-source-side heat exchanger 131. The on-off valve 174 is coupled between the second port of the four-way valve 123 and the first inlet/outlet of the first heat-source-side heat exchanger 131.

As illustrated in FIG. 24, during the first operation, the first port and the fourth port of each of the four-way valves 122 and 123 communicate with each other, and the second port and the third port of each of the four-way valves 122 and 123 communicate with each other. As illustrated in FIG. 24, during the second operation, the first port and the second port of each of the four-way valves 122 and 123 communicate with each other, and the third port and the fourth port of each of the four-way valves 122 and 123 communicate with each other. The check valve 171 is coupled such that refrigerant is allowed to flow during the first operation and refrigerant is prevented from flowing during the second operation. The check valve 172 is coupled such that refrigerant is prevented from flowing during the first operation and refrigerant is allowed to flow during the second operation. The on-off valve 173 is controlled to allow refrigerant to flow during the first operation and to prevent refrigerant from flowing during the second operation. The on-off valve 174 is controlled to prevent refrigerant from flowing during the first operation and to allow refrigerant to flow during the second operation.

(19-2) Details of Circuit Configuration of Air Conditioner 1

The air conditioner 1 illustrated in FIG. 24 and FIG. 26 further includes a receiver 191. An inflow port of the receiver 191 communicates with the third ports of both the four-way valves 122 and 123. An outflow port of the receiver 191 communicates with the suction port of the compressor 112.

Figure 25:
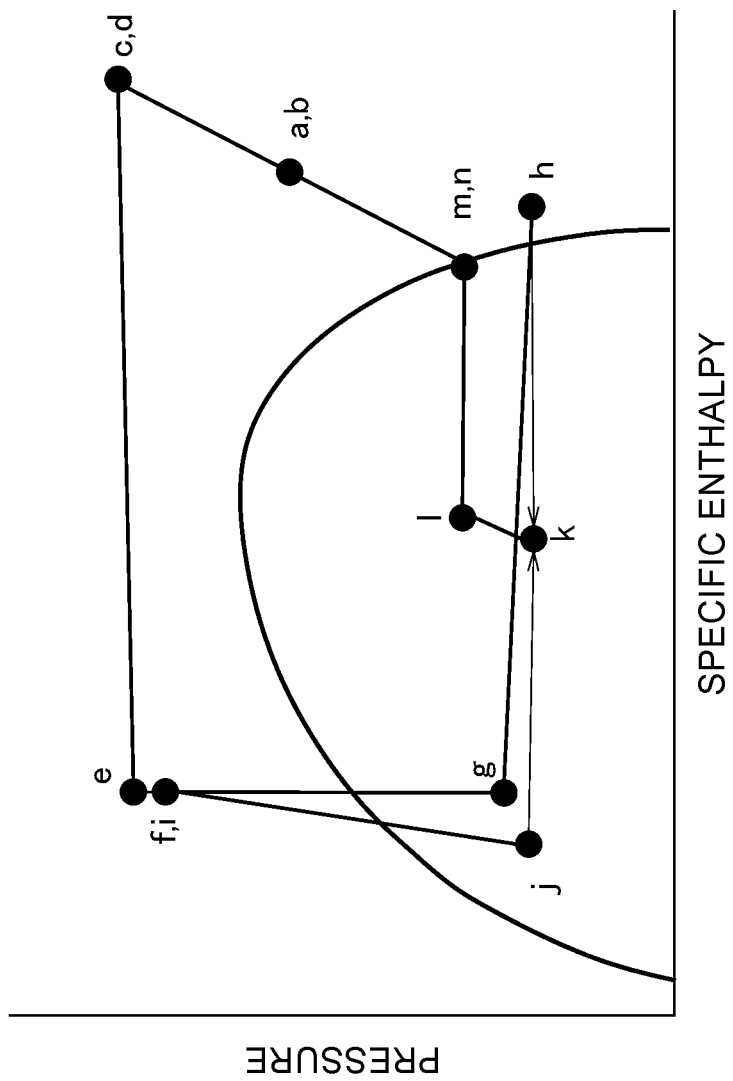
FIG. 25 is a Mollier diagram illustrating a state of refrigerant in the first operation of the air conditioner in FIG. 24.

(20) Overall Operation (20-1) Operation of Air Conditioner 1 during First Operation The operation of the air conditioner 1 according to the sixth embodiment during the first operation using carbon dioxide as refrigerant will be described with reference to FIG. 24 and FIG. 25. The refrigerant discharged from the discharge port of the compressor 112 (point a) is sucked in from the suction port of the compressor 113 (point b) through the check valve 171. The refrigerant sucked into the compressor 113 is further compressed by the compressor 113. The refrigerant discharged from the discharge port of the compressor 113 (point c) is in a supercritical state. The state of the refrigerant at the suction port of the compressor 113 (point b) is the same as the state of the refrigerant at the discharge port of the compressor 112 (point a).

The refrigerant in the supercritical state discharged from the compressor 113 flows into the use-side heat exchanger 133 via the four-way valve 123. The state of the refrigerant at the first inlet/outlet of the use-side heat exchanger 133 (point d) is the same as the state of the refrigerant at the discharge port of the compressor 113 (point c). The refrigerant in the supercritical state radiates heat in the use-side heat exchanger 133. In the use-side heat exchanger 133, for example, heat exchange is performed between indoor air and the refrigerant, and the warmed air is used to perform indoor heating.

The refrigerant at a second inlet/outlet of the use-side heat exchanger 133 (point e) is in a high-pressure state, and the specific enthalpy thereof is smaller than that at the point d. The second expansion valve 142 and the flow rate control valve 145 allow the refrigerant to pass therethrough without substantially decompressing the refrigerant. The refrigerant at the first end of the second expansion valve 142 (point f), the refrigerant at a first end and a second end (point i) of the flow rate control valve 145 (point f), and the refrigerant at the refrigerant inflow port of the ejector 150 (point i) are in substantially the same state as the refrigerant at the point f.

The refrigerant that has flowed into the refrigerant inflow port of the ejector 150 from the flow rate control valve 145 is decompressed and expanded by a nozzle (not illustrated) in the ejector 150 and becomes a low-pressure refrigerant in a gas-liquid two-phase state at the nozzle (point j). At the outlet of the nozzle (point k), the refrigerant that has flowed in from the refrigerant inflow port and low-pressure gas refrigerant sucked from the refrigerant suction port of the ejector 150 (here, the same as that at the first inlet/outlet of the first heat-source-side heat exchanger 131 (point h)) are mixed into refrigerant having a specific enthalpy between those of the refrigerant at the point j and the refrigerant at the point h. The refrigerant at the refrigerant outflow port of the ejector 150 (point 1) is in a state such that the pressure is raised to be higher than that of the refrigerant at the outlet of the nozzle (point k). The refrigerant that has been raised in pressure and flowed out of the refrigerant outflow port of the ejector 150 evaporates into gas refrigerant in the second heat-source-side heat exchanger 132. The refrigerant flowing out of the first inlet/outlet of the second heat-source-side heat exchanger 132 (point m) is gas refrigerant with a high specific enthalpy. The refrigerant that has flowed out of the second heat-source-side heat exchanger 132 is sucked in from the suction port of the compressor 111 (point n) via the four-way valve 122 and the receiver 191. The state of the refrigerant present at the suction port of the compressor 111 (point n) is substantially the same as that of the gas refrigerant at the first inlet/outlet of the second heat-source-side heat exchanger 132 (point m).

(20-2) Operation of Air Conditioner 1 during Second Operation

The operation of the air conditioner 1 during the second operation according to the sixth embodiment using carbon dioxide as refrigerant will be described with reference to FIG. 26. The refrigerant discharged from the discharge port of the compressor 112 in the preceding stage flows into the second heat-source-side heat exchanger 132 via the four-way valve 122. The refrigerant cooled in the second heat-source-side heat exchanger 132 is sucked in from the suction port of the compressor 113 in the subsequent stage. During the second operation, the second heat-source-side heat exchanger 132 functions as an intercooler.

The refrigerant in a critical state discharged from the compressor 113 in the subsequent stage flows into the first heat-source-side heat exchanger 131 via the on-off valve 174. The first heat-source-side heat exchanger 131 functions as a radiator and performs heat exchange to take heat from the refrigerant. The refrigerant that has flowed out of the first heat-source-side heat exchanger 131 passes through the first expansion valve 141 and is decompressed and expanded by the second expansion valve 142. The refrigerant decompressed and expanded by the second expansion valve 142 into a gas-liquid two-phase state flows into the use-side heat exchanger 133. The use-side heat exchanger 133 functions as an evaporator. For example, heat exchange is performed between indoor air and the refrigerant in the use-side heat exchanger 133, and the air cooled by the heat exchange is used to perform cooling. The refrigerant that has flowed out of the use-side heat exchanger 133 is sucked into the compressor 112 via the four-way valve 123 and the receiver 191.

(20-3) Control of Air Conditioner 1

Figure 27:
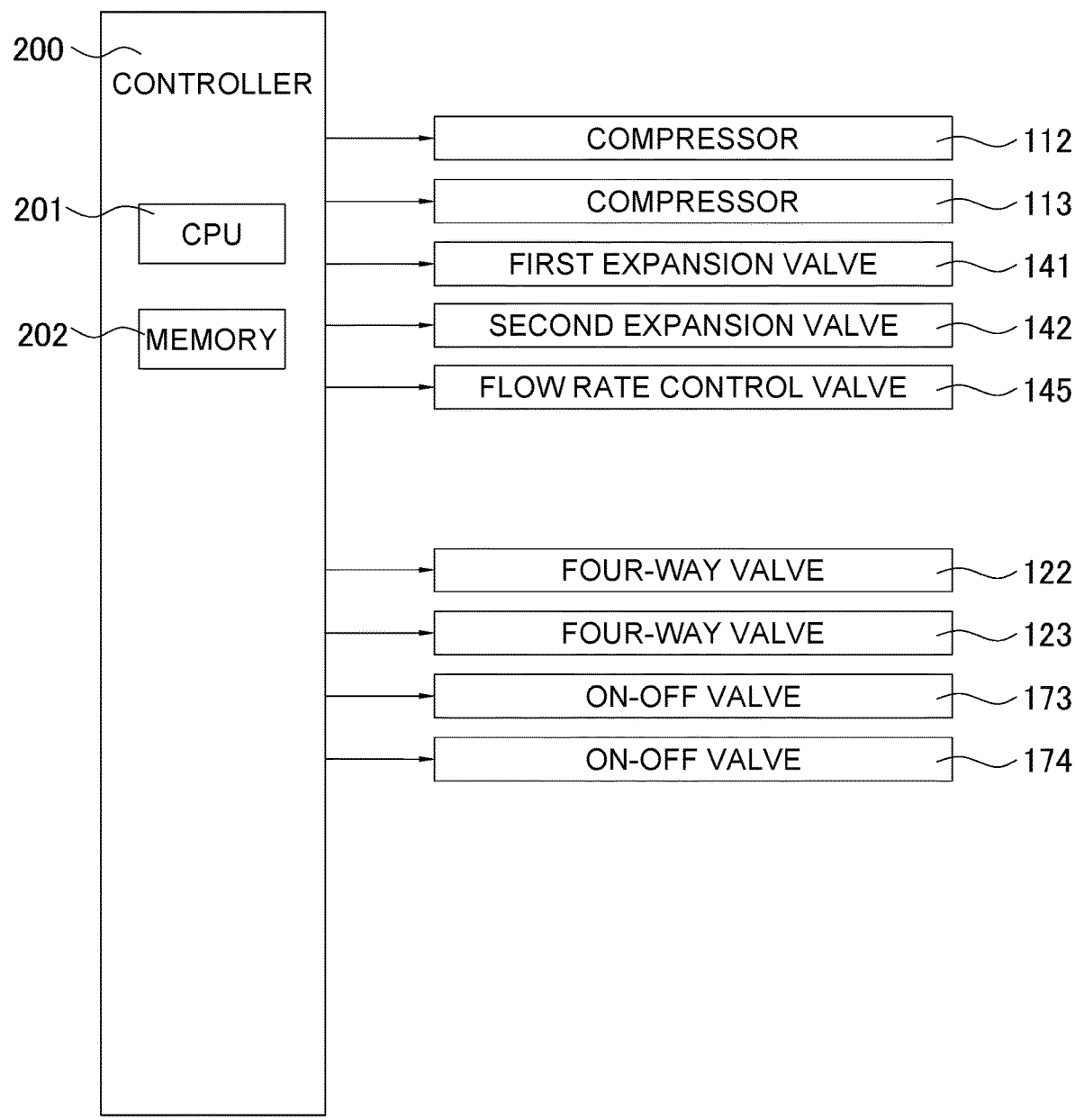
FIG. 27 is a block diagram for explaining a controller of the air conditioner in FIG. 24.

The air conditioner 1 according to the sixth embodiment includes a controller 200 illustrated in FIG. 27 to cause the internal devices to perform the operation described above. The controller 200 controls the compressors 112 and 113, the four-way valves 122 and 123, the first expansion valve 141, the second expansion valve 142, the flow rate control valve 145, and the on-off valves 173 and 174.

Seventh Embodiment

(21) Overview of Configuration

Figure 28:
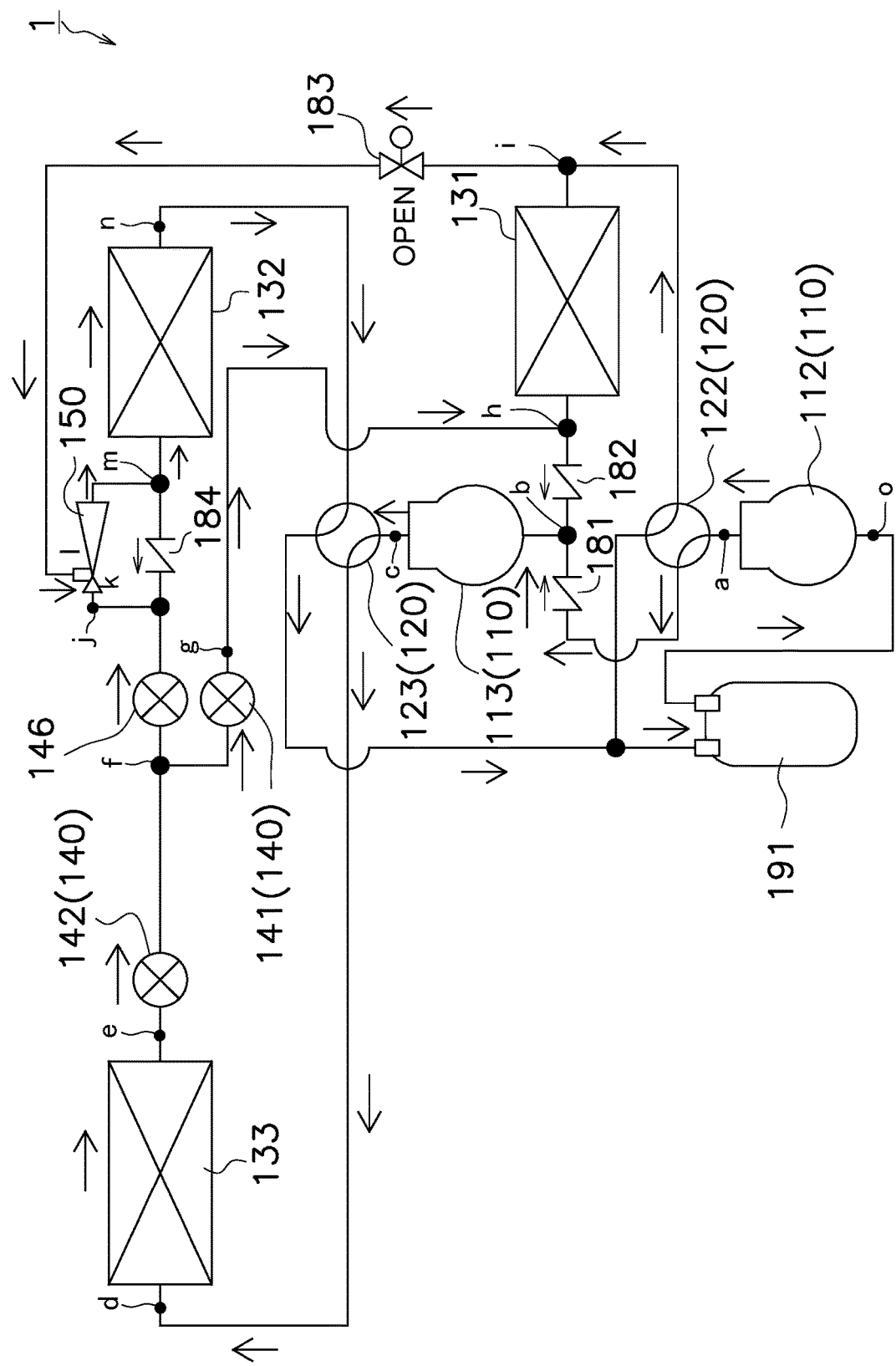
FIG. 28 is a circuit diagram for explaining a first operation of an air conditioner according to a seventh embodiment.
Figure 30:
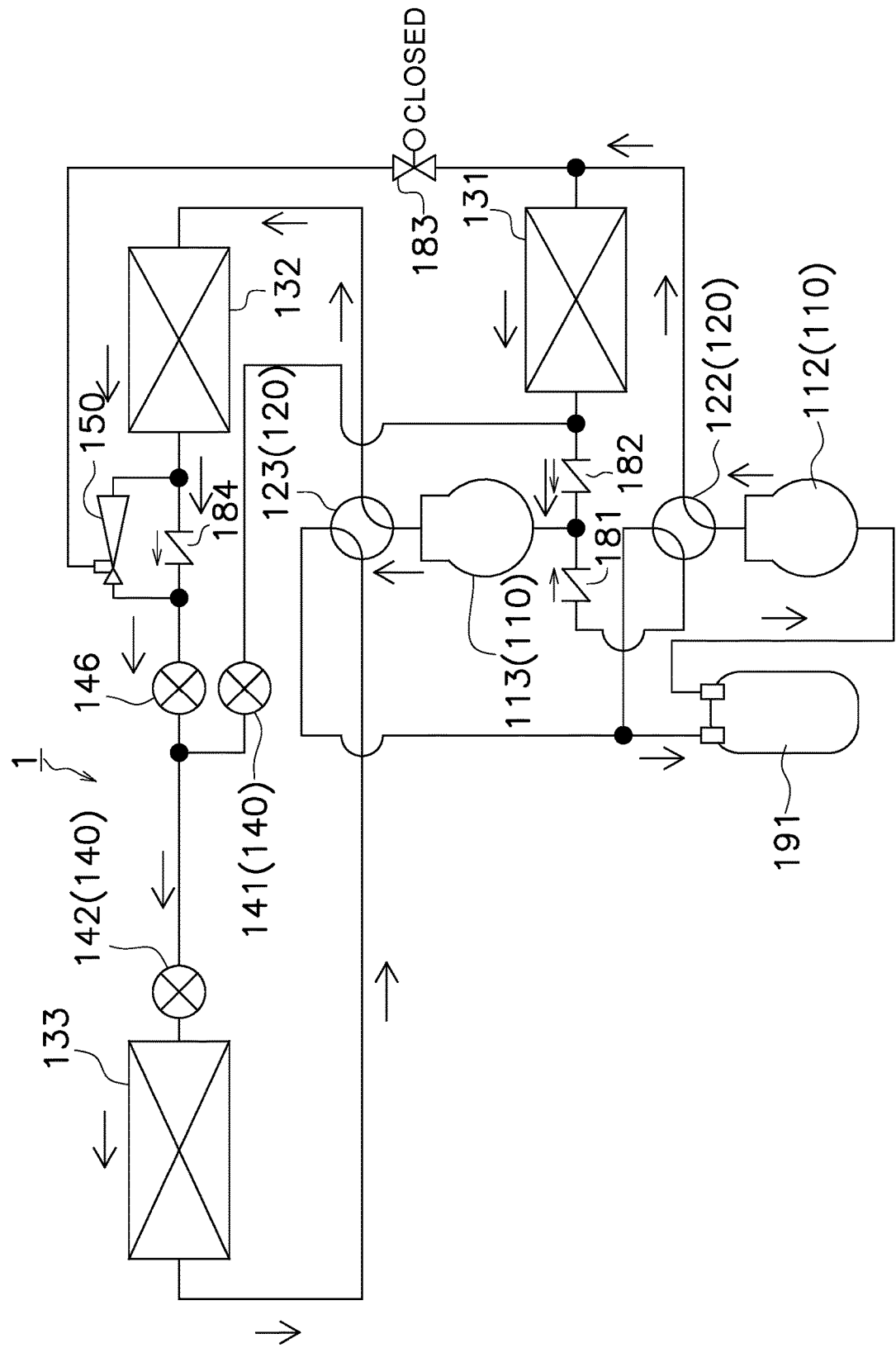
FIG. 30 is a circuit diagram for explaining a second operation of the air conditioner according to the seventh embodiment.

As illustrated in FIG. 28 and FIG. 30, an overview of the configuration of an air conditioner 1 according to a seventh embodiment is the same as the overview of the configuration according to the fourth embodiment described in (12) described above. Accordingly, a description of the overview of the configuration of the air conditioner 1 according to the seventh embodiment will be omitted here. FIG. 28 illustrates the air conditioner 1 in which the first operation is being performed, and FIG. 30 illustrates the air conditioner 1 in which the second operation is being performed.

(22) Detailed Configuration (22-1) Overview of Circuit Configuration of Air Conditioner 1

The air conditioner 1 according to the seventh embodiment includes, in addition to the compression mechanism 110, the first heat-source-side heat exchanger 131, the second heat-source-side heat exchanger 132, the use-side heat exchanger 133, the expansion mechanism 140 (the first expansion valve 141 and the second expansion valve 142), and the switching mechanism 120 described above, a check valve 181, which is an eleventh valve, a check valve 182, which is a twelfth valve, an on-off valve 183, which is a thirteenth valve, a check valve 184, which is a fourteenth valve, and a flow rate control valve 146, which is a tenth valve.

The compression mechanism 110 includes a compressor 112, which is a first compression element, and a compressor 113, which is a second compression element. The compressor 112 is arranged in the preceding stage, and the compressor 113 is arranged in the subsequent stage. The compressors 112 and 113 perform two-stage compression such that the refrigerant discharged from the compressor 112 is further compressed by the compressor 113. Each of the first expansion valve 141 and the flow rate control valve 146 has a first end through which refrigerant is allowed to flow between the corresponding one of the first expansion valve 141 and the flow rate control valve 146 and the use-side heat exchanger 133. In other words, the first ends of both the first expansion valve 141 and the flow rate control valve 146 communicate with a second inlet/outlet of the use-side heat exchanger 133. The first expansion valve 141 has a second end communicating with a second inlet/outlet of the first heat-source-side heat exchanger 131. The flow rate control valve 146 has a second end communicating with the refrigerant inflow port of the ejector 150.

The switching mechanism 120 includes a four-way valve 122, which is a first four-way valve, and a four-way valve 123, which is a second four-way valve. Each of the four-way valves 122 and 123 has a first port and a fourth port communicating with each other, and a second port and a third port communicating with each other during the first operation. During the second operation, the first port and the second port of each of the four-way valves 122 and 123 communicate with each other, and the third port and the fourth port of each of the four-way valves 122 and 123 communicate with each other. The first port of the four-way valve 122 communicates with the discharge port of the compressor 112, the second port of the four-way valve 122 communicates with the first inlet/outlet of the first heat-source-side heat exchanger 131, and the third port of the four-way valve 122 communicates with the suction side of the compressor 112. The fourth port of the four-way valve 122 communicates with the suction port of the compressor 112 through the check valve 181. The first port of the four-way valve 123 communicates with a discharge port of the compressor 113, the third port of the four-way valve 123 communicates with the third port of the four-way valve 122, and the fourth port of the four-way valve 123 communicates with a first inlet/outlet of the use-side heat exchanger 133. The four-way valve 123 allows the refrigerant that flows through the use-side heat exchanger 133 to pass through the fourth port. During the first operation, the refrigerant flows from the fourth port of the four-way valve 123 to the first inlet/outlet of the use-side heat exchanger 133, and during the second operation, the refrigerant flows from the first inlet/outlet of the use-side heat exchanger 133 to the fourth port of the four-way valve 123. A first inlet/outlet of the first heat-source-side heat exchanger 131 communicates with the refrigerant suction port of the ejector 150, and the second inlet/outlet of the first heat-source-side heat exchanger 131 communicates with the suction port of the compressor 113 through the check valve 182.

The check valve 181 has a first end communicating with the fourth port of the four-way valve 122, and a second end communicating with the suction port of the compressor 113. In other words, the check valve 181 is coupled between the fourth port of the four-way valve 122 and the suction side of the compressor 113. The check valve 181 is coupled such that refrigerant is allowed to flow during the first operation and refrigerant is prevented from flowing during the second operation. The check valve 182 has a first end communicating with the second inlet/outlet of the first heat-source-side heat exchanger 131, and a second end communicating with the suction port of the compressor 113. In other words, the check valve 182 is coupled between the second inlet/outlet of the first heat-source-side heat exchanger 131 and the suction side of the compressor 113. The check valve 182 is coupled such that refrigerant is prevented from flowing during the first operation and refrigerant is allowed to flow during the second operation.

The on-off valve 183 has a first end communicating with the refrigerant suction port of the ejector 150, and a second end communicating with the first inlet/outlet of the first heat-source-side heat exchanger 131. In other words, the on-off valve 183 is coupled between the refrigerant suction port of the ejector 150 and the first inlet/outlet of the first heat-source-side heat exchanger 131. The on-off valve 183 is controlled to allow refrigerant to flow during the first operation and to prevent refrigerant from flowing during the second operation. The check valve 184 has a first end communicating with a second inlet/outlet of the second heat-source-side heat exchanger 132 and the refrigerant outflow port of the ejector 150, and a second end communicating with a second end of the flow rate control valve 146. In other words, the check valve 184 is coupled between the refrigerant outflow port and the refrigerant inflow port of the ejector 150. The check valve 184 is further coupled between the second end of the flow rate control valve 146 and the second inlet/outlet of the second heat-source-side heat exchanger 132. The second end of the flow rate control valve 146 communicates with the refrigerant inflow port of the ejector 150. The refrigerant outflow port of the ejector 150 communicates with the second inlet/outlet of the second heat-source-side heat exchanger 132. The check valve 184 is coupled such that refrigerant is prevented from flowing during the first operation and refrigerant is allowed to flow during the second operation.

(22-2) Details of Circuit Configuration of Air Conditioner

The air conditioner 1 illustrated in FIG. 28 and FIG. 30 further includes a receiver 191. An inflow port of the receiver 191 communicates with the third ports of both the four-way valves 122 and 123. An outflow port of the receiver 191 communicates with the suction port of the compressor 112.

Figure 29:
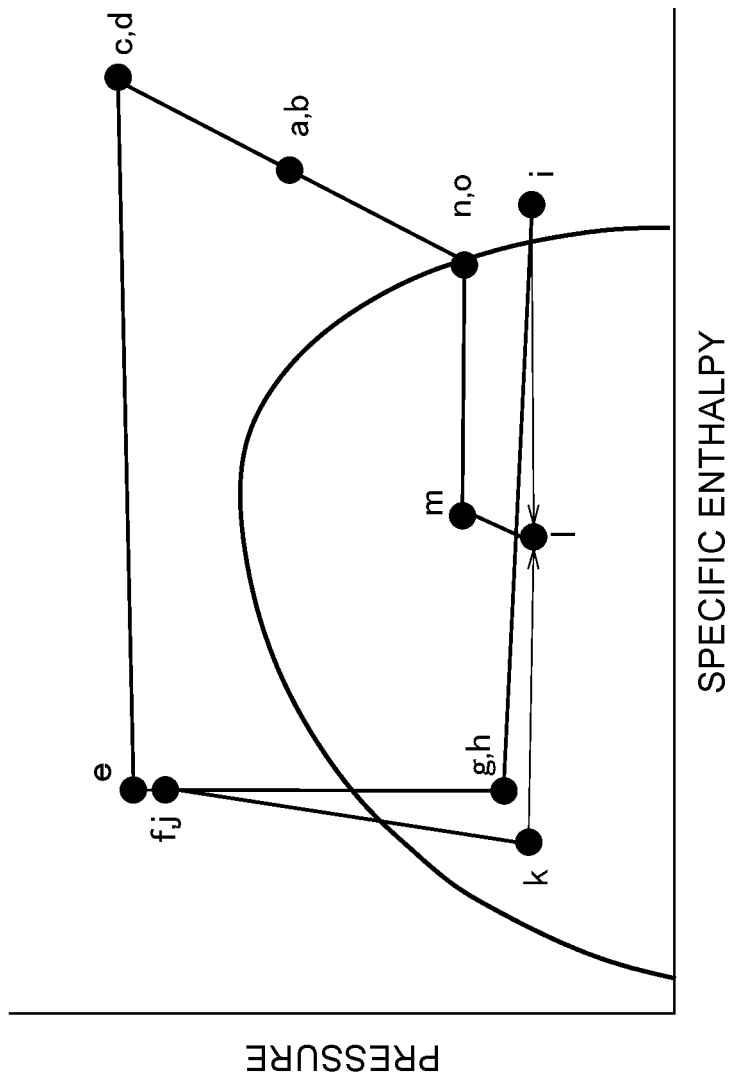
FIG. 29 is a Mollier diagram illustrating a state of refrigerant in the first operation of the air conditioner in FIG. 28.

(23) Overall Operation (23-1) Operation of Air Conditioner 1 during First Operation The operation of the air conditioner 1 according to the seventh embodiment during the first operation using carbon dioxide as refrigerant will be described with reference to FIG. 28 and FIG. 29. The refrigerant discharged from the discharge port of the compressor 112 (point a) is sucked in from the suction port of the compressor 113 (point b) through the check valve 181. The refrigerant sucked into the compressor 113 is further compressed by the compressor 113. The refrigerant discharged from the discharge port of the compressor 113 (point c) is in a supercritical state. The state of the refrigerant at the suction port of the compressor 113 (point b) is the same as the state of the refrigerant at the discharge port of the compressor 112 (point a).

The refrigerant in the supercritical state discharged from the compressor 113 flows into the use-side heat exchanger 133 via the four-way valve 123. The state of the refrigerant at the first inlet/outlet of the use-side heat exchanger 133 (point d) is the same as the state of the refrigerant at the discharge port of the compressor 113 (point c). The refrigerant in the supercritical state radiates heat in the use-side heat exchanger 133. In the use-side heat exchanger 133, for example, heat exchange is performed between indoor air and the refrigerant, and the warmed air is used to perform indoor heating.

The refrigerant at a second inlet/outlet of the use-side heat exchanger 133 (point e) is in a high-pressure state, and the specific enthalpy thereof is smaller than that at the point d. The second expansion valve 142 and the flow rate control valve 146 allow the refrigerant to pass therethrough without substantially decompressing the refrigerant. The refrigerant at a first end of the second expansion valve 142 (point f) and the refrigerant at the first end of the flow rate control valve 146 (point f) and at the refrigerant inflow port of the ejector 150 (point j) are in substantially the same state as the refrigerant at the point f.

The refrigerant that has flowed into the refrigerant inflow port of the ejector 150 from the flow rate control valve 146 is decompressed and expanded by a nozzle (not illustrated) in the ejector 150 and becomes a low-pressure refrigerant in a gas-liquid two-phase state at the nozzle (point k). At the outlet of the nozzle (point l), the refrigerant that has flowed in from the refrigerant inflow port and low-pressure gas refrigerant sucked from the refrigerant suction port of the ejector 150 (here, the same as that at the first inlet/outlet of the first heat-source-side heat exchanger 131 (point i)) are mixed into refrigerant having a specific enthalpy between those of the refrigerant at the point k and the refrigerant at the point i. The refrigerant at the refrigerant outflow port of the ejector 150 (point m) is in a state such that the pressure is raised to be higher than that of the refrigerant at the outlet of the nozzle (point l). The refrigerant that has been raised in pressure and flowed out of the refrigerant outflow port of the ejector 150 evaporates into gas refrigerant in the second heat-source-side heat exchanger 132. The refrigerant flowing out of the first inlet/outlet of the second heat-source-side heat exchanger 132 (point n) is gas refrigerant with a high specific enthalpy. The refrigerant that has flowed out of the second heat-source-side heat exchanger 132 is sucked in from the suction port of the compressor 111 (point o) via the four-way valve 123 and the receiver 191. The state of the refrigerant present at the suction port of the compressor 111 (point o) is substantially the same as that of the gas refrigerant at the first inlet/outlet of the second heat-source-side heat exchanger 132 (point n).

(23-2) Operation of Air Conditioner 1 during Second Operation

The second operation of the air conditioner 1 during the second operation according to the seventh embodiment using carbon dioxide as refrigerant will be described with reference to FIG. 30. The refrigerant discharged from the discharge port of the compressor 112 in the preceding stage flows into the first heat-source-side heat exchanger 131 via the four-way valve 122. The refrigerant cooled in the first heat-source-side heat exchanger 131 is sucked in from the suction port of the compressor 113 in the subsequent stage. During the second operation, the first heat-source-side heat exchanger 131 functions as an intercooler.

The refrigerant in a critical state discharged from the compressor 113 in the subsequent stage flows into the second heat-source-side heat exchanger 132. The second heat-source-side heat exchanger 132 functions as a radiator and performs heat exchange to take heat from the refrigerant. The refrigerant that has flowed out of the first heat-source-side heat exchanger 131 passes through the first expansion valve 141 and is decompressed and expanded by the second expansion valve 142. The refrigerant decompressed and expanded by the second expansion valve 142 into a gas-liquid two-phase state flows into the use-side heat exchanger 133. The use-side heat exchanger 133 functions as an evaporator. For example, heat exchange is performed between indoor air and the refrigerant in the use-side heat exchanger 133, and the air cooled by the heat exchange is used to perform cooling. The refrigerant that has flowed out of the use-side heat exchanger 133 is sucked into the compressor 112 via the four-way valve 123 and the receiver 191.

(23-3) Control of Air Conditioner 1

Figure 31:
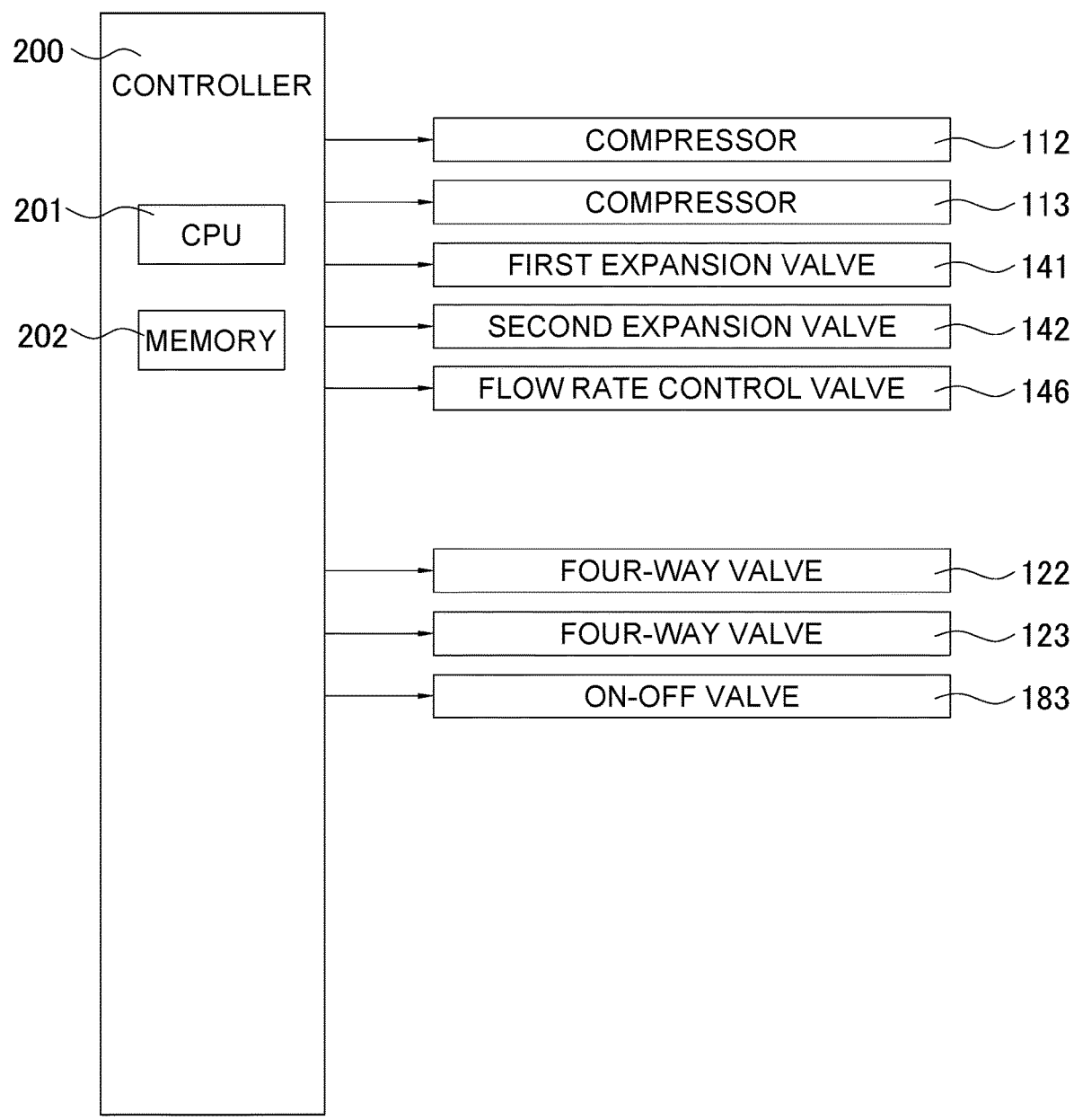
FIG. 31 is a block diagram for explaining a controller of the air conditioner in FIG. 28.

The air conditioner 1 according to the seventh embodiment includes a controller 200 illustrated in FIG. 31 to cause the internal devices to perform the operation described above. The controller 200 controls the compressors 112 and 113, the four-way valves 122 and 123, the first expansion valve 141, the second expansion valve 142, the flow rate control valve 146, and the on-off valve 183.

(24) Modifications (24-1) Modification H

The air conditioner 1 according to the fourth embodiment, the fifth embodiment, the sixth embodiment, and the seventh embodiment in which the compression mechanism 110 is constituted by one compressor 111 or two compressors 112 and 113 has been described. However, the compression mechanism 110 is not limited to one constituted by one compressor 111 or two compressors 112, 113. For example, the compression mechanism 110 may be constituted by three or more compressors. In other words, the compression mechanism 110 may be configured to perform compression in three or more multiple stages. When the compression mechanism 110 is configured to perform two-stage compression, for example, one compressor may include a first compression element for low-pressure compression and a second compression element for high-pressure compression. When the compression mechanism 110 is constituted by a plurality of compressors, the compressors may be coupled in parallel.

(24-2) Modification I

Figure 32:
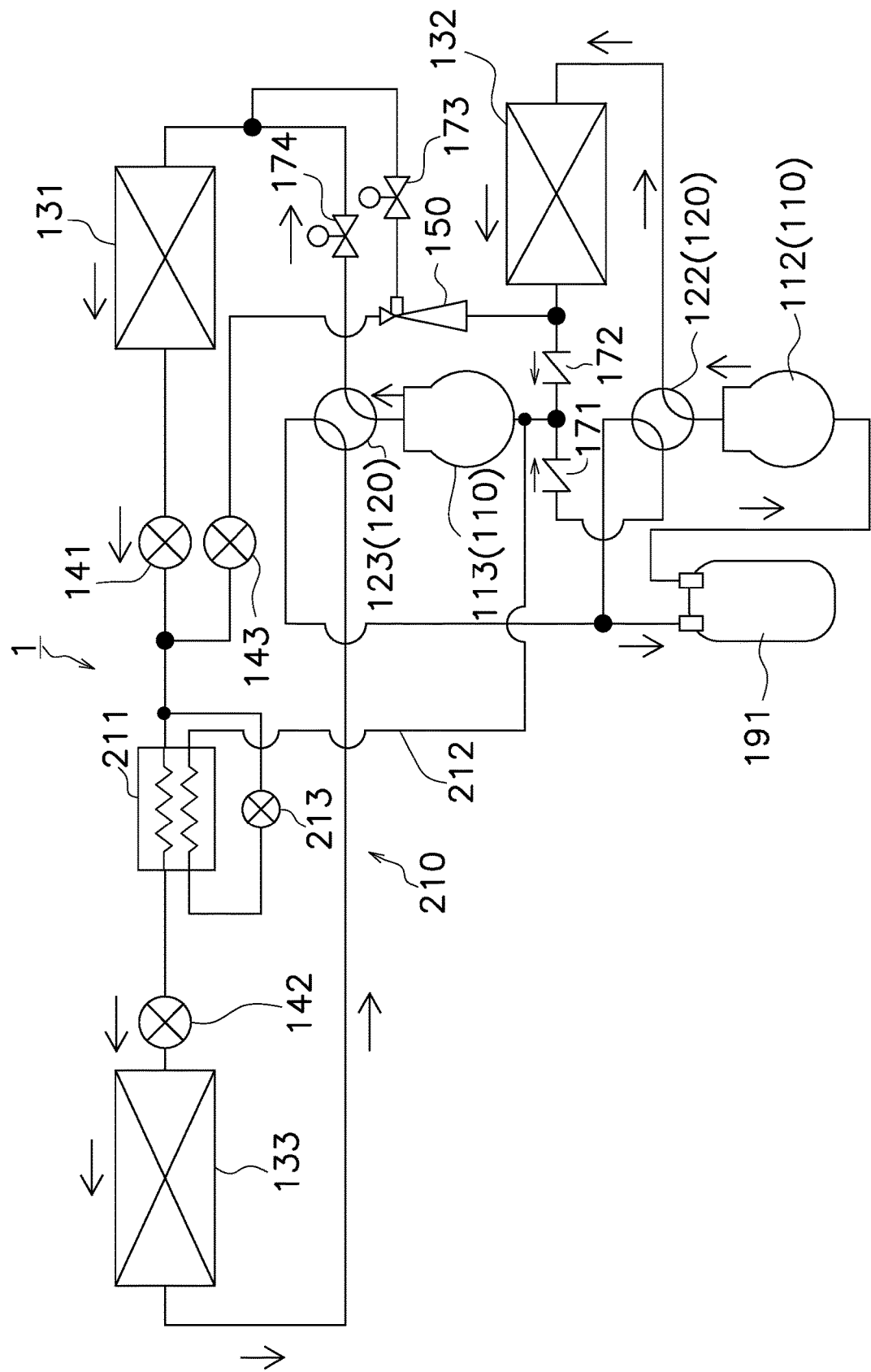
FIG. 32 is a circuit diagram for explaining an air conditioner according to modification I.

The air conditioner 1 including a compression mechanism configured to perform multi-stage compression described in the sixth embodiment or the seventh embodiment may be provided with an economizer circuit 210 illustrated in FIG. 32. The economizer circuit 210 includes an economizer heat exchanger 211, an injection pipe 212, and an injection valve 213. The injection pipe 212 branches the refrigerant delivered from the radiator to the expansion valve and returns the branched refrigerant to the suction port of the compressor 113 in the subsequent stage (downstream). The economizer heat exchanger 211 performs heat exchange between the refrigerant delivered from the radiator to the expansion valve and intermediate-pressure refrigerant in the refrigeration cycle flowing through the injection pipe 212. The injection valve 213 is an expansion valve and decompresses and expands the refrigerant in the injection pipe 212 before the refrigerant enters the economizer heat exchanger 211 by the injection pipe 212. The refrigerant that has passed through the injection valve 213 is intermediate-pressure refrigerant. In the air conditioner 1, since intermediate-pressure injection using the economizer heat exchanger 211 and the injection pipe 212 is adopted, the temperature of the refrigerant to be sucked into the compressor 113 in the subsequent stage (downstream) can be kept low with no heat radiate to the outside, and the refrigerant to be delivered to the evaporator can be cooled. For example, in the second operation, the first heat-source-side heat exchanger 131 functions as a radiator, the use-side heat exchanger 133 functions as an evaporator, and the second expansion valve 142 performs decompression and expansion.

(24-3) Modification J

Figure 33:
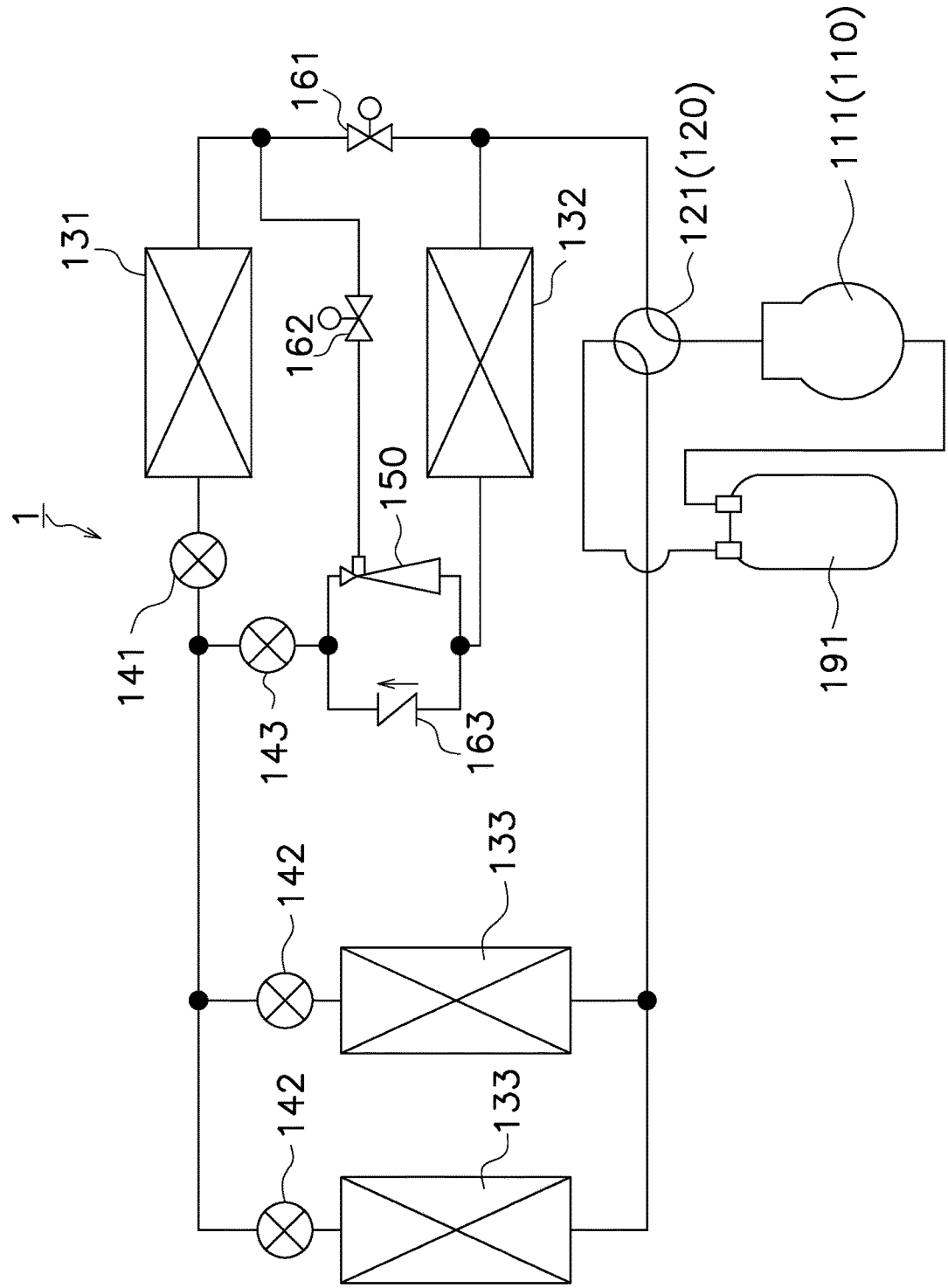
FIG. 33 is a circuit diagram for explaining an air conditioner according to modification J.

The air conditioner 1 described above including one use-side heat exchanger 133 has been described. However, the air conditioner 1 may include a plurality of use-side heat exchangers. When the air conditioner 1 according to the fourth embodiment includes two use-side heat exchangers 133, for example, as illustrated in FIG. 33, two units each including the use-side heat exchanger 133 and the second expansion valve 142 may be coupled in parallel.

(24-4) Modification K

While the air conditioner 1 described above including the first expansion valve 141 and the second expansion valve 142 has been described, the first expansion valve 141 and the second expansion valve 142 may be combined into a single expansion valve. For example, the first expansion valve 141 may be omitted, and the second expansion valve 142 may perform decompression and expansion in the second operation. The second expansion valve 142 having the configuration described above also serves as a first expansion valve.

(24-5) Modification L

The air conditioner 1 described above including the check valves 163, 171, 172, 181, and 182 has been described. However, the check valves 163, 171, 172, 181, and 182 may be each replaced with an on-off valve. Further, the air conditioner 1 described above including the flow rate control valves 143, 144, 145, and 146 have been described. However, the flow rate control valves 143, 144, 145, and 146 may be each replaced with an on-off valve. Alternatively, the flow rate control valves 143, 144, 145, and 146 may be each replaced with an expansion valve. The air conditioner 1 may be configured such that, before allowing refrigerant to flow to the ejector 150, an expansion valve decompresses and expands the refrigerant upstream of the refrigerant inflow port of the ejector 150 and allows refrigerant having an intermediate pressure between a high pressure and a low pressure to flow to the refrigerant inflow port of the ejector 150.

(24-6) Modification M

The air conditioner 1 described above in which carbon dioxide is used as refrigerant has been described. The refrigerant used in the air conditioner 1 described above is preferably carbon dioxide or a refrigerant mixture containing carbon dioxide in which the refrigerant to be discharged from the compression mechanism 110 has a high pressure. However, the air conditioner 1 described above may use refrigerant other than carbon dioxide or a refrigerant mixture containing carbon dioxide. For example, refrigerant whose saturation pressure is greater than or equal to 4.5 MPa when reaching a saturation temperature of 65° C. may be used. Examples of such refrigerant include R410A refrigerant. Alternatively, a chlorofluorocarbon-based refrigerant that reaches a critical state when discharged from the compression mechanism 110 may be used. Examples of such chlorofluorocarbon-based refrigerant include R23 refrigerant.

(25) Features (25-1)

The air conditioner 1 according to the fourth and subsequent embodiments described above can perform, for example, heating in the first operation by using heat radiated from the refrigerant in the use-side heat exchanger 133 and cooling in the second operation by heat absorption due to the evaporation of the refrigerant in the use-side heat exchanger 133. The air conditioner 1 described above can provide efficient operation by, for example, switching between heating operation using the ejector 150 and cooling operation without the ejector 150.

(25-2)

In the air conditioner 1 according to the fourth embodiment illustrated in FIG. 17 and FIG. 19, the ejector 150 can be bypassed during the second operation by using the on-off valve 161, which is a first valve, the on-off valve 162, which is a second valve, and the check valve 163, which is a third valve. As illustrated in FIG. 17, in the first operation, in the air conditioner 1 according to the fourth embodiment, the flow rate control valve 143 and the on-off valve 162 are opened and the on-off valve 161 is closed such that no refrigerant flows through the check valve 163. As a result, refrigerant can be allowed to appropriately flow through the ejector 150. As illustrated in FIG. 19, in the second operation, in the air conditioner 1 according to the fourth embodiment, the on-off valve 162 are closed and the flow rate control valve 143 and the on-off valve 161 is opened such that refrigerant flows through the check valve 163 and no refrigerant flows through the ejector 150. As a result, in the second operation, the first heat-source-side heat exchanger 131 and the second heat-source-side heat exchanger 132 functioning as radiators, and the use-side heat exchanger 133 functioning as an evaporator can perform cooling, for example.

The air conditioner 1 according to the fourth embodiment can allow refrigerant to flow through the first heat-source-side heat exchanger 131 and the second heat-source-side heat exchanger 132 in parallel during the second operation.

(25-3)

In the air conditioner 1 according to the fifth embodiment illustrated in FIG. 21 and FIG. 22, the ejector 150 can be bypassed during the second operation by using the on-off valve 164, which is a fifth valve, and the flow rate control valve 144, which is a fourth valve. As illustrated in FIG. 21, in the first operation, in the air conditioner 1 according to the fifth embodiment, the flow rate control valve 144 is opened and the on-off valve 164 is closed. As a result, refrigerant can be allowed to appropriately flow through the ejector 150. As illustrated in FIG. 22, in the second operation, in the air conditioner 1 according to the fourth embodiment, the flow rate control valve 144 is closed and the on-off valve 164 is opened such that no refrigerant flows through the ejector 150. As a result, in the second operation, the first heat-source-side heat exchanger 131 and the second heat-source-side heat exchanger 132 functioning as radiators, and the use-side heat exchanger 133 functioning as an evaporator can perform cooling, for example.

The air conditioner 1 according to the fifth embodiment can allow refrigerant to flow through the first heat-source-side heat exchanger 131 and the second heat-source-side heat exchanger 132 in series during the second operation.

(25-4)

In the air conditioner 1 according to the sixth embodiment illustrated in FIG. 24 and FIG. 26, the ejector 150 can be bypassed during the second operation by using the check valve 171, which is a sixth valve, the check valve 172, which is a seventh valve, the on-off valve 173, which is an eighth valve, the on-off valve 174, which is a ninth valve, and the flow rate control valve 145, which is a tenth valve. As illustrated in FIG. 24, in the first operation, in the air conditioner 1 according to the sixth embodiment, the on-off valve 173 and the flow rate control valve 145 are opened and the on-off valve 174 is closed. As a result, refrigerant can be allowed to appropriately flow through the ejector 150. As illustrated in FIG. 26, in the second operation, in the air conditioner 1 according to the sixth embodiment, the on-off valve 173 and the flow rate control valve 145 are closed and the on-off valve 174 is opened such that no refrigerant flows through the ejector 150. As a result, in the second operation, the first heat-source-side heat exchanger 131 and the second heat-source-side heat exchanger 132 functioning as radiators, and the use-side heat exchanger 133 functioning as an evaporator can perform cooling, for example.

The air conditioner 1 according to the sixth embodiment can allow the second heat-source-side heat exchanger 132 to function as an intercooler during the second operation.

(25-5)

In the air conditioner 1 according to the seventh embodiment illustrated in FIG. 28 and FIG. 30, the ejector 150 can be bypassed during the second operation by using the check valve 181, which is an eleventh valve, the check valve 182, which is a twelfth valve, the on-off valve 183, which is a thirteenth valve, and the check valve 184, which is a fourteenth valve. As illustrated in FIG. 28, in the first operation, in the air conditioner 1 according to the seventh embodiment, the on-off valve 183 is opened. As a result, refrigerant can be allowed to appropriately flow through the ejector 150. As illustrated in FIG. 30, in the second operation, in the air conditioner 1 according to the sixth embodiment, the on-off valve 183 is closed such that no refrigerant flows through the ejector 150. As a result, in the second operation, the first heat-source-side heat exchanger 131 and the second heat-source-side heat exchanger 132 functioning as radiators, and the use-side heat exchanger 133 functioning as an evaporator can perform cooling, for example.

The air conditioner 1 according to the seventh embodiment can allow the first heat-source-side heat exchanger 131 to function as an intercooler during the second operation.

(25-6)

The compression mechanism 110 of the air conditioner 1 according to the sixth embodiment or the seventh embodiment is configured such that the compressor 112, which is a first compression element, and the compressor 113, which is a second compression element, perform multi-stage compression. The pressure of the refrigerant is raised to a high pressure by such multi-stage compression of the compression mechanism 110, which can bring the ejector 150 into efficient operation.

(25-7)

The air conditioner 1 according to modification I described with reference to FIG. 32 can increase the efficiency of cooling operation by using the economizer circuit 210.

While embodiments of the present disclosure have been described, it will be understood that forms and details can be changed in various ways without departing from the spirit and scope of the present disclosure as recited in the claims.

EXPLANATION OF REFERENCES 1 air conditioner
10 compression mechanism
11 compressor (example of compression mechanism)
12 compressor (example of compression mechanism, first compression element)
13 compressor (example of compression mechanism, second compression element)
20 switching mechanism
21 four-way valve (example of switching mechanism)
31 heat-source-side heat exchanger (example of first heat-source-side heat exchanger)
32, 133 use-side heat exchanger
34 intercooler
41 first expansion valve (example of expansion mechanism)
42 second expansion valve
43 flow rate control valve (example of second valve)
50 ejector
61 on-off valve (example of first valve)
63 check valve (example of third valve)
64 on-off valve (example of fourth valve)
65 check valve (example of fifth valve)
66 on-off valve (example of sixth valve)
67 check valve (example of seventh valve)
68 check valve (example of eighth valve)
70 economizer circuit
92 gas-liquid separator
93 accumulator
110 compression mechanism
111 compressor
112 compressor (example of first compression element)
113 compressor (example of second compression element)
120 switching mechanism
122 four-way valve (example of first four-way valve)
123 four-way valve (example of second four-way valve)
131 first heat-source-side heat exchanger
132 second heat-source-side heat exchanger 140 expansion mechanism
141 first expansion valve (example of expansion mechanism)
144 flow rate control valve (example of fourth valve)
145 flow rate control valve (example of tenth valve)
146 flow rate control valve (example of fifteenth valve)
150 ejector
161 on-off valve (example of first valve)
162 on-off valve (example of second valve)
163 check valve (example of third valve)
164 on-off valve (example of fifth valve)
171 check valve (example of sixth valve)
172 check valve (example of seventh valve)
173 on-off valve (example of eighth valve)
174 on-off valve (example of ninth valve)
181 check valve (example of eleventh valve)
182 check valve (example of twelfth valve)
183 on-off valve (example of thirteenth valve)
184 check valve (example of fourteenth valve)

CITATION LIST

Patent Literature

[PTL 1]Japanese Patent No. 4069656

The invention claimed is:

1. An air conditioner comprising a compressor, a first heat-source-side heat exchanger, a second heat-source-side heat exchanger, a use-side heat exchanger, an ejector that raises a pressure of refrigerant by using energy for refrigerant decompression and expansion, an expansion valve, and a switching valve, wherein
the switching valve switches between a refrigerant flow in a first operation and a refrigerant flow in a second operation,
in the first operation, the refrigerant compressed by the compressor radiates heat in the use-side heat exchanger and is decompressed and expanded by the ejector while the refrigerant evaporated in the first heat-source-side heat exchanger is raised in pressure by the ejector, and
in the second operation, the refrigerant compressed by the compressor radiates heat in the first heat-source-side heat exchanger and is decompressed and expanded by the expansion valve before being evaporated in the use-side heat exchanger while the refrigerant does not flow through the ejector,
the switching valve is configured such that in the first operation, the refrigerant compressed by the compressor radiates heat in the use-side heat exchanger and is decompressed and expanded by the ejector while the refrigerant decompressed and expanded by the expansion valve and then evaporated in the first heat-source-side heat exchanger is raised in pressure by the ejector and the refrigerant raised in pressure by the ejector is further evaporated in the second heat-source-side heat exchanger, wherein the refrigerant decompressed and expanded by the expansion valve flows sequentially through the first heat-source-side heat exchanger, the ejector and the second heat-source-side heat exchanger, and
the switching valve is configured such that in the second operation, the refrigerant compressed by the compressor radiates heat in the first heat-source-side heat exchanger and the second heat-source-side heat exchanger and is decompressed and expanded by the expansion valve before being evaporated in the use-side heat exchanger while the refrigerant does not flow through the ejector.

2. The air conditioner according to claim 1, comprising a first valve, a second valve, and a third valve, wherein
the expansion valve includes a first expansion valve,
the first expansion valve has a first end through which the refrigerant is allowed to flow between the first expansion valve and the use-side heat exchanger,
the ejector has a refrigerant inflow port communicating with the first end of the first expansion valve,
each of the first heat-source-side heat exchanger and the second heat-source-side heat exchanger has a first inlet/outlet into which the refrigerant discharged by the compressor flows in the second operation,
the first heat-source-side heat exchanger has a second inlet/outlet communicating with a second end of the first expansion valve,
the second heat-source-side heat exchanger has a second inlet/outlet communicating with a refrigerant outflow port of the ejector,
the first valve is coupled between the first inlet/outlet of the first heat-source-side heat exchanger and the first inlet/outlet of the second heat-source-side heat exchanger, prevents the refrigerant from flowing during the first operation, and allows the refrigerant to flow during the second operation,
the second valve has a first end coupled between the first heat-source-side heat exchanger and the first valve, and a second end communicating with a refrigerant suction port of the ejector, allows the refrigerant to flow during the first operation, and prevents the refrigerant from flowing during the second operation,
the third valve is coupled between the refrigerant inflow port of the ejector and the refrigerant outflow port of the ejector, prevents the refrigerant from flowing during the first operation, and allows the refrigerant to flow during the second operation, and
in the first operation, the refrigerant returns to the compressor from the first inlet/outlet of the second heat-source-side heat exchanger and in the second operation, the refrigerant returns to the compressor from the use-side heat exchanger.

3. The air conditioner according to claim 1, wherein the compressor discharges the refrigerant in a supercritical state.

4. The air conditioner according to claim 1, wherein the refrigerant compressed by the compressor comprises refrigerant composed of carbon dioxide or a refrigerant mixture containing carbon dioxide.

* * * * *